US012662593B2

(12) United States Patent
Bao et al.

(10) Patent No.: US 12,662,593 B2
(45) Date of Patent: Jun. 23, 2026

(54) SUPRAMOLECULE-BASED TOPOLOGICAL NETWORK ENABLED HIGHLY STRETCHABLE, CONDUCTING, AND PHOTO-PATTERNABLE PEDOT:PSS

(71) Applicant: The Board of Trustees of the Leland Stanford Junior University, Stanford, CA (US)

(72) Inventors: Zhenan Bao, Stanford, CA (US); Yuanwen Jiang, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 468 days.

(21) Appl. No.: 18/273,017

(22) PCT Filed: Jan. 19, 2022

(86) PCT No.: PCT/US2022/013006
§ 371 (c)(1),
(2) Date: Jul. 18, 2023

(87) PCT Pub. No.: WO2022/159512
PCT Pub. Date: Jul. 28, 2022

(65) Prior Publication Data
US 2024/0309201 A1     Sep. 19, 2024

Related U.S. Application Data

(60) Provisional application No. 63/139,666, filed on Jan. 20, 2021.

(51) Int. Cl.
*C08L 65/00* (2006.01)
*C08L 5/16* (2006.01)

(52) U.S. Cl.
CPC ................. *C08L 65/00* (2013.01); *C08L 5/16* (2013.01); *C08L 2203/02* (2013.01)

(58) Field of Classification Search
CPC ........ C08L 65/00; C08L 5/16; C08L 2203/02; C08L 101/02; C08L 101/12; C08L 25/18;
(Continued)

(56) References Cited

U.S. PATENT DOCUMENTS

2020/0401042 A1* 12/2020 Bao .......................... G03F 7/093

FOREIGN PATENT DOCUMENTS

WO    WO-2011105532 A1 * 9/2011 ........... C08G 65/329
WO    WO-2020066203 A1 * 4/2020 ........... C08G 65/329

OTHER PUBLICATIONS

Kayser, L. et al., "Stretchable Conductive Polymers and Composites based on PEDOT and PEDOT:PSS" Adv Mater. Mar. 2019, 31(10) (Year: 2019).*

(Continued)

*Primary Examiner* — Mark Kopec
*Assistant Examiner* — Jaison P Thomas
(74) *Attorney, Agent, or Firm* — Foley & Lardner LLP

(57) ABSTRACT

A conducting composition includes a topological polymer (e.g., a polyrotaxane polymer) and poly(3,4-ethylene-dioxy thiophene):polystyrene sulfonate (PEDOT:PSS). Devices may include a conducting layer including the conducting compositions, e.g., a device comprising a conducting layer, wherein the conducting layer includes a polyrotaxane polymer and a PEDOT:PSS array. The devices are useful in bioelectronics, including high-resolution electrophysiological monitoring of deformable tissues and localized neuromodulation for high-precision control of individual muscle activities.

20 Claims, 89 Drawing Sheets

(58) Field of Classification Search
    CPC ............ C08G 77/04; C08G 2261/1424; C08G
                    2261/3223; C08G 2261/51; C08G
           2261/794; C08G 2261/95; C08G 61/126;
              C08G 83/007; C08J 2325/18; C08J
              2327/16; C08J 2365/00; C08J 2383/04;
              C08J 2400/21; C08J 2405/16; C08J
              2425/18; C08J 2465/00; C08J 7/042;
              C08J 5/18; C08J 7/044; C09D 165/00;
                                    H01B 5/14
    See application file for complete search history.

(56)               References Cited

OTHER PUBLICATIONS

Feig et al., "Mechanically tunable conductive interpenetrating network hydrogels that mimic the elastic moduli of biological tissue", Nature Communications, 2018, 9:2740, pp. 1-9.

Imran, Abu Bin et al. "Extremely stretchable thermosensitive hydrogels by introducing slide-ring polyrotaxane cross-linkers and ionic groups into the polymer network", Nature Communications, Oct. 8, 2014 (Publication date), vol. 5, Article No. 5124, Internal pp. 1-8.

International Search Report and Written Opinion on PCT PCT/US2022/013006 dated May 2, 2022.

Lee, Yoo-Yong et al. "A strain-insensitive stretchable electronic conductor: PEDOT:PSS/acrylamide organogels", Advanced Materials, Dec. 18, 2015 (Online publication date), vol. 28, pp. 1636-1643.

Liu, Chao et al. "A cross-linked interconnecting layer enabling reliable and reproducible solution-processing of organic tandem solar cells", Advanced Energy Materials, Feb. 9, 2020 (Online publication date), vol. 10, Article No. 1903800, Internal pp. 1-8.

Sagara, Yoshimitsu et al. "Rotaxane-based mechanophores enable polymers with mechanically switchable white photoluminescence", ACS Central Science, Apr. 24, 2019 (Publication date), vol. 5, pp. 874-881.

* cited by examiner

Strain when $R/R_0=5$

Strain when $R/R_0=5$

PEG backbone/side chain: PEGDA 10K/575

Cyclodextrin ring: CD-PEGMA

Polyrotaxane structure: PR-MA

PR-PEGMA

FIG. 22B

FIG. 47A
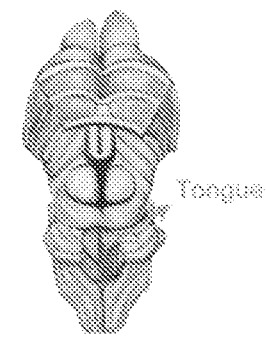
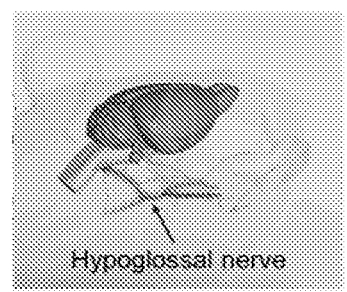
Hypoglossal nerve
FIG. 47B
b        Geniogiossus
1 mV
20 ms Hypoglossal nerve→Tongue Orbicularis oris muscle Facial nerve→Whisker Sternocleidomastoid Accesory nerve→Neck

* Good water solubility
* Uniform film

* Poor water solubility
* Phase separation after spin coating

* Non-ionic additive
* Stable suspension even after aging at room temperature
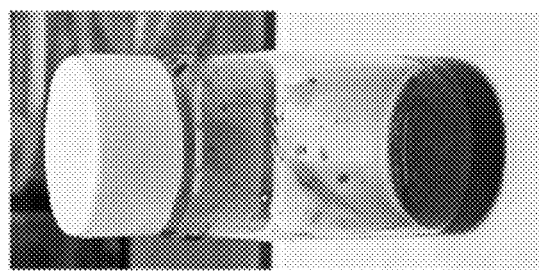
FIG. 57
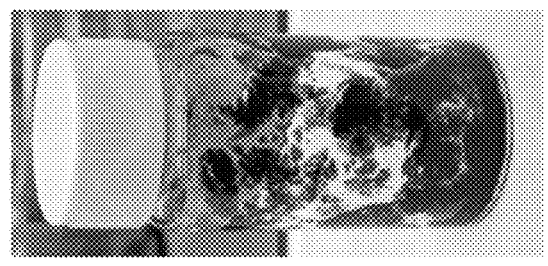
* Charged additive
* Physical gelation of PEDOT due to colloidal instability PEG bisazide
- Poor selectivity of nitrene will crosslink PSS with C-H insertion
- Requires 254 nm activation PEG diacrylate PEG dimethacrylate
- Highly reactive with good selectivity
- Self-crosslinkable free radicals
- 365 nm is necessary

FIG. 58

SUPRAMOLECULE-BASED TOPOLOGICAL NETWORK ENABLED HIGHLY STRETCHABLE, CONDUCTING, AND PHOTO-PATTERNABLE PEDOT:PSS

CROSS-REFERENCE TO RELATED APPLICATIONS

This application is a U.S. National Phase Application under 35 U.S.C. 371 of International Patent Application No. PCT/US2022/013006, filed on Jan. 19, 2022, which claims the benefit of priority to U.S. Provisional Patent Application No. 63/139,666 filed Jan. 20, 2021, each of which are hereby incorporated by reference, in their entirety for any and all purposes.

TECHNICAL FIELD

The present technology relates generally to a conducting composition including a topological polymer (e.g., a polyrotaxane polymer) and poly(3,4-ethylenedioxythiophene):polystyrene sulfonate (PEDOT:PSS). Also disclosed are devices comprising a conducting layer including the conducting compositions, e.g., a device comprising a conducting layer including a polyrotaxane polymer and a PEDOT:PSS array.

BACKGROUND

The following description of the background of the present technology is provided simply as an aid in understanding the present technology and is not admitted to describe or constitute prior art to the present technology.

Implantable and wearable bioelectronic systems are powerful tools that play instrumental roles in numerous biomedical applications, ranging from multimodal monitoring of physiological signals for disease diagnosis, programmable modulation of neural or cardiac activities for therapeutics, restoration of lost sensorimotor functions for prosthetics, and even augmented reality. Aside from all these immediate benefits, many existing devices experience performance degradation or even failure in the highly dynamic tissue environment. Because of the mechanical mismatch between the device and the tissue (e.g., modulus and stretchability), it would inevitably lead to either interfacial delamination or fibrotic encapsulation due to poor tissue conformability or gradual tissue scarring, respectively.

To maintain efficacious energy/signal exchanges across the biointerfaces, extensive efforts have been made to render traditional rigid electronics in compliant form factors to fit the soft biological tissues. Besides adopting structural engineering approaches for inorganic materials, intrinsically stretchable organic electronics based on conducting polymers has emerged as a promising candidate to promote biointegration with several unique advantages. Unlike inorganic materials that suffer from the inherent trade-off between device stretchability and material dimension due to the percolated networks or complex geometries, polymeric materials with low modulus do not have such a limit, allowing scalable fabrication of fine features with good strain tolerance for high-precision and conformal biointerfaces (FIG. 1A). Additionally, conducting organic materials can possess electronic-ionic dual conduction mechanisms, a particularly important feature to reduce the interfacial impedance between electronically conducting circuits and ionically conducting tissues for bidirectional interrogations (i.e., recording and stimulation) (FIG. 1B).

Although the huge potential of applying intrinsically stretchable organic electronics in biomedical devices has long been proposed, it remained a grand challenge to integrate all the appealing features, especially the unique combination of mechanical and electrochemical properties, within one single material platform (FIGS. 56-60). Typically, to endow conjugated polymer semiconductors with good mechanical ductility, the conventional method is to incorporate an interpenetrated secondary elastic matrix. However, for doped conducting polymers that are processed as colloidal aqueous suspensions, conventional thermoplastic elastomers cannot offer good hydrophilicity and elasticity at the same time such that the blending would rather induce severe coagulation and poor overall performances. To break the bottleneck of existing material limit and shift the landscape of stretchable bioelectronics, new molecular engineering strategies are needed to alter how organic electronic materials behave in the context of biointerfaces and subsequently unlock novel biological applications.

SUMMARY

In one aspect, disclosed herein is a conducting composition comprising a topological polymer and a PEDOT:PSS. In some embodiments, the topological polymer comprises a reactive crosslinkable group. In some embodiments, the reactive crosslinkable group is a reactive photo-crosslinkable group. In some embodiments, the photo-crosslinkable group is an acrylate or methacrylate. In some embodiments, the topological polymer is a polyrotaxane polymer. In some embodiments, the polyrotaxane polymer comprises a PEG backbone. In some embodiments, the PEG backbone has a weight of 5-15 kDa. In some embodiments, the topological polymer is a polyrotaxane polymer comprising cyclodextrin rings as a polyrotaxane component. In some embodiments, the cyclodextrin rings include cyclodextrin rings substituted by a PEG side chain and optionally cyclodextrin rings not substituted by a PEG side chain. In some embodiments, the PEG side chain is a PEG diacrylate or PEG di(meth)acrylate. In some embodiments, the topological polymer is crosslinked. In some embodiments, the topological polymer is non-ionic. In some embodiments, the conducting composition is transparent. In some embodiments, the conducting composition has at least 50% transmittance. In some embodiments, the conducting composition has a stretchability greater than 10% crack onset strain (strain before cracks start to form) and a conductivity of more than 1 S/cm. In some embodiments, the conducting composition has a stretchability greater than 20% crack onset strain and a conductivity of more than 500 S/cm. In some embodiments, the conducting composition has a stretchability greater than 20% crack onset strain and a conductivity of more than 1000 S/cm. In some embodiments, the composition is in the form of a film.

In another aspect, disclosed herein is a device comprising a conducting layer, wherein the conducting layer comprises the conducting composition disclosed herein. In some embodiments, the device further comprises a substrate layer comprising an elastomer, optionally wherein the elastomer is a fluoropolymer, optionally wherein the fluoropolymer is a poly(vinylidene fluoride)-co-hexafluoropropylene. In some embodiments, the device further comprises a backing layer, optionally wherein the backing layer comprises an elastomer, optionally wherein the elastomer is a polydimethylsiloxane. In some embodiments, the PEDOT:PSS in the conducting layer is patterned as conductive strips within the conducting layer. In some embodiments, the PEDOT:PSS in the conducting layer is photopatterned. In some embodiments, the device is selected from a display, a diode, a memory device, an electrochromic device, and a solar cell. In some embodiments, the diode is a photodiode, a polymer light emitting diode, or an electrochemical light emitting diode. In some embodiments, the device comprises, consists essentially of or consists of a transparent conducting polymer electrode.

In another aspect, disclosed herein is a device comprising a conducting layer, wherein the conducting layer comprises a conducting composition, and the conducting composition comprises a topological polymer and a photo-patterned PEDOT:PSS array, wherein the conducting layer has a stretchability greater than 10% crack onset strain (strain before cracks start to form) and a conductivity of more than 1 S/cm. In some embodiments, the device further comprises a substrate layer comprising an elastomer, optionally wherein the elastomer is a fluoropolymer, optionally wherein the fluoropolymer is a poly(vinylidene fluoride)-co-hexafluoropropylene. In some embodiments, the device further comprises a backing layer, optionally wherein the backing layer comprises an elastomer, optionally wherein the elastomer is a polydimethylsiloxane. In some embodiments, the topological polymer comprises a reactive crosslinkable group. In some embodiments, the reactive crosslinkable group is a reactive photo-crosslinkable group. In some embodiments, the photo-crosslinkable group is an acrylate or methacrylate. In some embodiments, the topological polymer is a polyrotaxane polymer. In some embodiments, the topological polymer comprises a PEG backbone. In some embodiments, the PEG backbone has a weight of 5-15 kDa. In some embodiments, the topological polymer is a polyrotaxane polymer comprising cyclodextrin rings as a polyrotaxane component. In some embodiments, the cyclodextrin rings include cyclodextrin rings substituted by a PEG side chain and optionally cyclodextrin rings not substituted by a PEG side chain. In some embodiments, the PEG side chain is a PEG diacrylate or a PEG di(meth)acrylate. In some embodiments, the topological polymer is crosslinked. In some embodiments, the PEDOT:PSS array is patterned as conductive strips within the conducting layer. In some embodiments, the topological polymer is non-ionic. In some embodiments, the conducting composition is transparent. In some embodiments, the device is selected from a display, a diode, a memory device, an electrochromic device, and a solar cell. In some embodiments, the diode is a photodiode, a polymer light emitting diode, or an electrochemical light emitting diode. In some embodiments, the device comprises, consists essentially of or consists of a transparent conducting polymer electrode.

BRIEF DESCRIPTION OF THE DRAWINGS

FIG. 1A: Stretchable multielectrode array can form seamless interfaces with multiple organs for bidirectional interrogations with high precision. FIG. 1B: Schematic diagram illustrating the dual-conduction mechanism of conducting polymer (e.g., PEDOT:PSS) and its ability to conform onto curvilinear tissue surfaces. FIGS. 1C-1F: Photographic images showing the conformal interface between stretchable PEDOT:PSS devices and underlying tissues, including brainstem (FIG. 1C), wrist (FIG. 1D), finger (FIG. 1E), and the back of hand (FIG. 1F).

FIG. 2A: Schematic diagram illustrating key building blocks of PR monomers and PEDOT:PSS. FIG. 2B: Schematic diagram illustrating the sliding ring-based intrinsically stretchable topological network. FIGS. 2C, 2D: Stretching tests showing that PR-PEGMA blended PEDOT:PSS could substantially enhance stretchability compared to other control samples. FIG. 2E: Optical microscope image of a photopatterned PEDOT:PSS film. FIG. 2F: AFM image and corresponding height profile of a photopatterned PEDOT:PSS array with 2-μm width. FIG. 2G: Resistance change over strain curves of different PR/PEDOT:PSS composite films showing the correlation between the overall stretchability and initial PR concentration. FIG. 2H: Statistical comparison of Young's moduli between different PR/PEDOT:PSS films indicating that PR can reduce the overall film stiffness. FIG. 2I: Four-point probe measurements showing enhanced film conductivity with higher PR content. FIG. 2J: XPS profiles indicating reduced PSS content with more PR in the film. FIG. 2K: Schematic diagram illustrating the interaction between PR-PEGMA and PEDOT:PSS for enhanced conductivity. FIG. 2L: Chemical structure of PR-PEGMA and individual roles of each building blocks.

FIGS. 3A-3L show that fully-crosslinked topological network can afford post-treatment towards record high conductivity and stretchability. FIG. 3A: Schematic diagram illustrating the change of crystallinity by acid treatment. FIGS. 3B-3C: 2D spectra (FIG. 3B) and 1D profile (FIG. 3C) of GIXD collected from an as-blended neat film and an acid-treated one. FIG. 3D: AFM images showing the morphological changes of the PR-PEGMA/PEDOT:PSS film before and after acid treatment. FIG. 3E: Electrical measurement showing enhanced conductivity after acid treatment. FIG. 3F: Optical microscope images showing the shape evolution of an acid-treated PEDOT:PSS pattern during stretching. FIG. 3G: Cyclic stretching test showing the reversible resistance change of PEDOT:PSS. FIG. 3H: Conductivity over strain plots showing the superior performance of PR-PEGMA/PEDOT:PSS system versus literature reported ones. FIG. 3I: EIS measurements showing the reduced impedance of PEDOT:PSS compared to Au. FIG. 3J: Interfacial capacitance from PEDOT:PSS and Au as a function of electrode volume. FIG. 3K: CV sans showing the enhanced charge storage capacity of PEDOT:PSS over Au. FIG. 3L: Current measurements following transient voltage pulses showing better charge injection of PEDOT:PSS than Au.

Figures 4O, 4P:
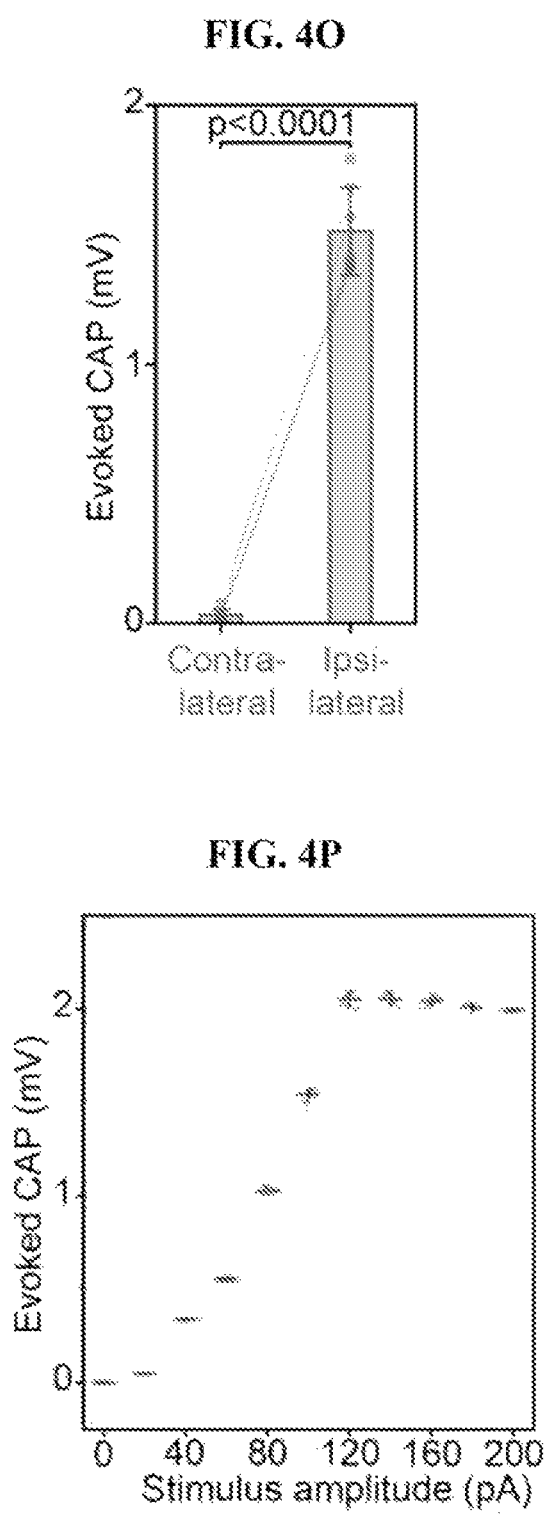

FIG. 4A: Exploded view of the multilayered stacks for the stretchable electrode array. Inset: Optical microscope image of an as-fabricated device. SEBS: styrene-ethylene-butylene-styrene; PVDF: polyvinylidene fluoride; PEDOT: poly(3,4-ethylenedioxythiophene); PDMS: polydimethylsiloxane. FIG. 4O: Statistical analyses showing the preferred activation of ipsilateral targets. FIG. 4P: Intensity versus stimulus strength plot showing the correlation between the evoked muscle compound action potential (CAP) and the input current amplitude. FIG. 4Q: Immunohistological staining of a brain slice following the insertion of the soft and stretchable electrode array along the floor of the fourth ventricle between the brainstem and the cerebellum.

FIGS. 5A-5B show synthetic route for PR-PEGMA (FIG. 5A) and SEC characterizations (FIG. 5B). The final PR-PEGMA consists of a PEG 10 kDa backbone, adamantane stoppers, cyclodextrin rings, PEG 500 sidechains, and methacrylate terminals.

FIG. 10 shows 1H NMR spectrum of PR-PEGMA 12 in DMSO-$d_6$.

FIG. 14A: Chemical structures of samples for stretching tests. FIG. 14B: Optical microscope images of different PEDOT:PSS films showing the crack formation under strain. PR-PEGMA/PEDOT:PSS hybrid has substantially higher stretchability than all control samples.

FIGS. 22A and 22B show GIXD spectra of PEDOT:PSS films blended with PR of different concentrations.

FIGS. 34A-34B: Optical microscope images of photopatterned PEDOT:PSS electrode array before (FIG. 34A) and after (FIG. 34B) encapsulation. FIG. 34C: Photographic images of the as-fabricated device.

FIG. 46A: Anatomy of three cranial nerves originating from the brainstem that innervate the tongue, whisker, and neck, respectively. FIGS. 46B-46D. Photographic images showing the surgical procedures to expose the brainstem and a stretchable electrode array conforming to the floor of the 4th ventricle.

FIGS. 47A-47C show schematic diagrams and recorded data showing the ability of stretchable PEDOT:PSS array for precise control of tongue movements through localized stimulation of the hypoglossal nucleus and the hypoglossal nerve/genioglossus pair.

Figure 58:
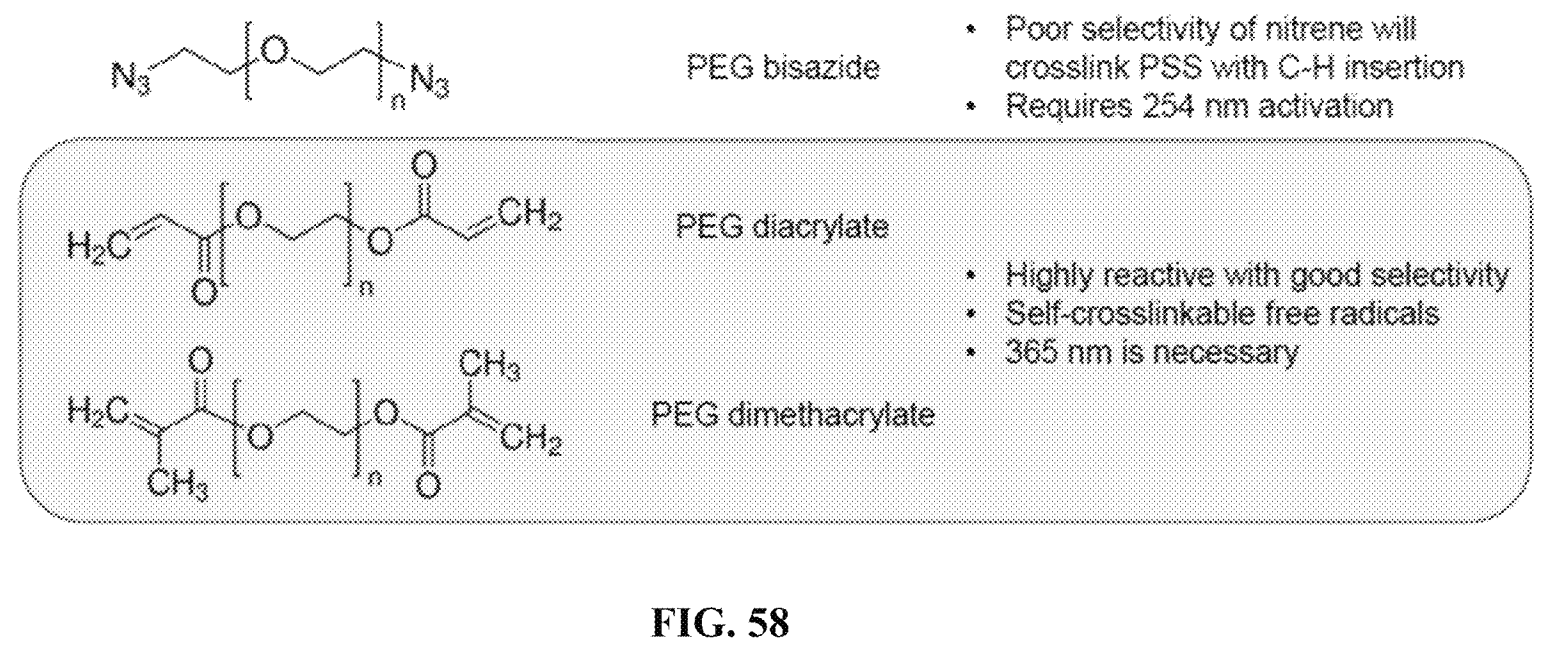

FIGS. 56-58 show monomer screening for suitable cross-linkers. FIG. 56. Comparison of two samples: the monomer has to be polar enough and have good water solubility. FIG. 57: The monomer has to be non-ionic, such as PEG. FIG. 58: The monomer has to be highly reactive with good selectivity.

DETAILED DESCRIPTION

Figure 1A:
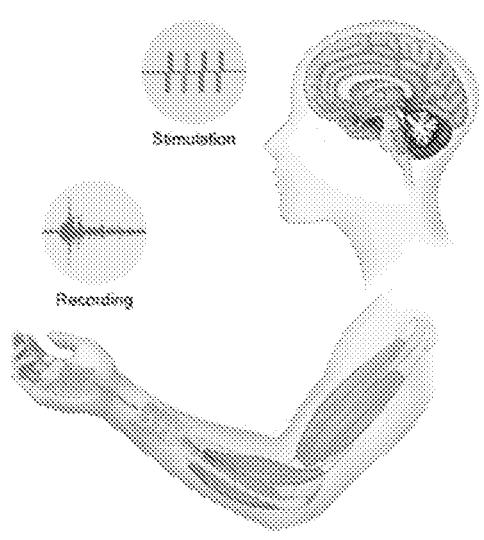
FIGS. 1A-1F show the intrinsically stretchable organic electronics for multimodal and conformal biointerfaces of the present technology.
Figure 1B:
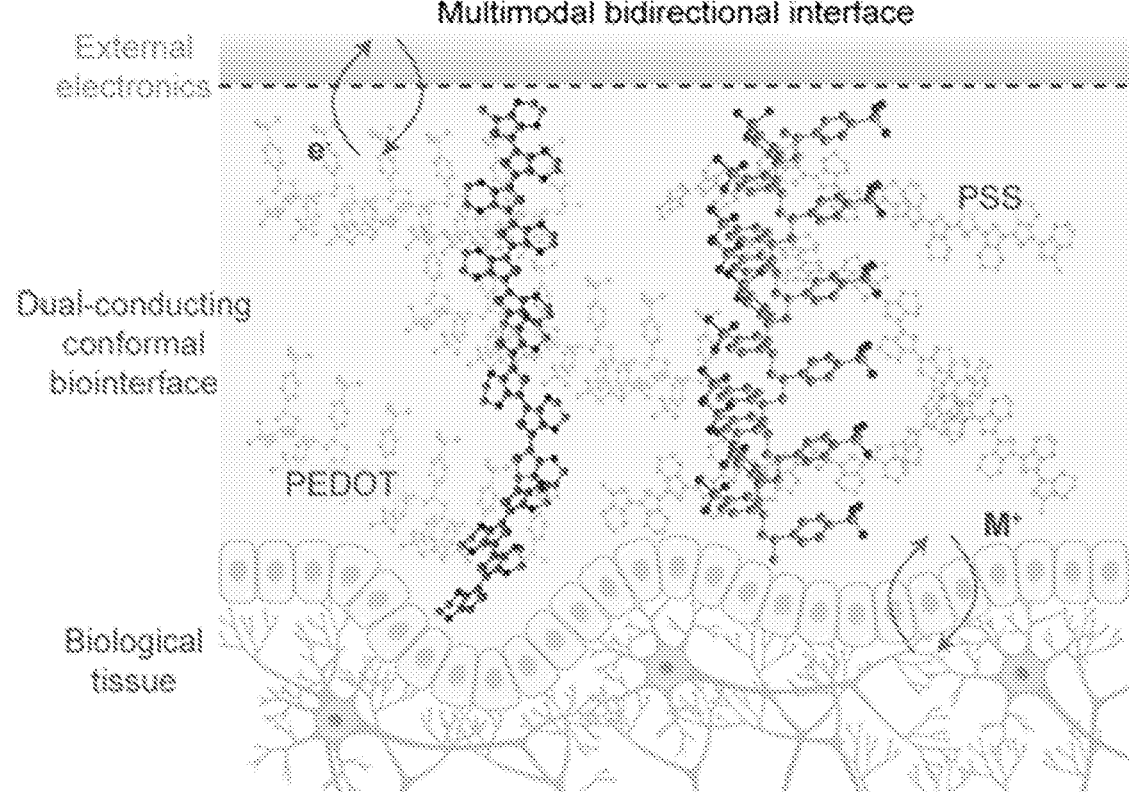
Figure 1C:
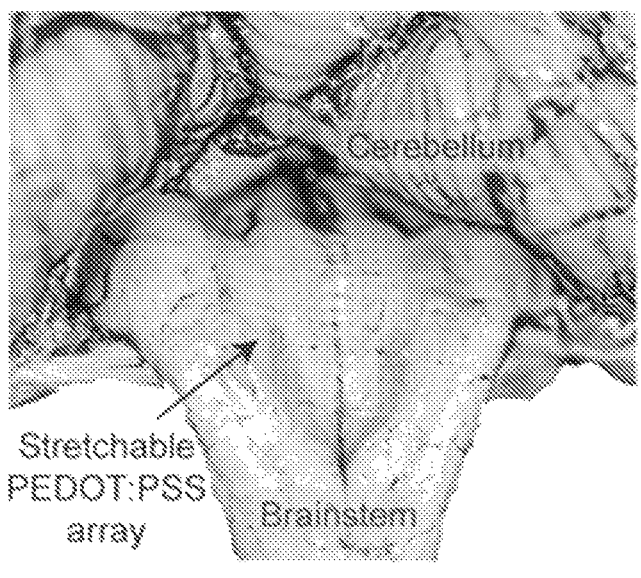
Figure 1D:
Figure 1E:
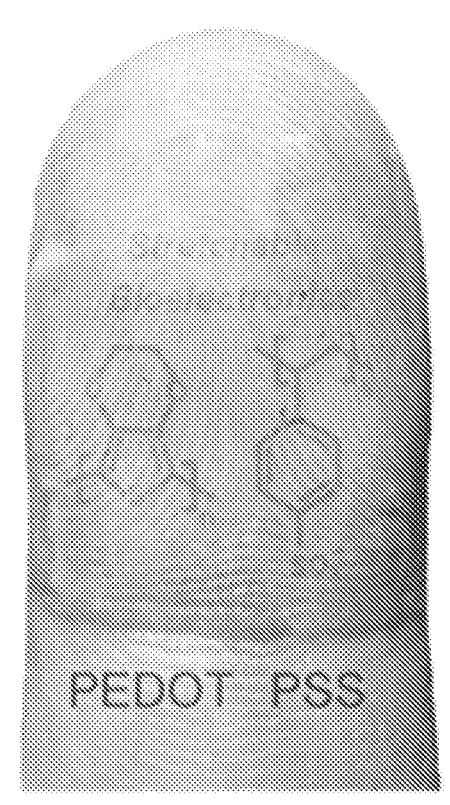
Figure 1F:
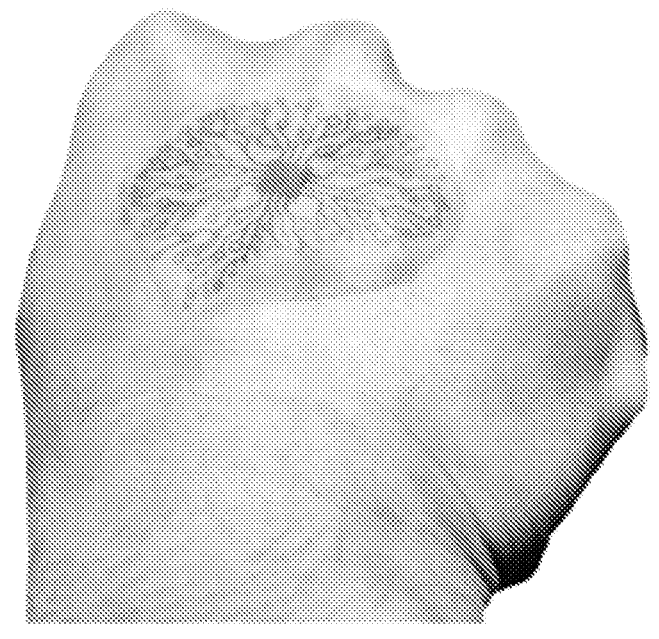

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein with respect to numerical ranges, the terms "approximately," "about," "substantially," and similar terms will be understood by persons of ordinary skill in the art and will vary to some extent depending upon the context in which it is used. If there are uses of the terms that are not clear to persons of ordinary skill in the art, given the context in which it is used, the terms will be plus or minus 10% of the disclosed values. When "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

As used herein, the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "elastomer" refers to a polymer with viscoelasticity (i.e., both viscosity and elasticity) and with weak intermolecular forces, generally low Young's modulus and high failure strain compared with other materials.

As used herein, the term "fluoropolymer" is a fluorocarbon-based polymer with multiple carbon-fluorine bonds. Fluoropolymers are characterized by a high resistance to solvents, acids, and bases.

As used herein, the term "polyrotaxane polymer" refers to a type of mechanically interlocked polymer molecule consisting of strings and rings, in which multiple rings are threaded onto a molecular axle and prevented from dethreading by two bulky end groups.

As used herein, the term "topological polymer" refers to a polymeric molecule that possesses unique spatial features, such as linear, branched, or cyclic architectures. It may also refer to polymer networks that exhibit distinct topologies owing to special crosslinking (e.g., branched crosslinking and cyclic crosslinking). When self-assembling or crosslinking in a certain way, polymeric species with simple topological identity may also demonstrate complicated topological structures in a larger spatial scale. Topological structures, along with the chemical composition, determine the macroscopic physical properties of polymeric materials.

The present technology is based on the development of a novel conducting composition comprising mechanically interlocked chemical structures between ring-like or cyclic moieties and oligomer/polymer chain, optionally, where one or both of which can participate in crosslinking into a polymer network (e.g., polyrotaxane polymer, catenane polymer, cyclic oligomers/polymers or supramolecular cyclic structures) and PEDOT:PSS. The novel conducting composition exhibits unprecedented conductivity, stretchability, and photopatternability, which may guide new design rationales in development of stretchable electronics and enable previously inaccessible applications in bioelectronics, including high-resolution electrophysiological monitoring of deformable tissues and localized neuromodulation for high-precision control of individual muscle activities. Another important aspect of the novel conducting composition of the present disclosure is that they are of high transmittance. A transparent stretchable conductor enables many applications that require stretchable transparent conductors, such as stretchable displays, stretchable photodiodes, simultaneous electrophysiology and optical measurements, and stretchable solar cells.

Compositions

In one aspect, provided herein is a conducting composition comprising, consisting essentially of, or consisting of a topological polymer and PEDOT:PSS. Examples of topological polymers include but are not limited to interpenetrating polymer, triblock polymer, deblock polymer, multi-block polymer, dendrimer, branched polymer, star polymer, and polyrotaxane. PEDOT:PSS, a polymer mixture of two ionomers (i.e., poly(3,4-ethylenedioxythiophene) and poly-styrene sulfonate), is a conducting material well-known to a skilled person in the art.

In some embodiments, the topological polymer comprises a reactive crosslinkable group. Illustrative reactive crosslinkable groups include but are not limited to methacrylate, acrylate, azide, diazirene, epoxy, and benzophenone. In some embodiments, the reactive crosslinkable group comprises, consists essentially of, or consists of a reactive photo-crosslinkable group. In some embodiments, the reactive crosslinkable group is a reactive photo-crosslinkable group. Illustrative reactive photo-crosslinkable groups include but are not limited to acrylate, methacrylate, azide, and diazirene.

In some embodiments, the topological polymer is a poly-rotaxane polymer. In some embodiments, the topological polymer includes a PEG backbone. In some embodiments, the PEG backbone has a weight of 5-15 kDa (e.g., a weight of about 5 kDa, about 6 kDa, about 7 kDa, about 8 kDa, about 9 kDa, about 10 kDa, about 11 kDa, about 12 kDa, about 13 kDa, about 14 kDa, or about 15 kDa). In some embodiments, the topological polymer is a polyrotaxane polymer comprising cyclodextrin rings as a polyrotaxane component. In some embodiments, the cyclodextrin rings include cyclodextrin rings substituted by a PEG side chain and optionally cyclodextrin rings not substituted by a PEG side chain. In some embodiments, the PEG side chain includes a reactive crosslinkable group (e.g., a photo-reactive crosslinkable group). In some embodiments, the PEG side chain is a PEG diacrylate or PEG di(meth)acrylate.

In some embodiments, the topological polymer is cross-linked. In some embodiments, the topological polymer is photo-crosslinked, e.g., crosslinked under UV light.

In some embodiments, the topological polymer is non-ionic, non-acidic, or non-basic. In some embodiments, the topological polymer is hydrophilic and water-soluble.

In some embodiments, the conducting composition is transparent. In some embodiments, the conducting composition exhibits a transmittance of at least about 50%. This includes about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% or higher, including values therebetween. In some embodiments, the conducting composition exhibits a transmittance of 50%-90%.

In some embodiments, the conducting composition has a stretchability greater than 10% (e.g., greater than 10, 20, 30, 40, 50, 60, 70, 80, 90, or 100%) crack onset strain and a conductivity of more than 1 S/cm (e.g., more than 1, 2, 3, 4, 5, 10, 50, 100, 500, 1000, 1500, 2000, 2500, 3000, 3500, 4000, 4500, or 5000 S/cm). In some embodiments, the conducting composition has a stretchability of 10% to 100% crack onset strain and a conductivity of 1 S/cm to 5000 S/cm. In some embodiments, the conducting composition has a stretchability of 11% to 100% crack onset strain and a conductivity of 2 S/cm to 5000 S/cm.

In some embodiments, the conducting composition has a stretchability greater than 20% crack onset strain, a conductivity of more than 500 S/cm, and a transmittance of more than 50%. In some embodiments, the conducting composition has a stretchability greater than 20% crack onset strain, a conductivity of more than 1000 S/cm, and a transmittance of more than 50%. In some embodiments, the conducting composition has a stretchability greater than 60%, 70%, 80%, 90%, or 100% crack onset strain, a conductivity of more than 2000, 3000, 4000, or 5000 S/cm, and a transmittance of more than 50%, 60%, 70%, 80%, or 90%.

In some embodiments, the conducting composition has been washed with water, methanol, or acid treated, or any combination thereof.

In some embodiments, the conducting composition is in the form of a film.

Devices

In one aspect, provided herein is a device comprising a conducting layer, wherein the conducting layer comprises, consists essentially of, or consists of a conducting composition as described herein comprising, consisting essentially of, or consisting of a topological polymer and PEDOT:PSS.

In some embodiments, the device further includes a substrate layer comprising, consisting essentially of, or consisting of an elastomer. In some embodiments, the elastomer may be a fluoropolymer or other polymeric material that can prevent water diffusion. Illustrative polymers include but are not limited to poly(vinylidene fluoride)-co-hexafluoropropylene, SEBS, and PDMS.

In some embodiments, the device further includes a backing layer, optionally wherein the backing layer comprises, consists essentially of, or consists of an elastomer. In some embodiments, the elastomer is a polydimethylsiloxane. Other illustrative elastomers include but are not limited to SEBS and poly(methymethacrylate)-polybutylacrylate-poly(methymethacrylate).

In some embodiments, the PEDOT:PSS in the conducting layer is patterned as conductive strips within the conducting layer. In some embodiments, the PEDOT:PSS in the conducting layer is photopatterned.

In another aspect, provided herein is a device comprising a conducting layer, wherein the conducting layer comprises, consists essentially of, or consists of a conducting composition, and the conducting composition comprises, consists essentially of, or consists of a topological polymer and a photo-patterned PEDOT:PSS array, wherein the conducting composition has a stretchability greater than 10% (e.g., greater than 10, 20, 30, 40, 50, 60, 70, 80, 90, or 100%) crack onset strain and a conductivity of more than 1 S/cm (e.g., more than 1, 2, 3, 4, 5, 10, 50, 100, 500, 1000, 1500, 2000, or 2500 S/cm). This includes a stretchability of 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100%, or more, crack onset strain and a conductivity of 2 to 2500 S/cm, including any range therein.

Some embodiments of the present disclosure include a device comprising a conducting layer including a material comprising mechanically interlocked chemical structures between ring-like or cyclic moieties and oligomer/polymer chain, optionally, where one or both of which can participate in crosslinking into a polymer network (e.g., polyrotaxane polymer, catenane polymer, cyclic oligomers/polymers or supramolecular cyclic structures) and PEDOT:PSS. In some embodiments, the device further comprises a substrate layer comprising an elastomer, e.g., a fluoropolymer or other polymeric material that can prevent water diffusion, e.g., poly(vinylidene fluoride)-co-hexafluoropropylene. In some embodiments, the device further comprises a backing layer, e.g., an elastomer, e.g., polydimethylsiloxane. In some embodiments, the polyrotaxane polymer comprises a PEG backbone. In some embodiments, the PEG backbone has a weight of 5-15 kDa. In some embodiments, the polyrotaxane polymer comprises cyclodextrin rings as a polyrotaxane component. In some embodiments, the cyclodextrin rings include cyclodextrin rings substituted by a PEG backbone and optionally cyclodextrin rings not substituted by a PEG backbone. In some embodiments, the polyrotaxane polymer is crosslinked. In some embodiments, the PEDOT:PSS in the conducting layer is patterned as conductive strips within the conducting layer. In some embodiments, the PEDOT:PSS is photopatterned. In some embodiments, the conducting layer has a stretchability greater than 10% (e.g., greater than 10, 20, 30, 40, 50, 60, 70, 80, 90, or 100%) strain before cracks start to form and a conductivity of more than 1 S/cm (e.g., more than 1, 2, 3, 4, 5, 10, 50, 100, 500, 1000, 1500, 2000, or 2500 S/cm). In some embodiments, the conducting layer has been acid treated.

Additional embodiments include a device comprising a conducting layer including a topological polymer and a photo-patterned PEDOT:PSS array, wherein the conducting layer has a stretchability greater than 10% (e.g., greater than 10, 20, 30, 40, 50, 60, 70, 80, 90, or 100%) strain before cracks start to form and a conductivity of more than 1 S/cm (e.g., more than 1, 2, 3, 4, 5, 10, 50, 100, 500, 1000, 1500, 2000, or 2500 S/cm). In some embodiments, the topological polymer comprises a PEG backbone. In some embodiments, the PEG backbone has a weight of 5-15 kDa. In some embodiments, the topological polymer is a polyrotaxane polymer comprising cyclodextrin rings as a polyrotaxane component. In some embodiments, the cyclodextrin rings include cyclodextrin rings substituted by a PEG backbone and optionally cyclodextrin rings not substituted by a PEG backbone. In some embodiments, the topological polymer is crosslinked. In some embodiments, the PEDOT:PSS array the conducting layer is patterned as conductive strips within the conducting layer. In some embodiments, the topological polymer comprises a reactive photo-crosslinkable group. In some embodiments, the topological polymer is non-ionic. In some embodiments, the topological polymer comprises PEG. In some embodiments, the topological polymer comprises PEG di(meth)acrylate. In some embodiments, the topological polymer comprises PEG di(meth)acrylate. In some embodiments, the device further comprises a substrate layer comprising an elastomer, e.g., a fluoropolymer or other polymeric material that can prevent water diffusion, e.g., poly(vinylidene fluoride)-co-hexafluoropropylene. In some embodiments, the device further comprises a backing layer, e.g., an elastomer, e.g., polydimethylsiloxane. In some embodiments, the polyrotaxane polymer comprises a PEG backbone. In some embodiments, the topological polymer comprises a material comprising mechanically interlocked chemical structures between ring-like or cyclic moieties and oligomer/polymer chain, optionally, where one or both of which can participate in crosslinking into a polymer network (e.g., polyrotaxane polymer, catenane polymer, cyclic oligomers/polymers or supramolecular cyclic structures). In some embodiments, the conducting layer has been acid treated.

In some embodiments, the device is a display, a diode (e.g., photodiode, a polymer light emitting diode, an electrochemical light emitting diode), a memory device, an electrochromic device, or a solar cell. In some embodiments, the device is a transparent conducting polymer electrode. In some embodiments, the device comprises, consists essentially of or consists of a transparent conducting polymer electrode.

The present invention, thus generally described, will be understood more readily by reference to the following examples, which are provided by way of illustration and are not intended to be limiting of the present invention.

EXAMPLES

The present technology is further illustrated by the following Examples, which should not be construed as limiting in any way.

Example 1: Synthetic of Polyrotaxane-Based Supramolecular Crosslinkers

PEG-S. Polyethylene glycol (PEG, 10.0 g, average molecular weight 10,000, Sigma-Aldrich) was first dissolved in anhydrous pyridine (50 mL, Sigma-Aldrich) before 1,8-diazabicyclo[5.4.0]undec-7-ene (DBU, 250 μL, Sigma-Aldrich) and 2,2-dimethylsuccinic anhydride (6.0 mL, Sigma-Aldrich) were added. The solution was stirred at 60° C. overnight. The reaction solution was dropped into Milli-Q water (200 mL), and then the pH was adjusted to 2-3 using concentrated hydrochloric acid (HCl, Sigma-Aldrich). The product was extracted with dichloromethane (DCM, Fisher Scientific) and then dried to obtain PEG-S(9.5 g) as a white solid.

CD-PR. PEG-S(1.5 g) was dissolved in deionized water (10.0 mL), and then the aqueous solution of α-cyclodextrin (α-CD, 6.00 g/44 mL, Sigma-Aldrich) was added. The mixed solution was stirred for 30 minutes and then stored in a refrigerator for two days to obtain a turbid solution with white precipitate. The mixture was freeze-dried to obtain a white powder containing pseudo-polyrotaxane.

For the end-capping reaction, a solution of 1-adamantaneamine (195 mg, 1.3 mmol, Sigma-Aldrich), (benzotriazol-1-yloxy)tris(dimethylamino)phosphonium hexafluorophosphate (BOP reagent, 570 mg, 1.3 mmol, Sigma-Aldrich) and N-ethyldiisopropylamine (DIPEA, 222 μL, 1.3 mmol, Sigma-Aldrich) in anhydrous acetonitrile (75 mL, Sigma-Aldrich) was mixed with the powder of pseudo-polyrotaxane under nitrogen atmosphere. The suspension was stirred at room temperature for 48 hours. The resultant suspension was centrifuged to remove the supernatant. The obtained solid was washed with acetonitrile twice, and then the solid was dried under vacuum. The obtained white solid was dissolved in dimethyl sulfoxide (DMSO, 50 mL), and the solution was dropped into deionized water (500 mL). This aqueous solution was purified by dialysis tubing. Finally, the resultant solution was freeze-dried after filtrated by nylon filters (pore size: 1 μm, Whatman) to obtain CD-PR (1.86 g) as a white solid.

PEGMA-CDI. An anhydrous DCM solution (30 mL, Sigma-Aldrich) of poly(ethylene glycol) methacrylate (PEGMA, 2g, Mn 500, Sigma-Aldrich) was added into another anhydrous DCM solution (50 mL) of 1,1'-carbonyl-diimidazole (CDI, 0.71 g, 1.1 eq, Tokyo Chemical Industry).

The clear solution was stirred at room temperature (rt) for one day followed by saline washing (3×100 mL). The organic phase was dried with anhydrous sodium sulfate (Fisher Scientific) and concentrated in vacuo to give a yellow viscous liquid (yield: 2.1 g).

PR-PEGMA$_x$. CD-PR, PEGMA-CDI with different equivalents (2, 5, 10) to α-CD in CD-PR together and 4-(dimethylamino) pyridine (DMAP, 0.05 eq to PEGMA-CDI) were dissolved in anhydrous DMSO and the mixture was stirred at 35° C. for 3 days. Phosphate buffered saline (PBS, Thermo-Fisher) solution was added to dilute DMSO, and the solution was dialyzed against water, followed by freeze drying to give the product as a white solid. The average number of PEGMA group on one CD-PR was determined by $^1$H NMR spectra.

Chemical structures of the intermediates and final products were confirmed by nuclear magnetic resonance (NMR) spectroscopy using a 500 MHz Varian Inova spectrometer and Fourier transform infrared (FT-IR) spectroscopy using a Nicolet iS50 FT/IR spectrometer. Molecular weights were characterized by size exclusion chromatography (SEC) performed on a Viscotek GPC270 at 323 K with 0.8 mL/min, using refractive index detection, PMMA standards, and DMF as the eluent.

Example 2: Preparation of Stretchable Conducting Films

Poly(3,4-ethylenedioxythiophene) polystyrene sulfonate (PEDOT:PSS, Orgacon™ ICP 1050) was kindly provided by Agfa-Gevaert N. V as a surfactant-free aqueous dispersion with 1.1 wt. % solid content. PR-based supramolecular crosslinkers were synthesized as above. Control samples of poly(ethylene glycol) diacrylate (PEGDA, Mn 10,000 or 575) were purchased from Sigma-Aldrich. Multi-arm PEG acrylate samples with molecular weight of 10,000 (8-arm PEG acrylate-tripentaerythritol, or 8-arm PEG acrylate-hexaglycerol) were purchased from JenKem Technology.

In a typical experiment, PR-PEGMA of various amounts (10 mg, 25 mg, 50 mg) together with 0.5 mg of photo initiator, 2-hydroxy-4'-(2-hydroxyethoxy)-2-methylpropiophenone (Irgacure 2959, Sigma-Aldrich), were added to 1 mL of PEDOT:PSS aqueous dispersion (1.1 wt. %) and mixed using a vortex mixer. After filtering using nylon syringe filters (pore size: 1 μm, Whatman), the mixture was spin coated onto oxygen (O$_2$) plasma treated glass, silicon (Si)/silicon dioxide (SiO$_2$), or elastomeric substrates at 2000 rpm for 1 min. Typically, the plasma treatment condition was 150 W for 30 s using a Technics Micro-RIE Series 800. The spin coated film was later photo-crosslinked by UV exposure for 2 min using a Spectrum 100 Precision UV Spot Curing System (American Ultraviolet) before rinsing by water. The as-prepared film was further treated with acid by dipping into concentrated sulfuric acid (Sigma-Aldrich) for 10 s before further testing and characterizations.

Example 3: Material and Chemical Characterization

Atomic force microscopy (AFM) images were collected in tapping mode using a Bruker Icon AFM. X-ray photoelectron spectroscopy (XPS) was performed on a PHI VersaProbe Scanning XPS Microprobe. Gas cluster ion beam (GCIB) sources were used for depth profiling to avoid damage of the PEDOT:PSS structure. UV-vis-NIR spectra were collected on an Agilent Cary 6000i model. A rotational polarizer was used to measure the absorption intensity with the polarization parallel and perpendicular to the stretching direction. Raman spectroscopy were performed using a Horiba Labram HR Evolution Raman System. Film thickness values were measured using a contact probe Dektak 150 profilometer. Differential scanning calorimetry (DSC) was conducted using a TA Instruments Q2000 DSC. Grazing incidence x-ray diffraction (GIXD) measurements were carried out at the Stanford Synchrotron Radiation Lightsource at beamline 11-3, with a photon energy of 12.735 keV and a sample-to-detector distance of 320 mm. The incident angle was fixed at 0.14° to probe the entire film with reduced substrate scattering.

Example 4: Mechanical Characterizations

For microscopic investigation of crack formation, PEDOT:PSS thin films with various compositions were hand stretched to different lengths corresponding to strain levels of 25%, 50%, 75%, and 100% before imaging under a upright microscope (Leica).

For the measurement of Young's modulus, PEDOT:PSS solutions mixed with different PR concentrations were drop-casted onto Si wafers and dried to form thick films of ~15 μm. The as-prepared Si wafers were later mounted onto an aluminum puck using graphite paste. A cylindrical flat punch tip with a dynamic indentation method was used to probe the modulus of the films, and the measurement was performed on a Nanomechanics iNano Nanoindenter.

Example 5: Electrical and Electrochemical Characterizations

Conductivity measurements were carried out using a four-point probe method using a Keithley 4200 SC semiconductor analyzer. Electrodes were deposited by applying silver paste. A minimum of four measurements were obtained for an average value.

For the measurement of resistance change over strain, PEDOT:PSS films were mounted onto a home-made automated stretcher when the resistance values at different strain levels were recorded using a LCR meter (Keysight Technologies, E4098A). Contacts between PEDOT:PSS and the LCR meter were made by silver paste and eutectic gallium-indium (EGaIn) liquid metal alloy.

Electrochemical impedance spectroscopy (EIS) was performed by using stretchable PEDOT:PSS as the working electrode, platinum as the counter electrode, silver/silver chloride (Ag/AgCl) as the reference electrode, and PBS as the electrolyte. Impedance and phase angle as functions of frequency were acquired by a Bio-Logic VSP-300 workstation with a sine wave signal amplitude of 10 mV. Chrono-potentiometry was conducted using the same Bio-Logic electrochemical workstation when a biphasic current pulse of plus/minus 5 mA with a duration of 2 ms for each phase was applied. Voltage between the working and the reference electrodes were recorded to compare the charge injection capacities. Chronoamperometry was performed using a pulse measure unit and a 4225-remote preamplifier/switch module connected to the Keithley 4200-SCS. Square wave voltage pulses of 100 mV and a duration of 10 ms were applied and currents were recorded simultaneously.

Example 6: Device Fabrication

In consideration of the chemical orthogonality and the surface energy of each elastomeric layers, a multi-layer device structure for the stretchable electrode array was developed including a polydimethylsiloxane (PDMS) backing layer for handling, a poly(vinylidene fluoride)-co-hexafluoropropylene (PVDF-HFP) substrate layer for favored surface energy and solvent resistance, a PR-PEGMA/PEDOT:PSS conducting layer for electrode arrays and interconnects, and a styrene-ethylene-butylene-styrene (SEBS) encapsulation layer for passivation of interconnects.

Glass substrates were first treated with $O_2$ plasma at 150 W for 30 s using a Technics Micro-RIE Series 800. Next, a dextran (from *Leuconostoc* spp., $M_r$~100,000 Sigma-Aldrich) aqueous solution (5 wt. %) was spin coated at 500 rpm for 15 s as the sacrificial layer. The PDMS carrier layer was made by spin coating from Sylgard 184 (PDMS:crosslinker 10:1 weight ratio, Dow) at a speed of 2000 rpm for 20 s, and followed by annealing at 150° C. for 10 min. After curing, the PDMS substrate was treated with oxygen plasma at 150 W for 1 min before spin coating the next PVDF-HFP layer.

PVDF-HFP based fluoroelastomer (DAI-EL G-801) was kindly provided by Daikin as a peroxide curable copolymer. Before spin coating, a methyl ethyl ketone (MEK) solution of PVDF-HFP, triallyl isocyanurate (TAIC, Tokyo Chemical Industry), and benzoyl peroxide (Sigma-Aldrich) was first prepared with a weight ratio of 100:6:2 and the PVDF-HFP concentration of 125 mg/mL. After filtering through nylon syringe filters (pore size: 1 μm, Whatman), the mixture was spin coated at 1000 rpm for 2 min followed by curing at 180° C. for 1 hour.

Next, the PVDF-HFP layer was treated by oxygen plasma at 150 W for 3 min before spin coating the PEDOT:PSS layer. The PEDOT:PSS solution consisted of 50 mg of PR-PEGMA and 0.5 mg of Irgacure 2959 dissolved in 1 mL of PEDOT:PSS aqueous dispersion (1.1 to 1.3 wt. %). After filtering using nylon syringe filters (pore size: 1 μm, Whatman), the mixture was spin coated at 2000 rpm for 1 min. The PR-PEGMA/PEDOT:PSS film was later exposed using a Spectrum 100 Precision UV Spot Curing System (American Ultraviolet) before using water to develop the unexposed part. The as-patterned PEDOT:PSS array was later treated with concentration sulfuric acid for 10 s before water rinsing and drying.

For the encapsulating SEBS layer, it was first prepared by mixing SEBS (H1062, free sample from Asahi Kasei, 80 mg/mL) and home-made azide crosslinker (decane-1,10-diyl bis(4-azido-2,3,5,6-tetrafluorobenzoate), 2.4 mg/mL) in toluene (Fisher Scientific). After filtering through Teflon syringe filters (pore size: 1 μm, Whatman), the mixture was spin coated at 500 rpm for 2 s followed by UV exposure for 10 min using the Spectrum 100 curing system. After a post-exposure bake at 120° C. for 10 min, the unexposed part was later developed using dodecane (Tokyo Chemical Industry) for 2 min.

For the subsequent bonding process to make input/output connections with external circuits, silver nanowires (AW060, Ke-Chuang Advanced Materials) were spray coated onto the contacting pads through shadow masks. The final contacts were made by sandwiching an anisotropic conductive adhesive (ACA, 3M 9703) between the contacting pads and a flexible flat cable (FFC).

The as-fabricated device was later released from the substrate by immersing into water for at least 1 hour to dissolve the sacrificial dextran layer.

Example 7: Electrophysiological Recording on Human

In a typical recording, a 64-channel stretchable array with electrode size of 100 μm and inter-electrode distance of 500

μm was fabricated as described above. A customized printed circuit board (PCB) containing a 64-channel zero-insertion force (ZIF) connector (500 μm pitch, 150 mm length, Uxcell) and two Omnetics connectors (NPD-36-VV-GS, 36-Position Dual Row Male Nano-Miniature Connector) was manufactured to interface the FFC cable and two bipolar-input recording headstages based on RHD2216 digital electrophysiology interface chips (Intan Technologies).

The filter was set to an analogue bandpass of 0.1-6 kHz with a digital filter cutoff of 1 Hz. The single channel sample rate was set to 30 kHz. For hardware control, an Open Ephys acquisition board was used for the communication with other digital devices and the streaming of all the surface electromyography (sEMG) data from the RHD2000 amplifiers. The USB port of the module was linked with a USB cable to pipe the data stream in to and out of the computer.

The recorded data were stored as raw signals from the amplifiers. After filtering with a 60-Hz notch filter, a bandpass filter between 100 Hz and 1000 Hz was applied. Dynamic heat maps showing the spatiotemporal evolution of muscle activities were calculated based on moving averages of the envelope profile (obtained using a second order Butterworth filter with a cutoff frequency of 20 Hz) with a window size of 3.3 ms. Static heat maps were calculated based on the integration of raw EMG activities over time and normalized to assign the color code.

Recording of sEMG on human arms was pre-approved by Institutional Review Board (IRB) at Stanford University (IRB-54795, Noninvasive surface measurement of muscle electrophysiology).

Example 8: Electrophysiological Recording on Octopus

All procedures were approved by the Institutional Animal Care and Use Committee (IACUC) for Stanford University with further guidance from the Marine Biological Laboratories Marine Resource Center. Adult California two-spot octopuses (Octopus bimaculoides) were ordered from Aquatic Research Consultants (San Pedro, CA).

Prior to the experiment, an octopus was anesthetized by adding 2% ethanol into the seawater and transferred to a customized Styrofoam container. During the recording, a 32-channel stretchable array with electrode size of 500 μm and inter-electrode distance of 1500 μm was attached onto one of the octopus's legs. The control probe with a rigid substrate was fabricated using the same procedure as the experimental group but using polyimide of the same thickness as the carrier instead of PDMS. A customized PCB with a 32-channel ZIF connector (500 μm pitch, 50 mm length, Digi-Key) and an Omnetic connector was made for input/output connection. A unipolar-input recording headstage based on a RHD2132 digital electrophysiology interface chip (Intan Technologies) was used for the recording.

Electrical stimulation of the octopus leg was performed by applying a 2-ms long pulse of 8 mA with two electrodes placed near the front and end of the leg using a Model A360 analog stimulus isolator (World Precision Instruments). The filter was set to an analogue bandpass of 0.1-6 kHz with a digital filter cutoff of 1 Hz. The single channel sample rate was set to 30 kHz. The recorded data were stored as raw signals from the amplifiers. A bandpass Butterworth filter between 60 Hz and 800 Hz was applied. Differences between adjacent electrodes on the same row were calculated to plot the peristimulus time histogram (PSTH). The frequency spectra and level of variances were calculated using custom-written code in Python.

Example 9: Electrical Stimulation on Rat

All procedures were approved by the Institutional Animal Care and Use Committee (IACUC) for Stanford University with the protocol number of APLAC-33717 (Soft polymeric electronics for neural interfaces). Female Sprague Dawley rats were ordered from Charles River Laboratories with weight of 150 g at the time of arrival. All rats were housed under 12 h: 12 h light/dark cycles until experiments.

Before the surgery to interface the stretchable electrode array with the brainstem, the rat was deeply anesthetized with isoflurane (2 L/min $O_2$ mixed with 3% isoflurane). The level of anesthesia was continuously monitored based on whisker movements and paw-pinching/eye-blinking reflexes. After anesthesia, the rat head was shaved with its temperature kept at 37° C. with a heating pad. A mid-line skin incision was first made over the craniovertebral junction and the overlying muscles were cut and retracted to expose the occipital bones. An occipital craniotomy was performed using a dental drill, and the dura was peeled using a fine tweezer to ensure a full exposure of the cerebellum and brainstem. Using a surgical cerebral plate, the cerebellum was lifted to expose the floor of the 4th ventricle where a stretchable electrode array was subsequently attached to. To fit the size of the rat brainstem, a 32-channel array with electrode size of 50 μm and inter-electrode distance of 300 μm was used.

After the implantation of the electrode array, subsequent stimulations were performed by applying square wave current pulses of 200 mA for 1 ms through an A-M Systems Model 3800 stimulator coupled with a Model 3820 stimulus isolation unit. Following the localized stimulation through brainstem, EMG signals were simultaneously recorded by inserting needle electrodes at the tongue, whisker, and neck. The recorded signals were amplified by three BioPac electromyogram amplifiers (EMG100C) at a sampling rate of 20 kHz. The recorded data were later processed after a 60 Hz notch filter and a 100-1000 Hz bandpass filter. The activation maps were calculated by normalizing the evoked EMG signals recorded at each muscle group.

Example 10: Immunohistology

Following the implantation of both soft and rigid probes at the brainstem/cerebellum interface for one day, rats were deeply anesthetized and transcardially perfused with saline followed by 4% paraformaldehyde in PBS. The devices were carefully explanted before the brains were removed and fixed in 4% paraformaldehyde in PBS overnight at 4° C. The brains were subsequently dehydrated using gradient washing of ethanol/PBS mixtures and embedded using paraffin. Final blocks were sectioned in the sagittal plane at 8 μm on a Leica microtome (RM2255) and mounted onto glass slides.

For immunohistochemical analysis, slides were first deparaffinized in xylene, and then rehydrated in ethanol/PBS mixtures. The slides were then washed three times in PBS. Next the slices underwent antigen retrieval using 1λ sodium citrate pH 6.0 (100λ diluted in PBS; Abcam) in deionized (DI) $H_2O$. The slices, submerged in the solution, were warmed in a microwave on full power for 90 seconds. One minute later, at 60% power for 60 seconds. One minute later, the slices in solution were places in 4° C. for 30 minutes and subsequently soaked in DI H$_2$O for 5 minutes. The slices were then washed three times in PBS.

Slices were permeabilized for intracellular antigens with 0.2% Trion X-100 (Sigma-Aldrich) for 10 minutes, then washed three times with PBS. A PAP/hydrophobic pen was used to isolate slices. Slices were then blocked with a solution consisting of 5% goat serum (vol/vol; Sigma-Aldrich) in PBS for 2 hours at room temperature in a humidified chamber.

Slices were then incubated for 1 day at 4° C. with primary antibodies in blocking solution. For the first set of markers, GFAP (GA5) Mouse mAb (#3670, 1:50, Cell Signaling) for glial cells and Neurofilament-L (C28E10) Rabbit mAb (#2837, 1:100, Cell Signaling) for neurons were used. For the second set, Ibal/AIF-1 (E404 W) XP® Rabbit mAb (#17198, 1:800, Cell Signaling) for activated microglia and NeuN (E4M5P) Mouse mAb (#94403, 1:100, Cell Signaling) for neurons were used.

Sections were then washed three times with PBS for 30 min and then stained for 2 h at 4° C. with corresponding secondary antibodies (Goat anti-Mouse IgG (H+L) Highly Cross-Adsorbed Secondary Antibody, Alexa Fluor Plus 488, A32723, 1:250, Thermo-Fisher; Goat anti-Rabbit IgG (H+L) Highly Cross-Adsorbed Secondary Antibody, Alexa Fluor Plus 647, A32733, 1:250, Thermo-Fisher). Slices were washed three times with PBS and incubated with DAPI (4'6-diamidino-2-phenylindole) (1:50,000) for 30 min. All fluorescent images were acquired with a laser scanning confocal microscope (Leica SP8) using a 10× air lens.

Example 11: Results

Figure 2A:
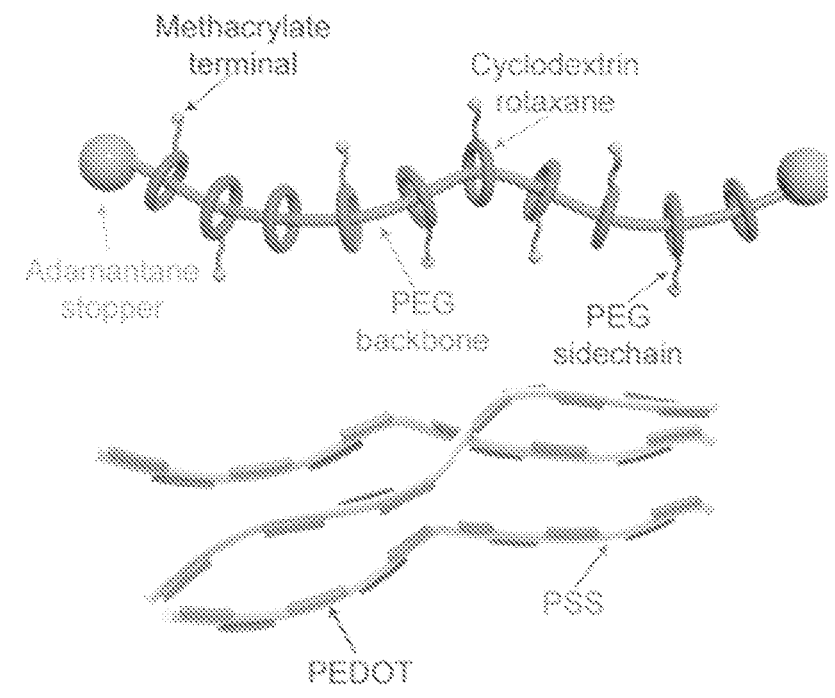
FIGS. 2A-2L show that polyrotaxane-based topological network enables simultaneously enhanced conductivity, stretchability, and photopatternability of PEDOT:PSS.
Figure 2B:
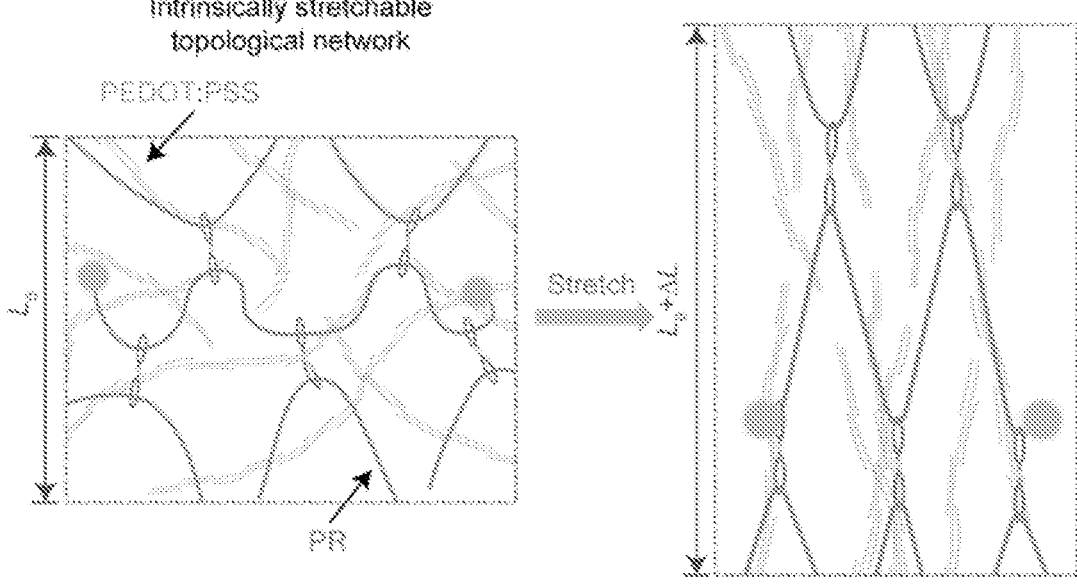

Rationally designed supramolecular networks with tailored topology and chemistry could bring up new dimensions for material innovation and may lead to unique physicochemical characteristics that are otherwise unattainable with traditional methods. In this embodiment, poly(3,4-ethylenedioxythiophene):polystyrene sulfonate (PEDOT:PSS), was used because of its already wide applications in rigid bioelectronic devices (FIGS. 1C-1F). To fit the particular characteristics of PEDOT:PSS, i.e., aqueous suspension of colloidal particles with the PSS-rich shell wrapping around the PEDOT-rich core, a slide-ring supramolecular network made of polyethylene glycol (PEG) based polyrotaxanes (PR) was designed since the pulley-like topology (sliding crosslinkers in PR architectures) and hydrophilic groups (polar polyethers in PEG backbones and sidechains) may enable high stretchability and hydrophilicity in the same polymer, a rare combination for common elastomers (FIGS. 2A-2B).

Figure 5A:
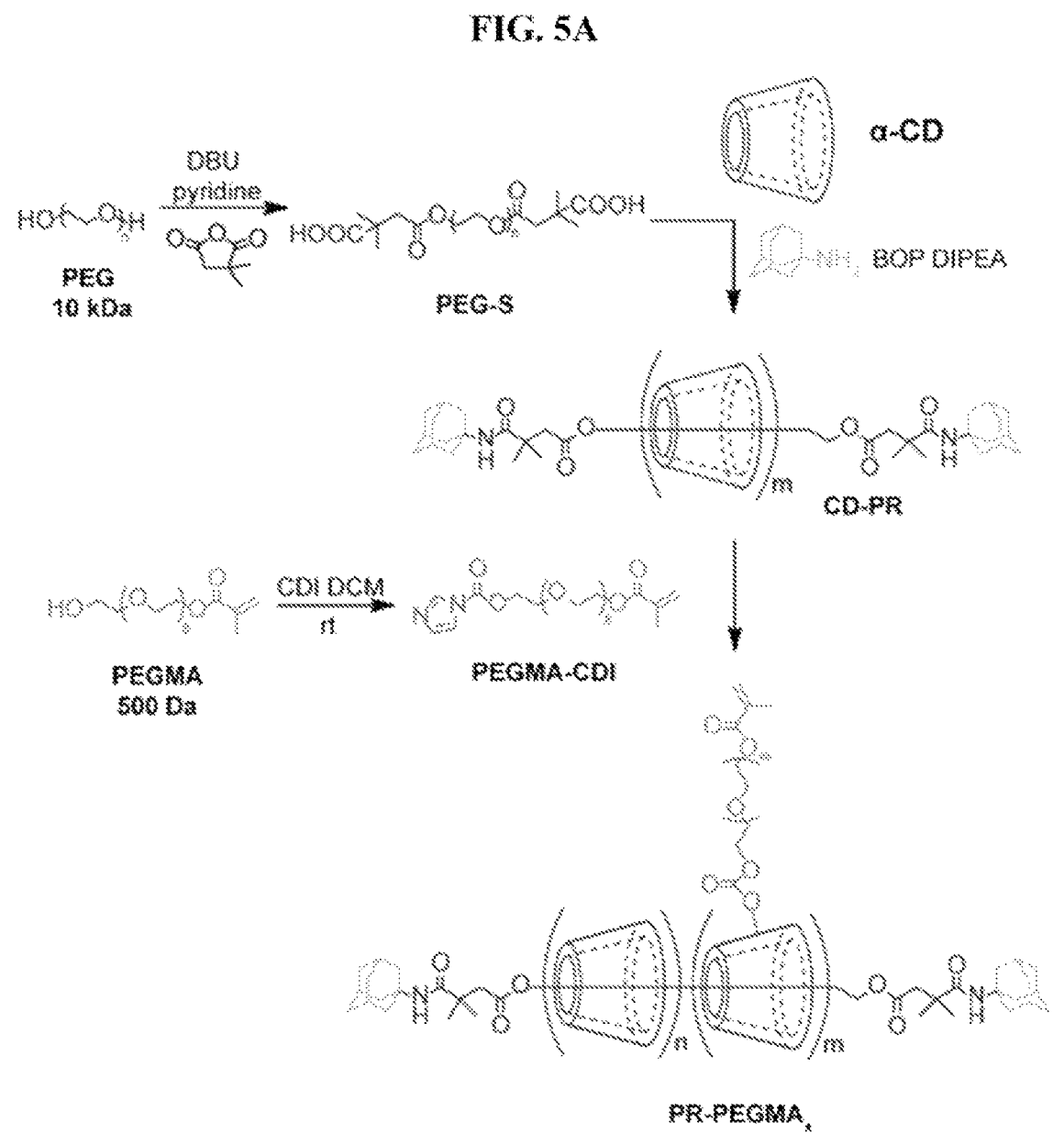
Figure 5B:
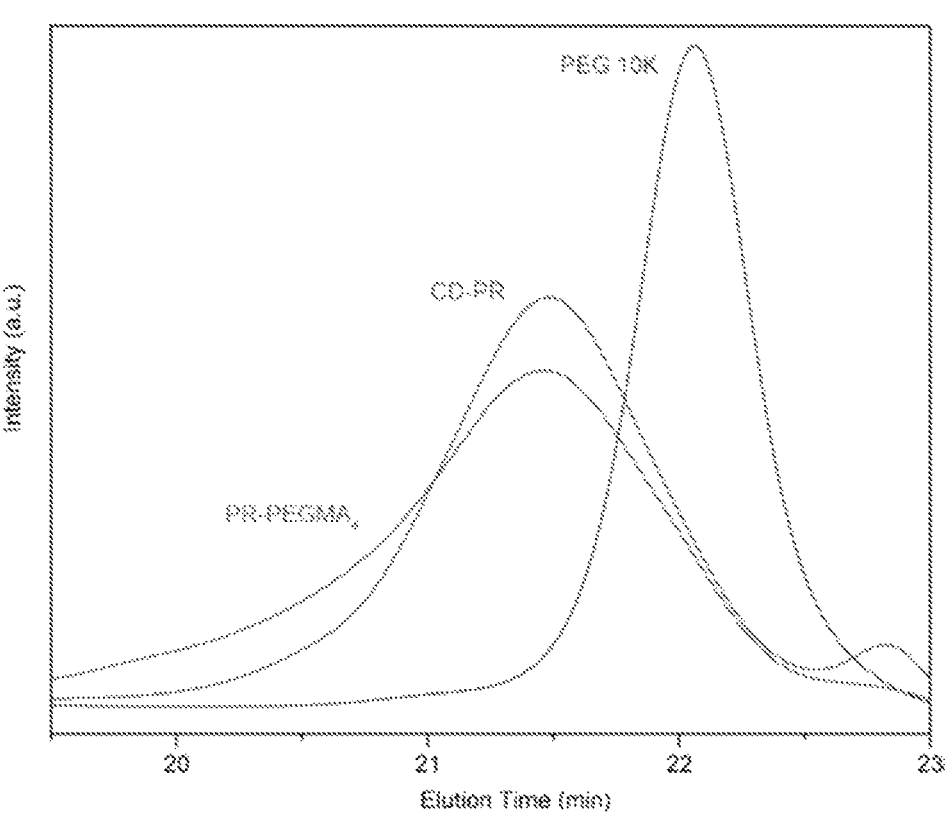
Figure 6:
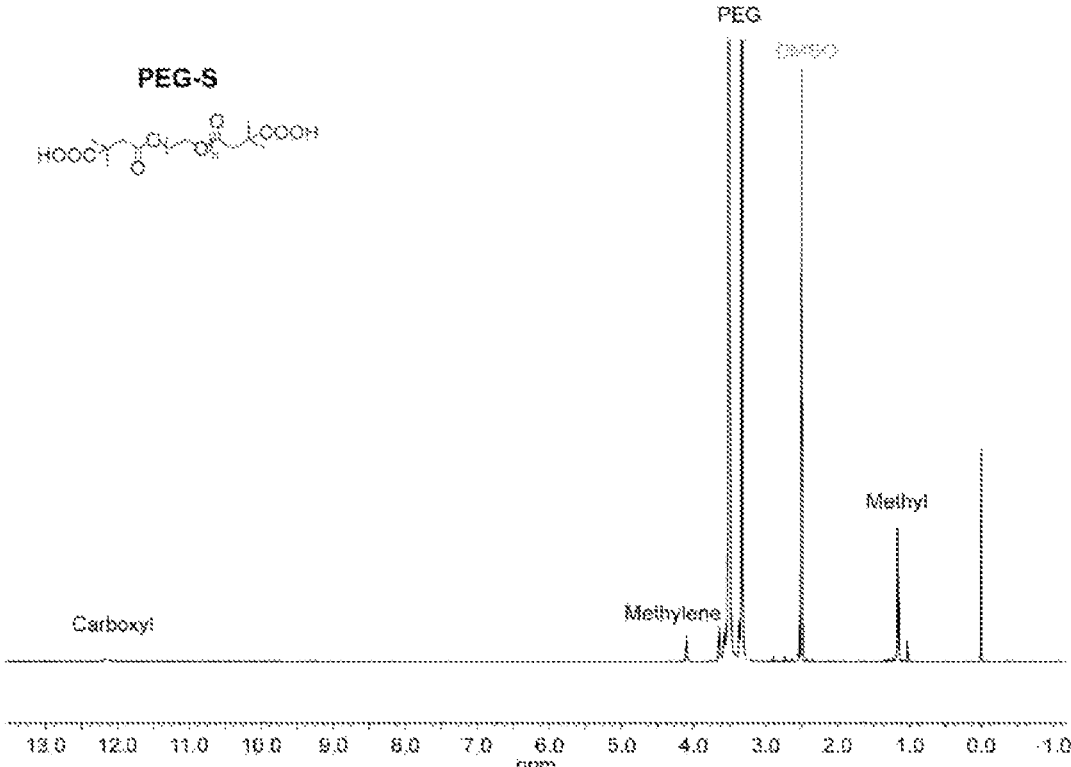
FIG. 6 shows 1H NMR spectrum of PEG-S in DMSO-$d_6$.
Figure 7:
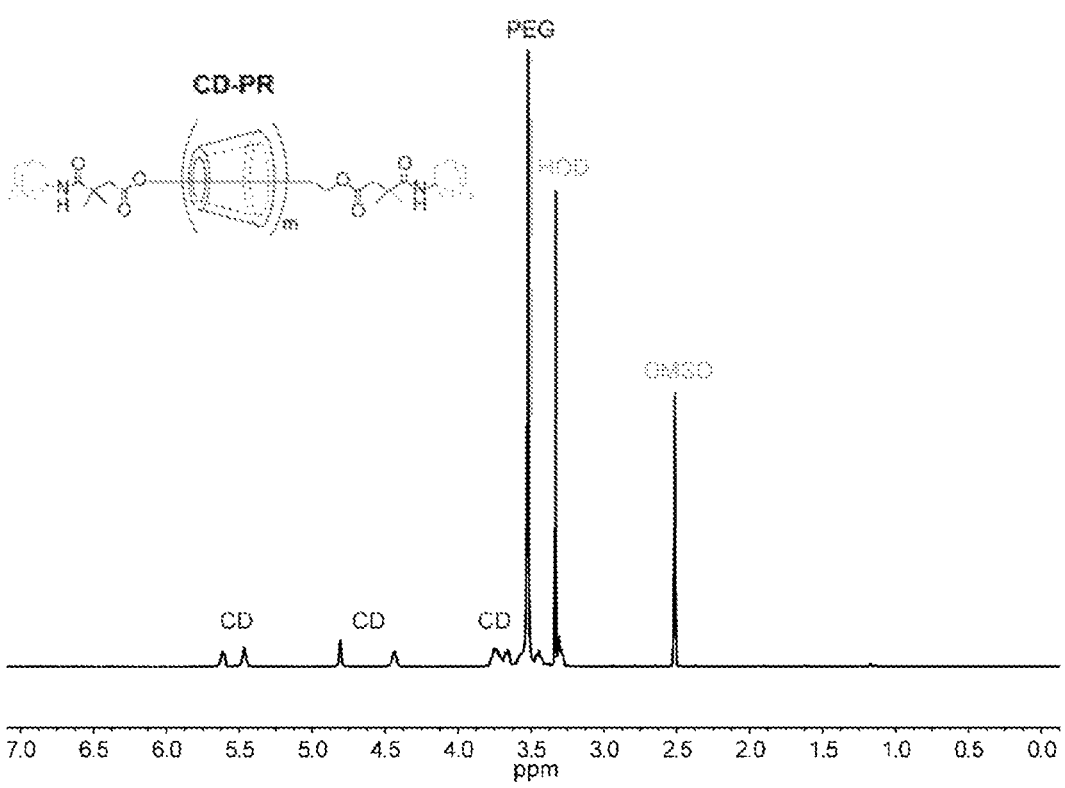
FIG. 7 shows 1H NMR spectrum of PR in DMSO-$d_6$.
Figure 8:
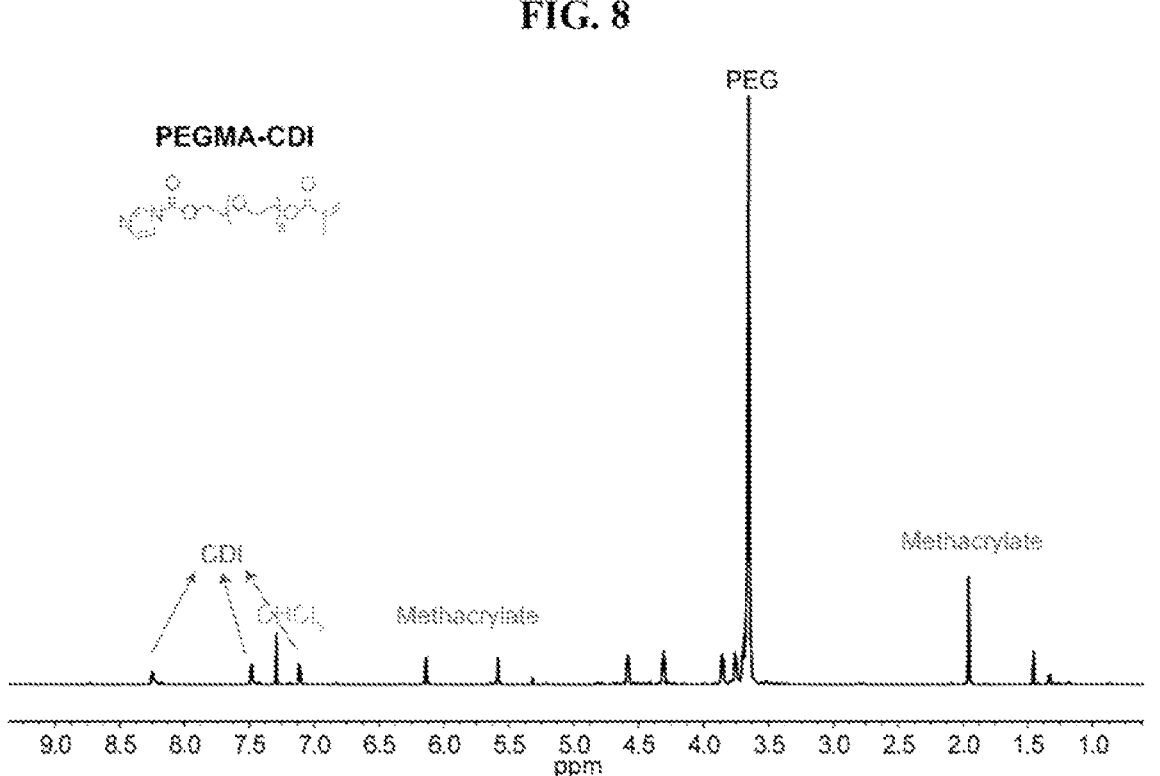
FIG. 8 shows 1H NMR spectrum of PEGMA-CDI in $CDCl_3$.
Figure 9:
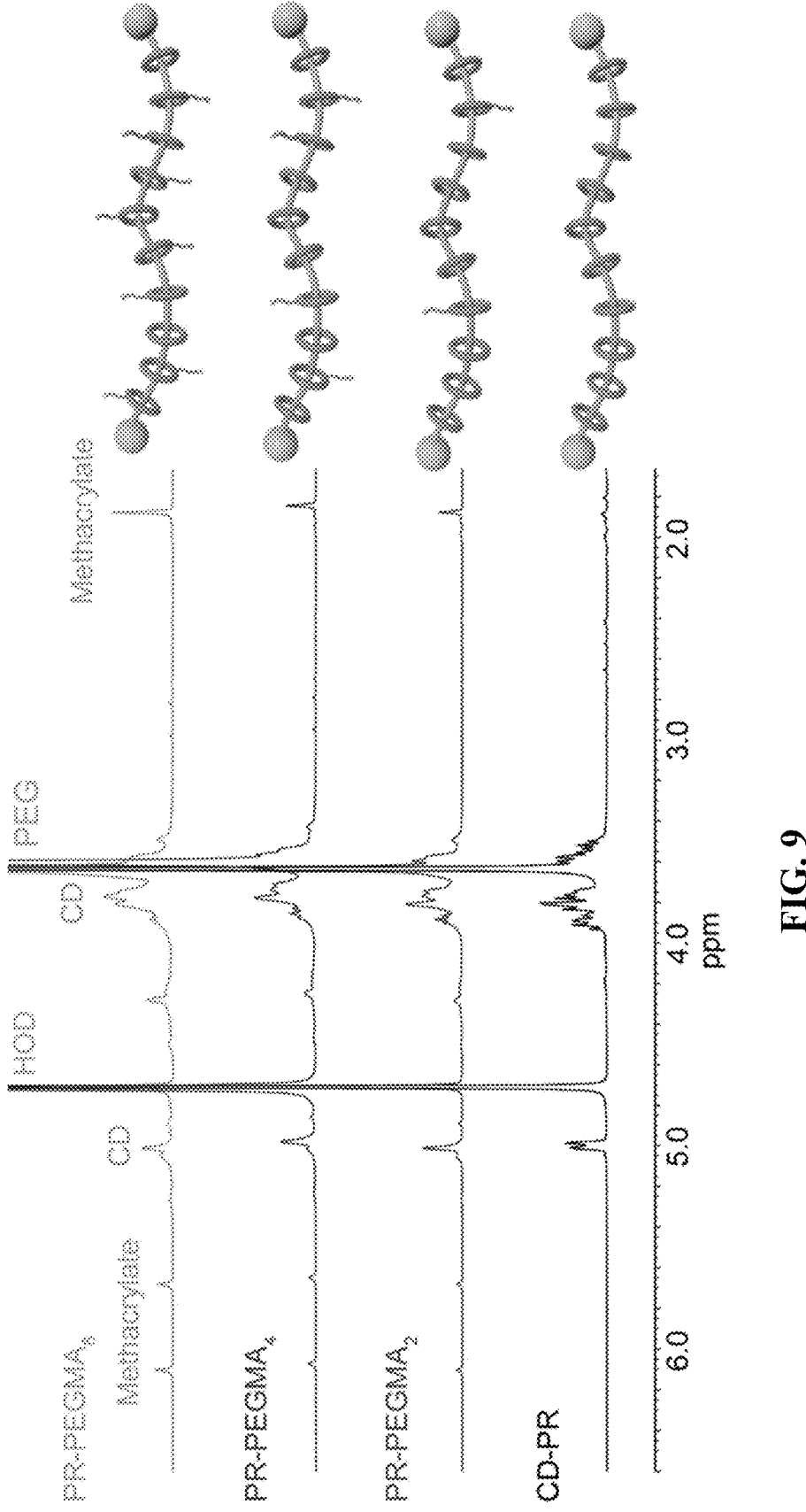
FIG. 9 shows 1H NMR spectra of PR-PEGMA with different number of sidechains in $D_2O$.
Figure 10:
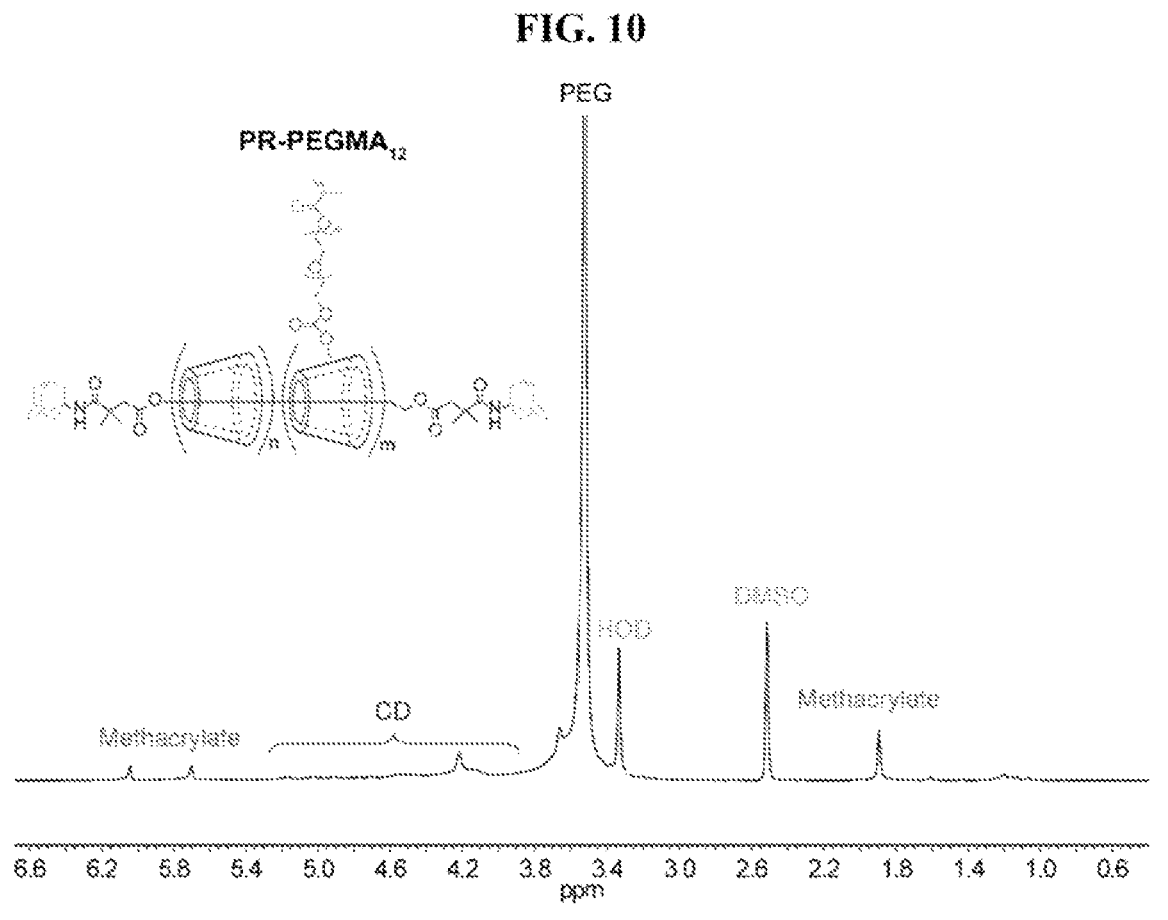
Figure 11A:
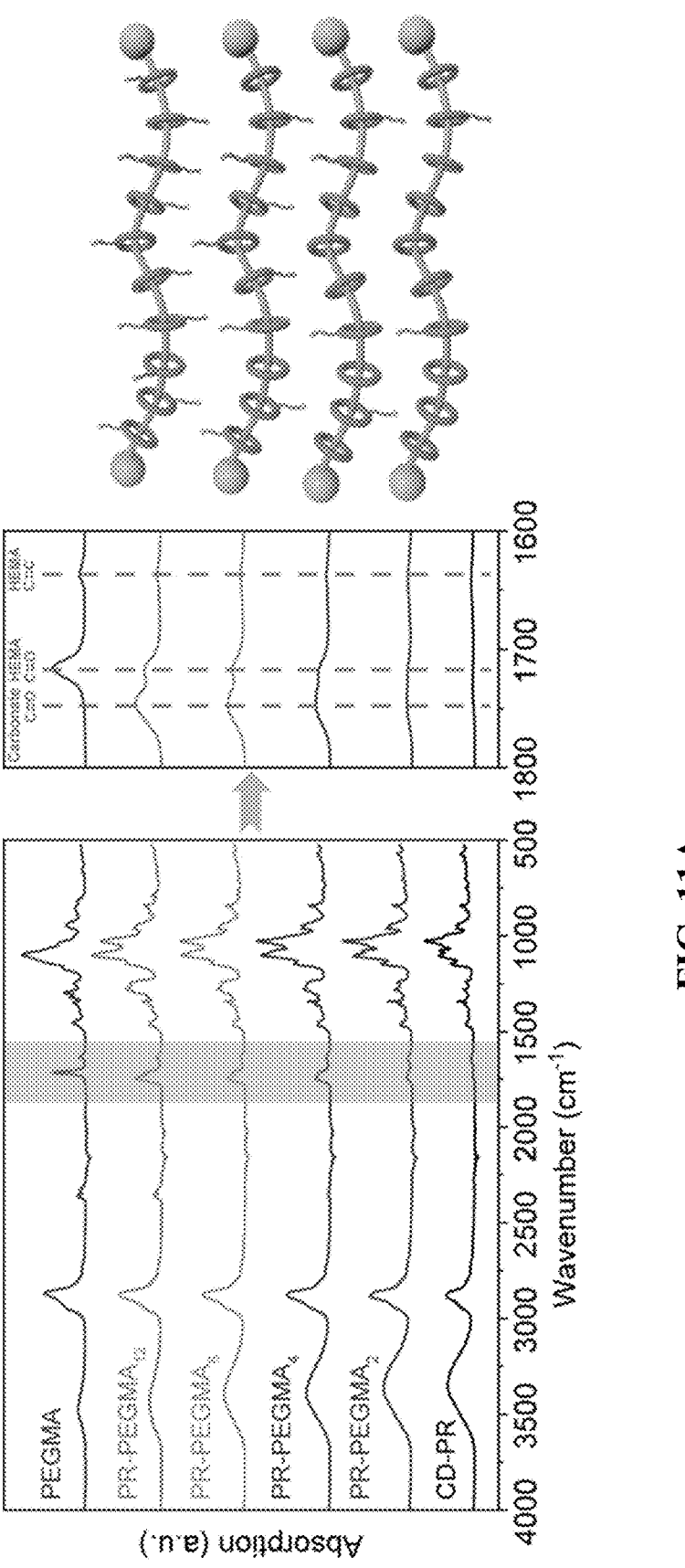
FIGS. 11A-11B shows FT-IR (FIG. 11A) and 1H NMR spectra (FIG. 11B) of PR-PEGMA with different number of sidechains.
Figure 11B:
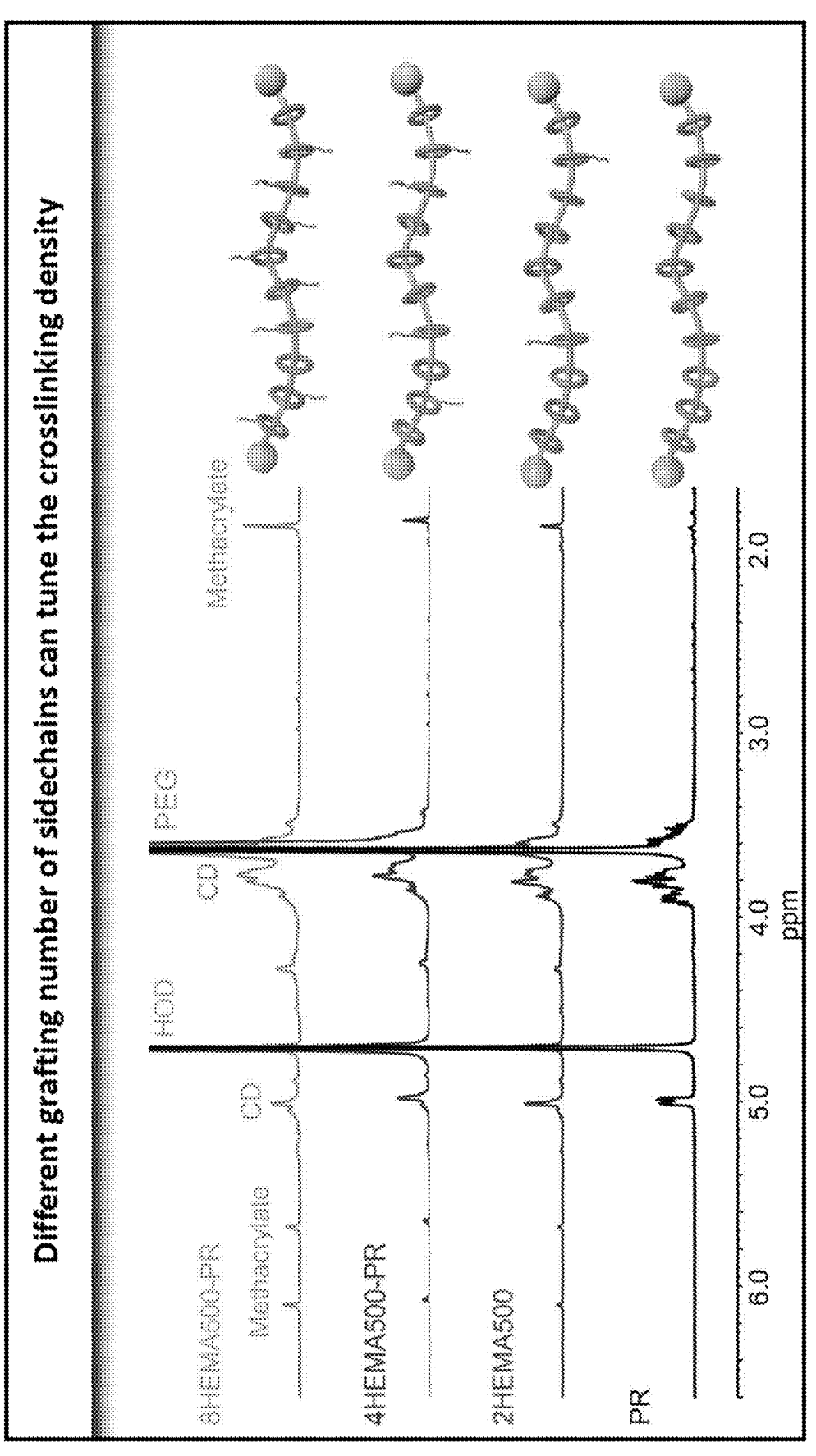
Figure 12:
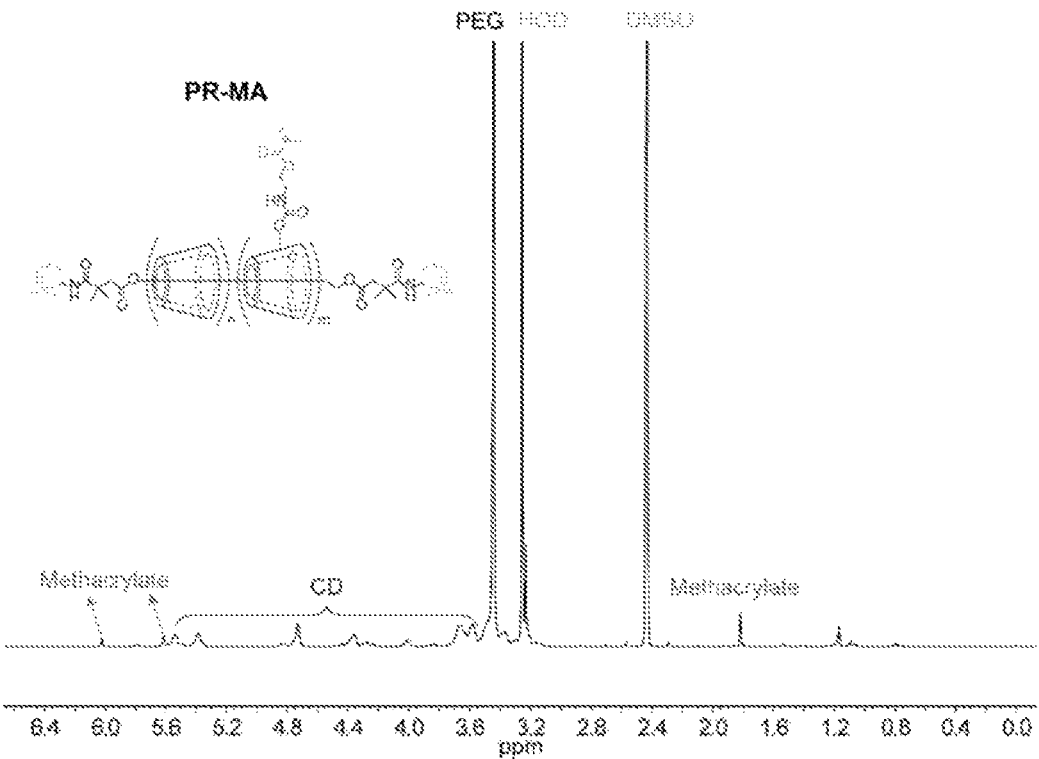
FIG. 12 shows 1H NMR spectrum of PR-MA in DMSO-$d_6$.
Figure 13:
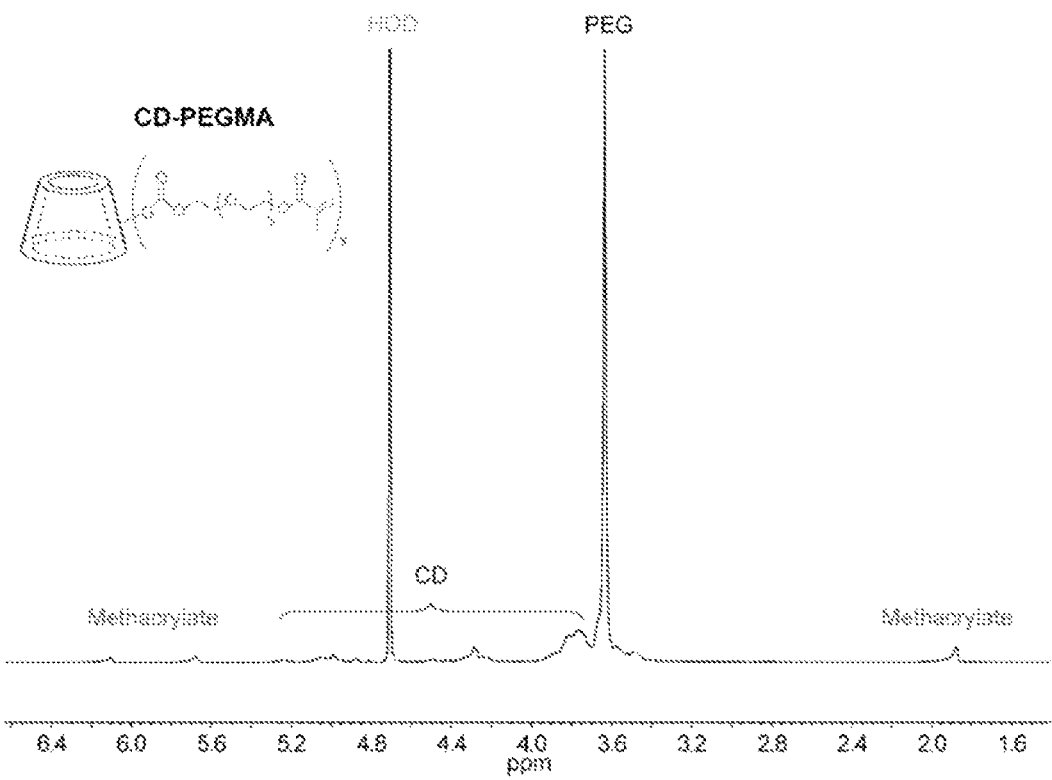
FIG. 13 shows 1H NMR spectrum of CD-PEGMA in $D_2O$.

To prove the hypothesis, a model PR monomer was synthesized. The model PR monomer, named polyrotaxane polyethylene glycol methacrylate (PR-PEGMA), includes a PEG backbone, adamantane stoppers, cyclodextrin rings, pendant PEG sidechains, and methacrylate terminals (FIGS. 5A-5B). Notably, because of the modular nature of the PR design, it allows facile control of individual building blocks for detailed mechanistic investigations (FIGS. 6-13). To form the topological network, after blending PR-PEGMA with pristine PEDOT:PSS, ultraviolet (UV) light was used to crosslink the composite thin film and water to remove unreacted monomers.

Figure 2C:
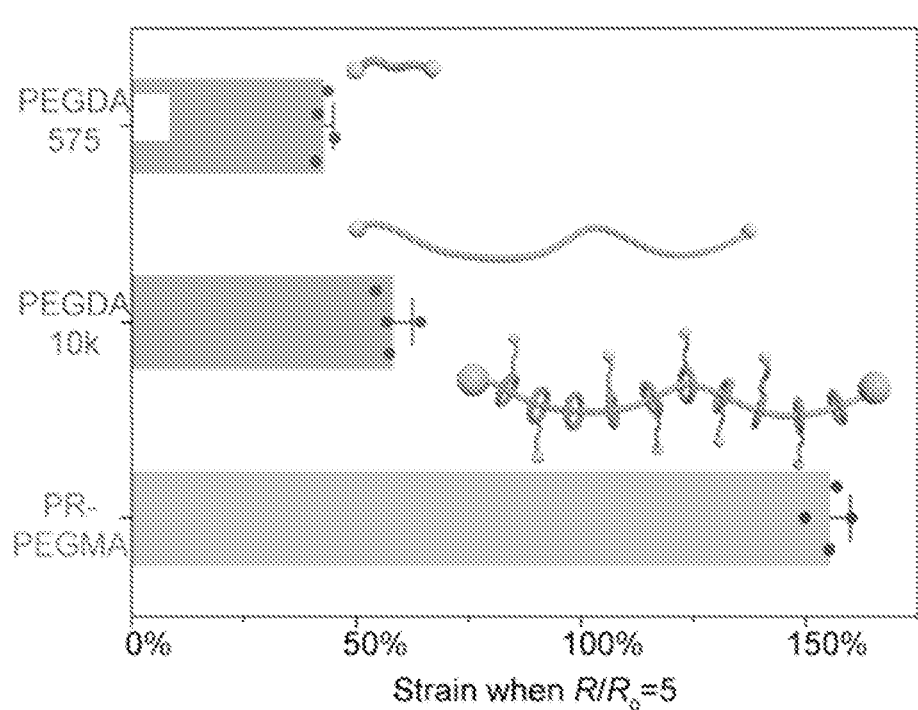
Figure 2D:
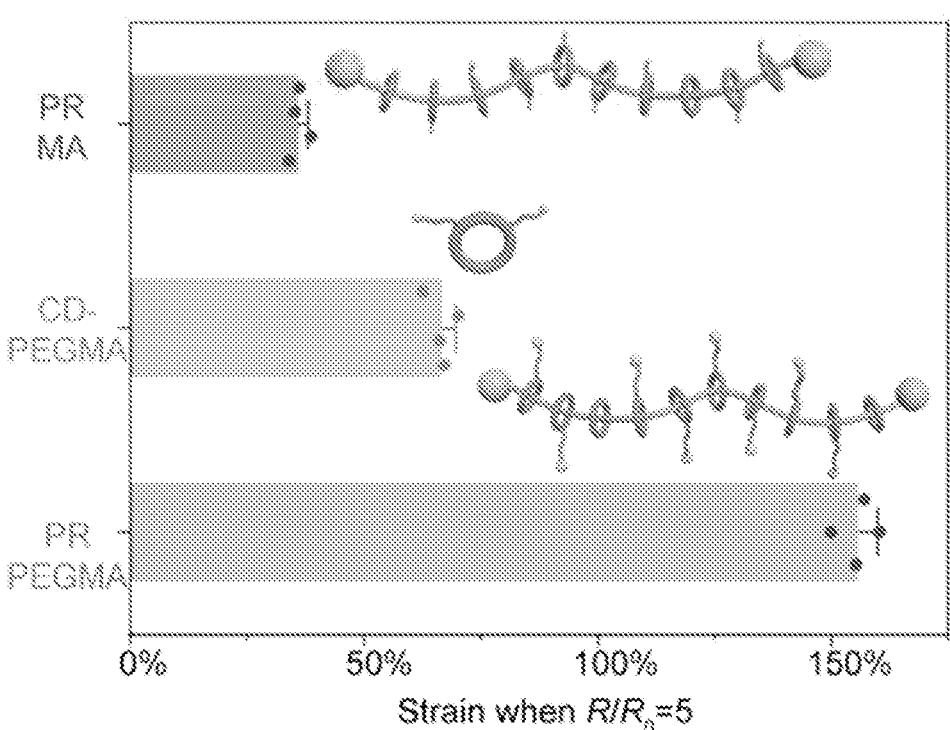
Figure 14A:
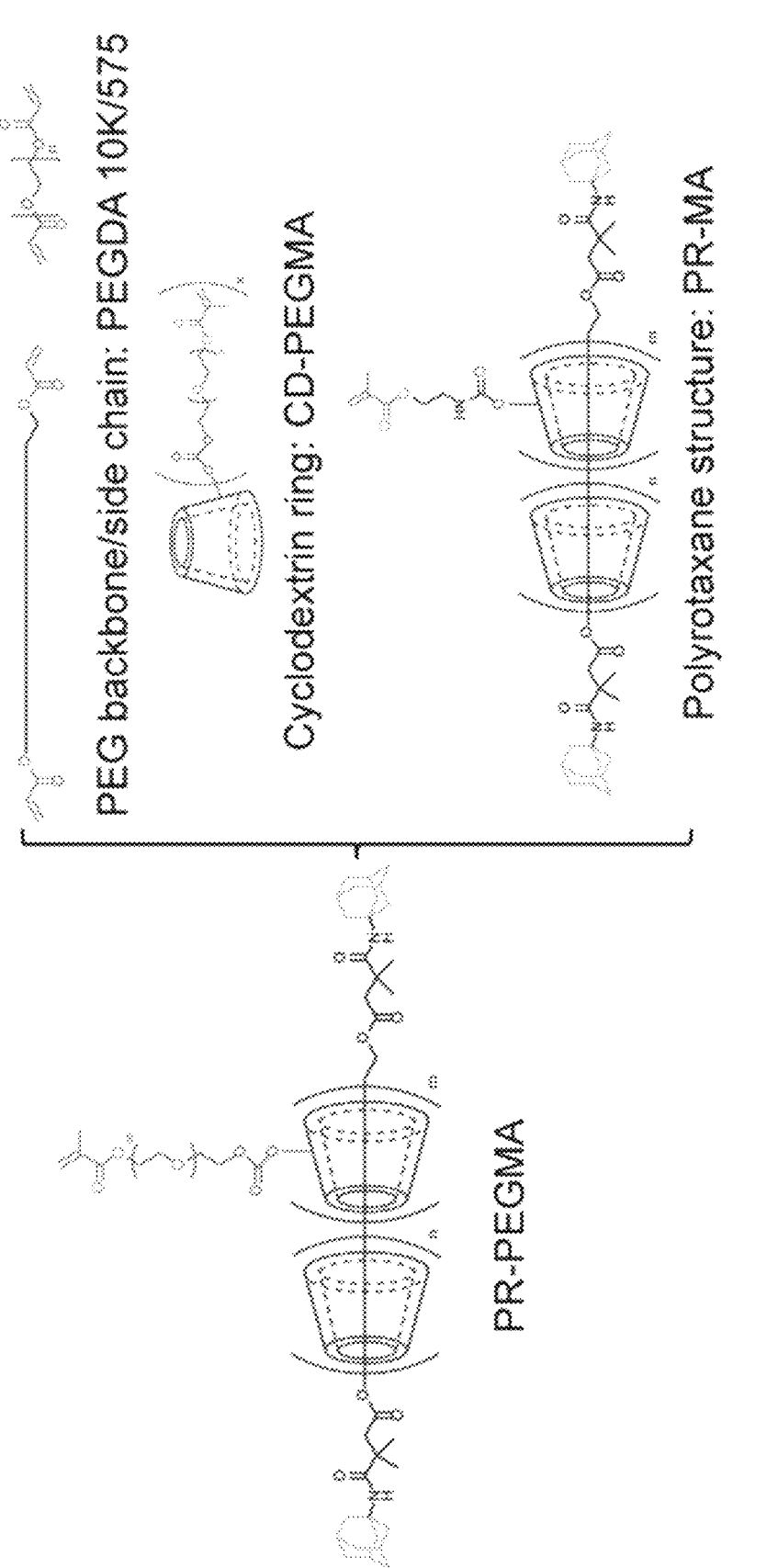
FIGS. 14A-14B show stretching tests of PEDOT:PSS blended with PR-PEGMA and control samples mimicking individual building blocks.
Figure 14B:
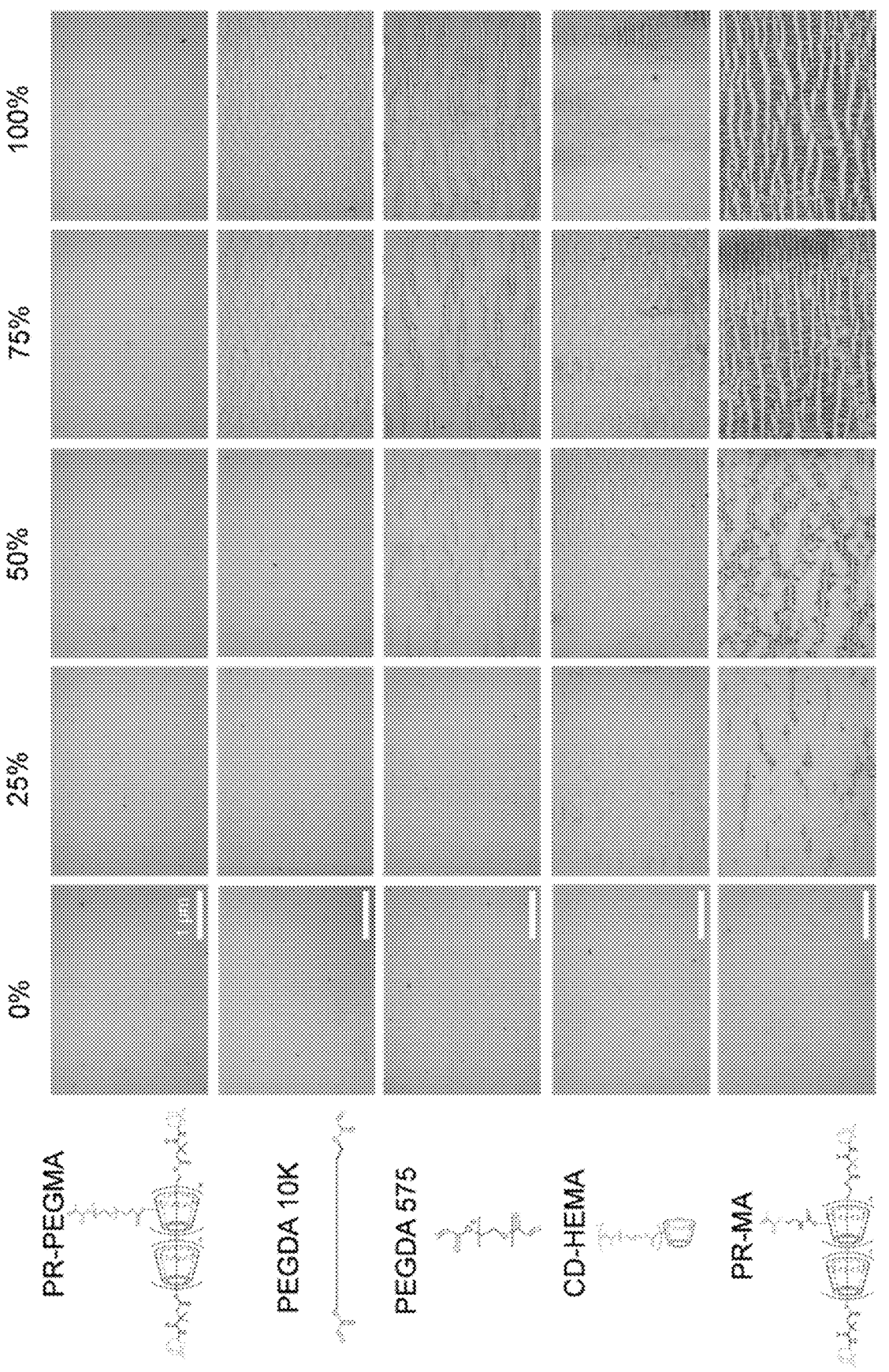
Figure 15A:
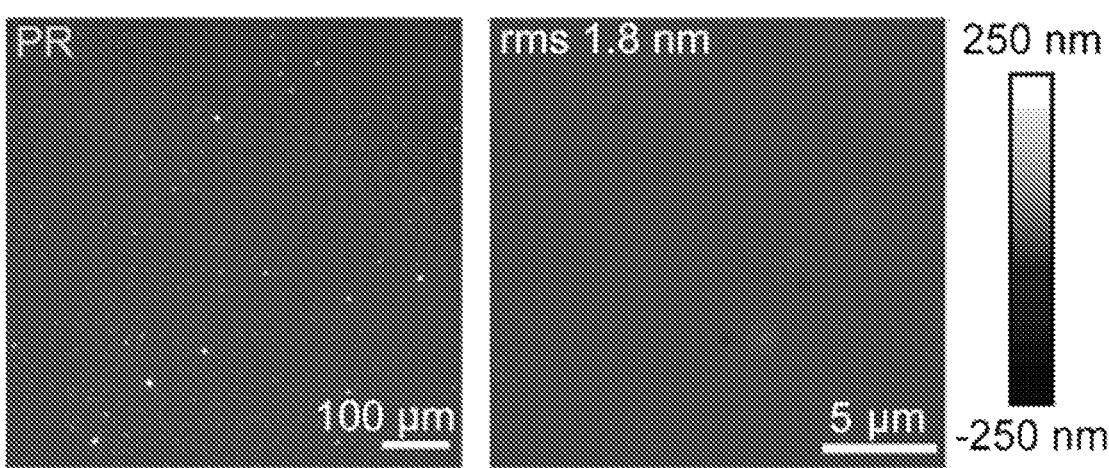
FIGS. 15A-15B show dark field optical microscope and AFM images of PR-PEGMA (FIG. 15A) and PEGDA (FIG. 15B) blended PEDOT:PSS films. Due to the high degree of crystallization of PEGDA, the as-blended film had significantly higher surface roughness than the PR-PEGMA film.
Figure 15B:
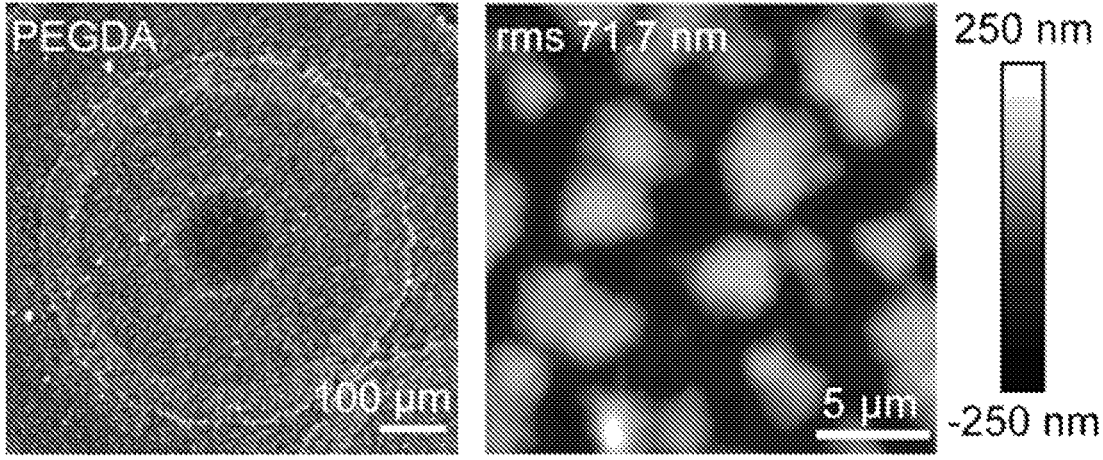
Figures 16A, 16B:
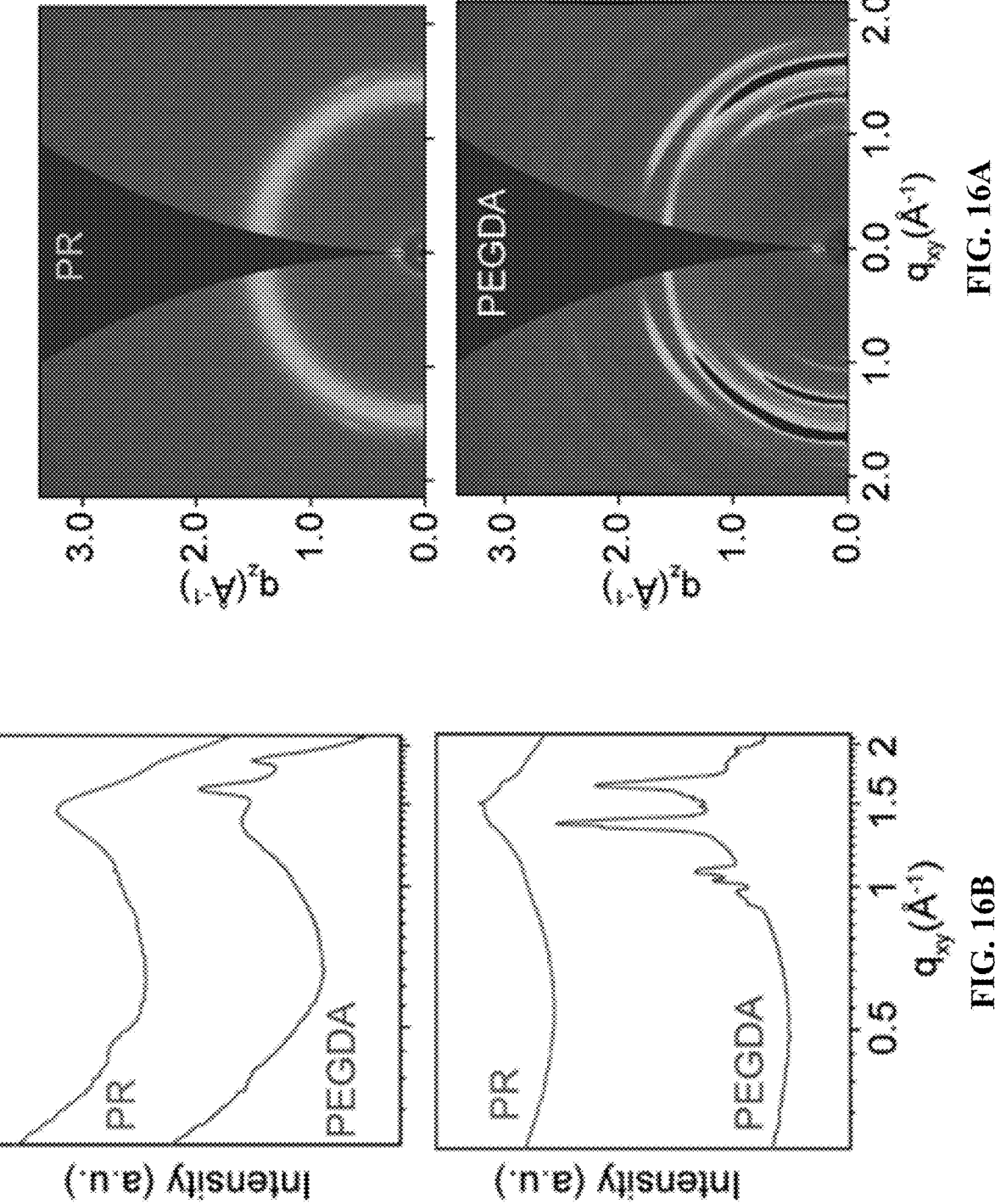
FIGS. 16A-16C show GIXD and DSC spectra of PR-PEGMA and PEGDA blended PEDOT:PSS films. Compared to PR-PEGMA, the PEGDA film has significantly higher crystallinity as evidenced by the strong diffraction peaks (FIGS. 16A-16B) and melting heat (FIG. 16C).
Figure 16C:
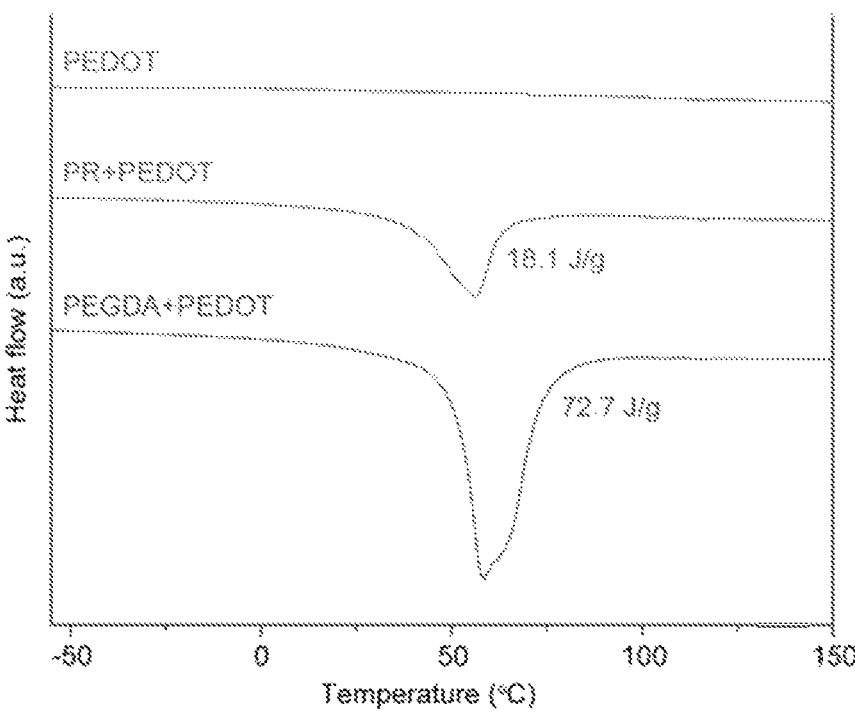

Using both optical imaging for microscopic investigation of crack formation and resistive measurement for bulk characterization of conductivity, control samples of backbone and sidechain analogs, i.e., PEGDA 10k and PEGDA 575, were first tested. First, simple blending of PEDOT:PSS with PEGDA 575 could only slightly boost the stretchability from ~5% to ~30% with significant cracks and huge increases of resistance at higher strains (FIG. 2C, and FIGS. 14A-14B). Even using higher molecular weight (e.g., 10k vs 575) to reduce the crosslinking density, the overall crack onset strain was still less than 50% (FIG. 2C, and FIGS. 14A-14B). Further analysis using atomic force microscopy (AFM) and grazing incident X-ray diffraction spectroscopy (GIXD) revealed that the spin coated PEDOT:PSS/PEGDA film was not at all homogeneous but rather had severe microphase separations (FIGS. 15A-15B and FIGS. 16A-16C). Because of the high affinity of PEG to aggregate, the PEGDA phase tends to form large crystallinity domains, which not only reduces the overall stretchability but also makes the film too rough for later fabrication processes (FIGS. 16A-16C). With only PEGylated cyclodextrin ring, its overall solubility in water was too low for uniform blending with PEDOT:PSS such that the final film stretchability was also sub-par (FIG. 2D, FIGS. 14A-14B).

Figure 17:
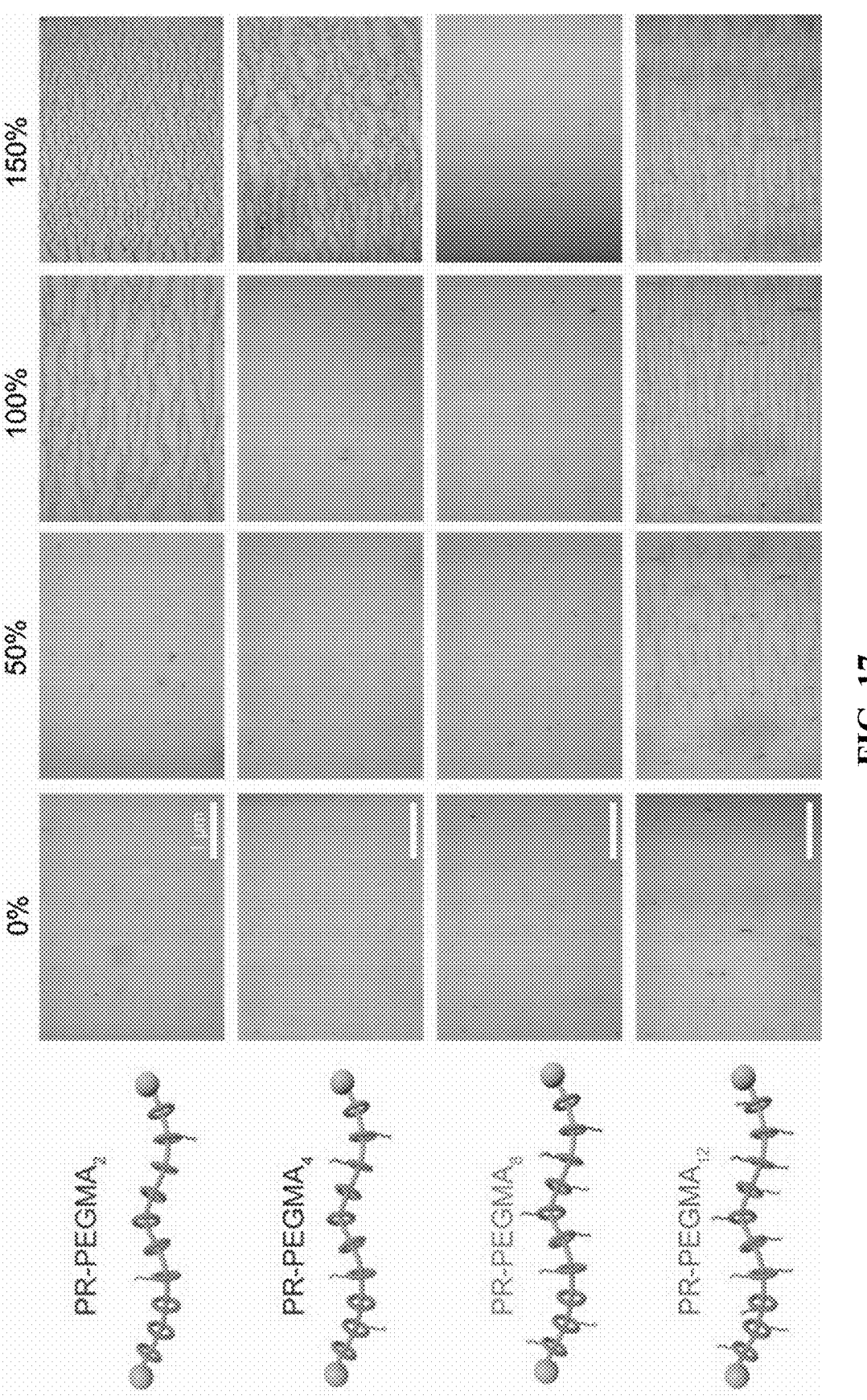
FIG. 17 shows stretching tests of PEDOT:PSS blended with PR-PEGMA of different number of side chains. Optical microscope images of different PEDOT:PSS films show the crack formation under strain. PR-PEGMAs has better stretchability than other samples.
Figure 18:
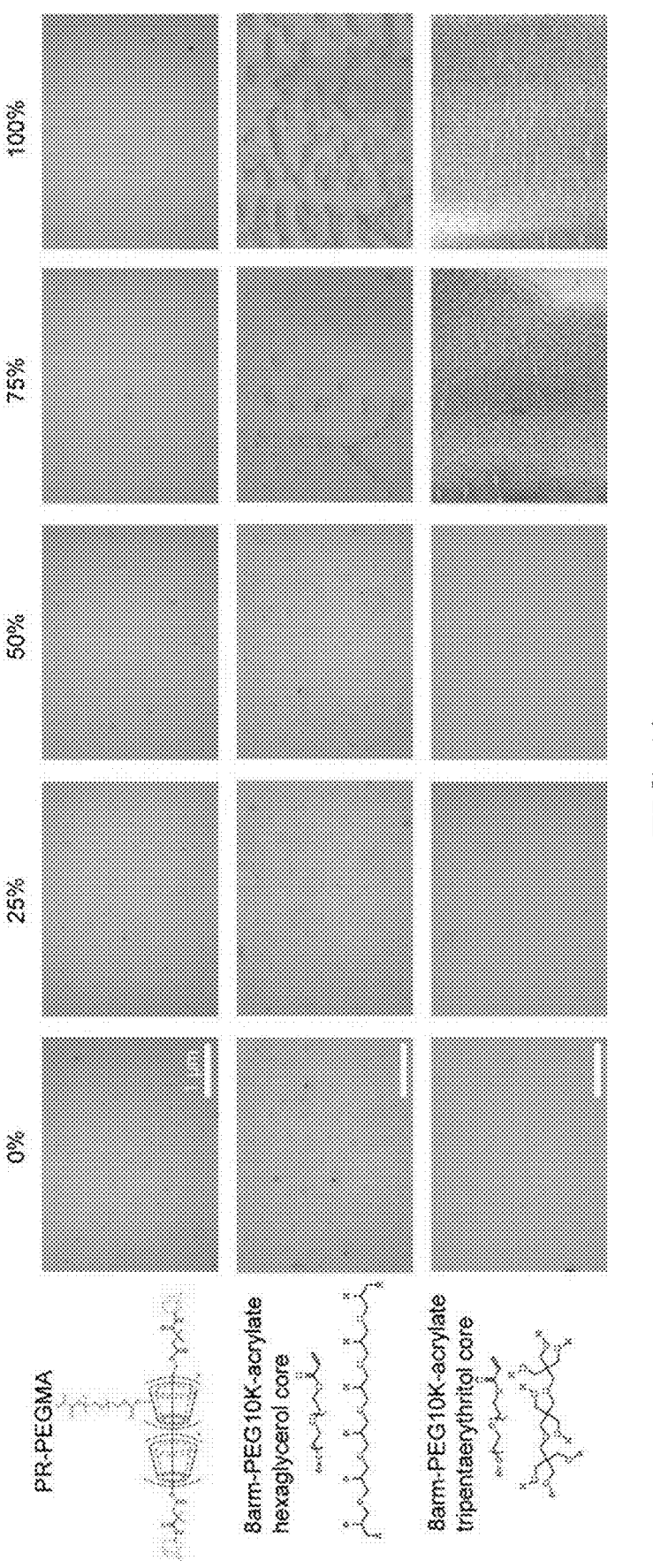
FIG. 18 shows stretching tests of PEDOT:PSS blended with PR-PEGMA and multi-arm PEGDA samples. Optical microscope images of different PEDOT:PSS films showing the crack formation under strain. Multi-arm PEGDA samples did not promote the film stretchability.

On the other hand, because of the unique balance between molecular topology and chemical polarity of PR-PEGMA, it has a good aqueous solubility (PEG-based backbone and sidechains) with low crystallinity (disrupted packing due to cyclodextrin rings). As a result, the blended film had a highly uniform surface profile and outperformed all control samples with substantial margins. When comparing PR-PEGMA with different number of sidechain PEGs (e.g., 2, 4, 8, 12 per molecule), PR-PEGMAs showed the best performance because the larger number of crosslinking sites allowed more efficient retention of the monomer after development to promote the film stretchability (FIG. 17). When the number of pendant PEG was too high, e.g., 12, the strong intra-molecular hydrogen bonding between sidechains made the entire molecule less water soluble and ineffective in boosting the stretchability of PEDOT:PSS (FIG. 17). Similarly, for PR-MA that had no sidechain PEG at all, it cannot dissolve well in water to ensure a good blending with PEDOT:PSS (FIG. 2C, FIGS. 14A-14B). Finally, other common multi-arm PEGDA derivatives were tested, and only the PR topology was effective in promoting the stretchability of PEDOT:PSS because of its favored crystallinity and water solubility (FIG. 18).

Figure 2E:
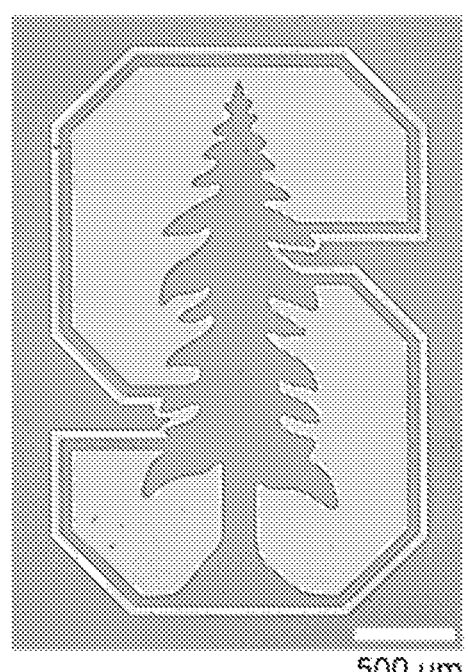
Figure 2F:
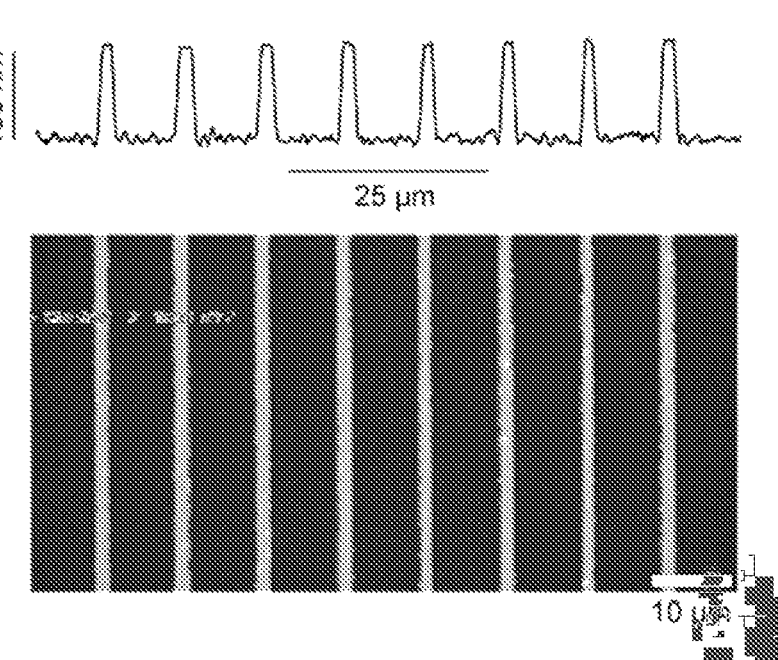
Figure 19:
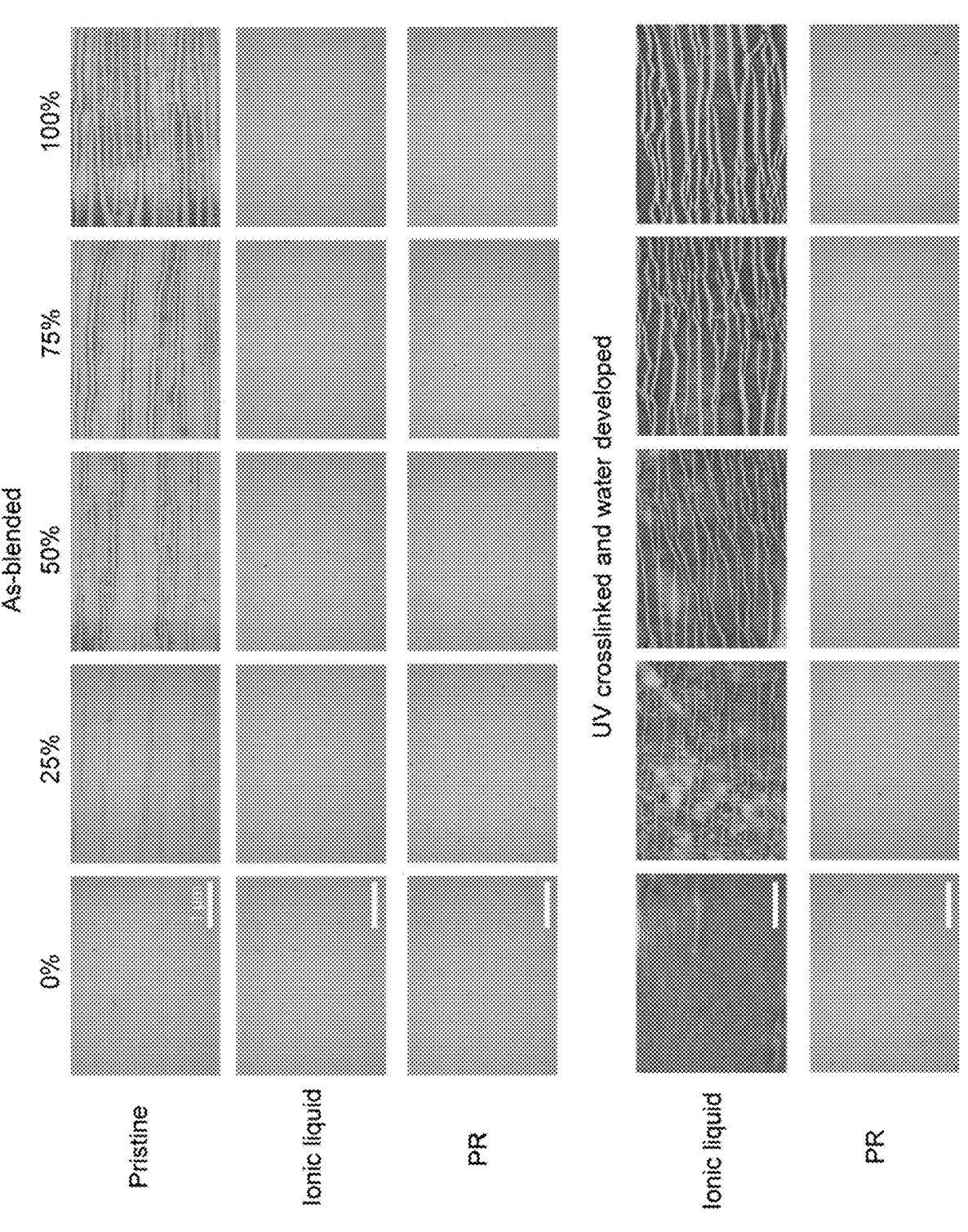
FIG. 19 shows stretching tests of PEDOT:PSS blended with PR-PEGMA and ionic liquid. Optical microscope images of different PEDOT:PSS films show the crack formation under strain. Ionic liquid promoted the stretchability of PEDOT:PSS right after blending. However, ionic liquid leached out after water development and the entire film completely lost its stretchability. On the other hand, crosslinked PR was well preserved in the film for prolonged film stretchability.
Figure 20:
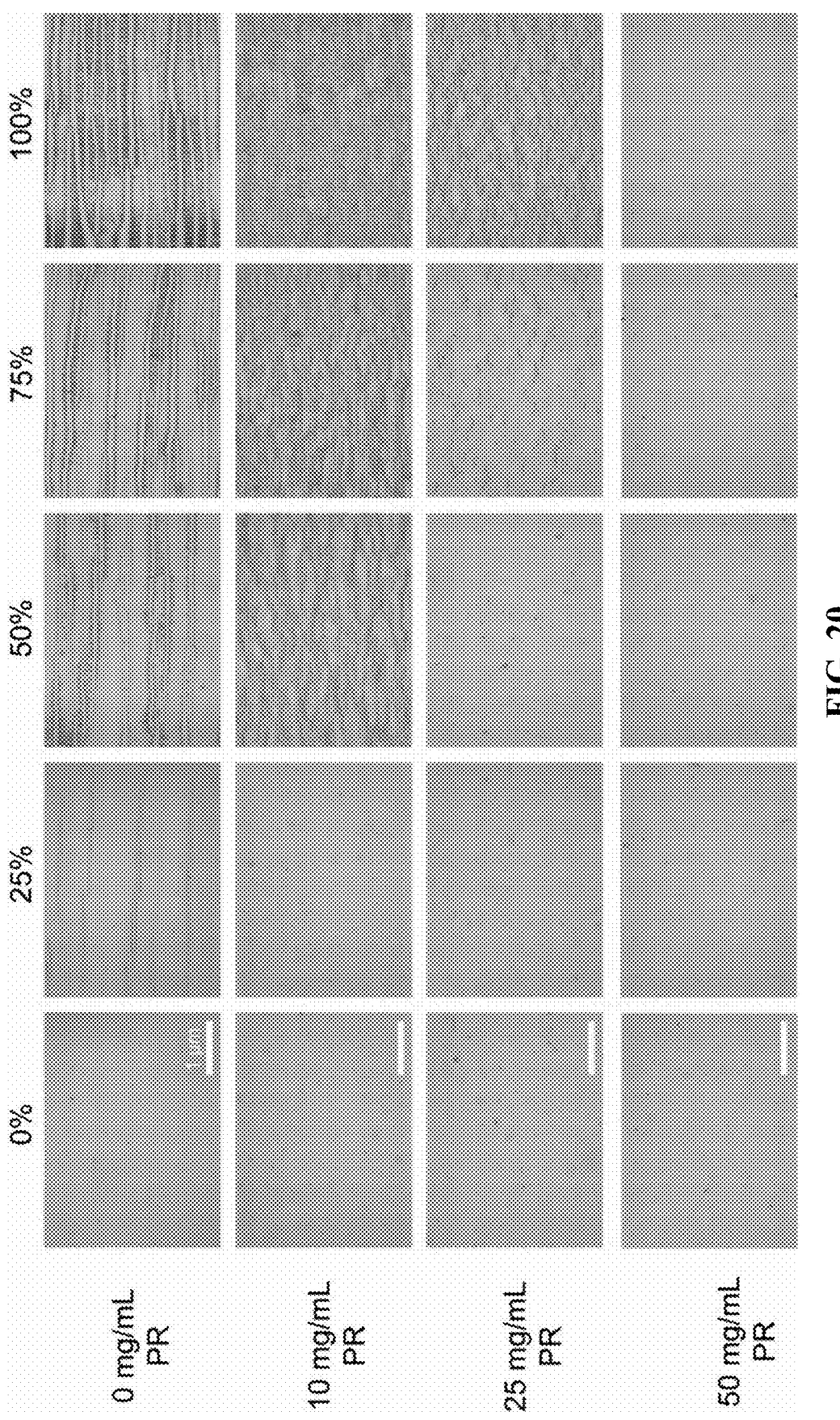
FIG. 20 shows stretching tests of PEDOT:PSS blended with PR-PEGMA of different concentrations. Optical microscope images of different PEDOT:PSS films showed the crack formation under strain. The more PR added to the PEDOT:PSS solution, the higher the film stretchability.
Figure 21:
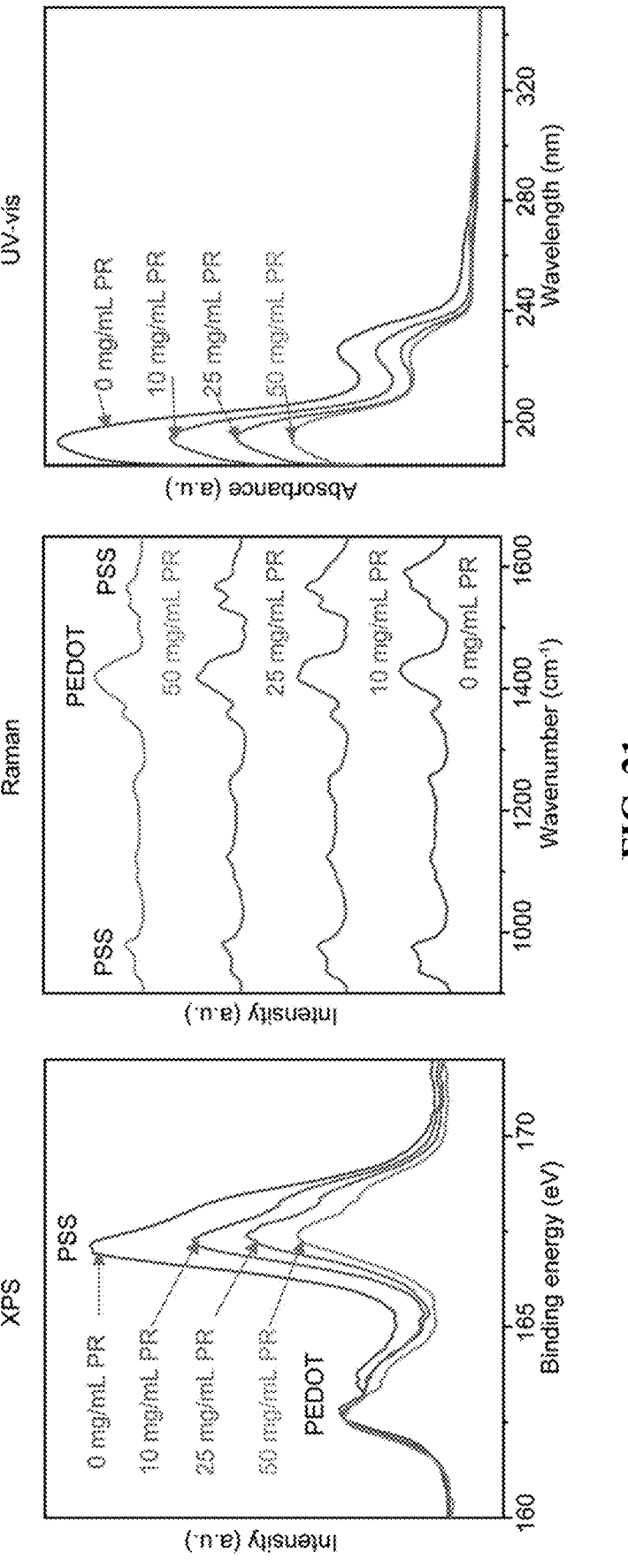
FIG. 21 shows XPS, Raman, and UV-vis spectra of PEDOT:PSS films blended with PR of different concentrations. All three measurements confirmed the same trend that PR induced the removal of PSS from PEDOT.

Compared to previous strategies using small molecular plasticizers to promote PEDOT:PSS stretchability, the topological network design had pronounced improvements even with control samples (FIG. 19). In the system, because the monomeric additives were immobilized as a dense mesh, the enhanced performance of PEDOT:PSS could be well maintained even after solvent treatment. Moreover, the photo-crosslinking chemistry also enabled direct photopatterning of the conducting material with spatially defined physical entanglement (FIG. 2E). Using water as a developer to remove the unexposed PR-PEGMA and PEDOT:PSS, fine patterns with ~2 μm feature sizes could be resolved, allowing easy fabrication of high resolution bioelectronic devices (FIG. 2F).

Figure 2G:
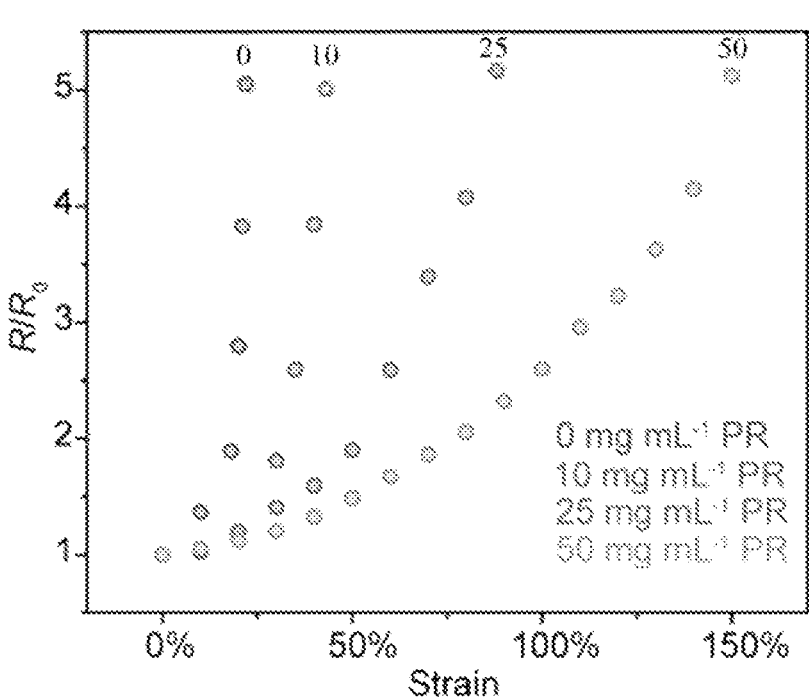
Figure 2H:
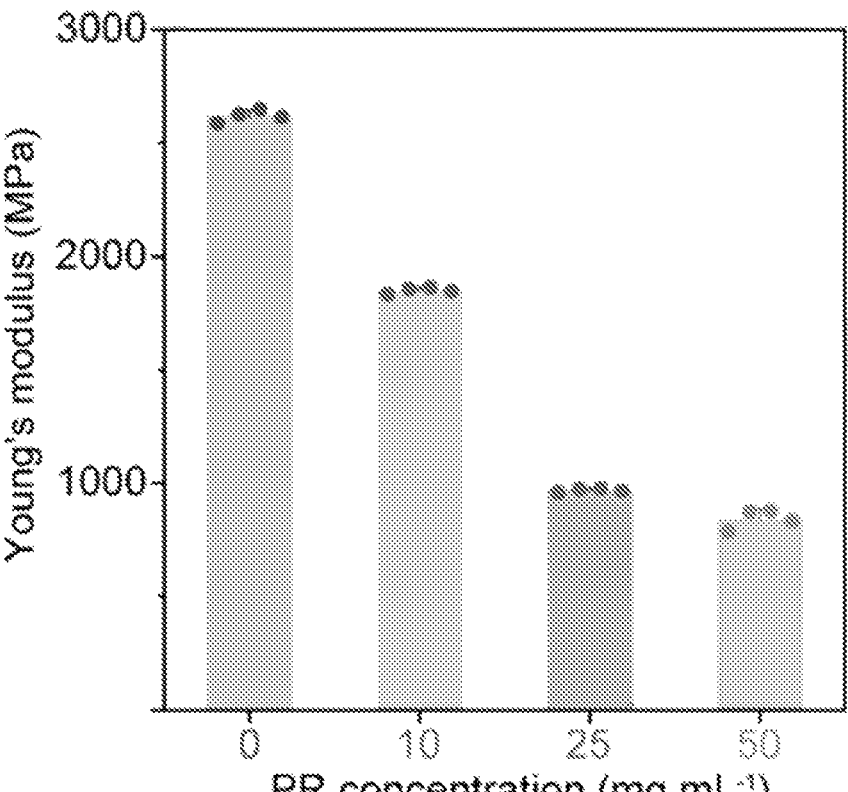

Aside from the stretchability and photopatternability, another importance aspect of PEDOT:PSS for bioelectronic applications is its conductivity. Since PR-PEGMA itself is not electronically conductive, it was still unknown whether the enhanced stretchability of PEDOT:PSS could be achieved only at a cost of reduced conductivity. To this end, a series of samples with different blending ratios of PR-PEGMA versus PEDOT:PSS were prepared, their overall conductivity and stretchability were characterized using bulk electrical and mechanical measurements in conjunction with microscopic and spectroscopic analysis. As expected, stretchability tests showed that the more PR-PEGMA was blended, the better the stretchability of the film (FIG. 2G, FIG. 2O). In the meantime, nanoindentation measurements also gave a decreasing trend of the film modulus with higher ratios of PR-PEGMA in the system (FIG. 2H).

Figure 2I:
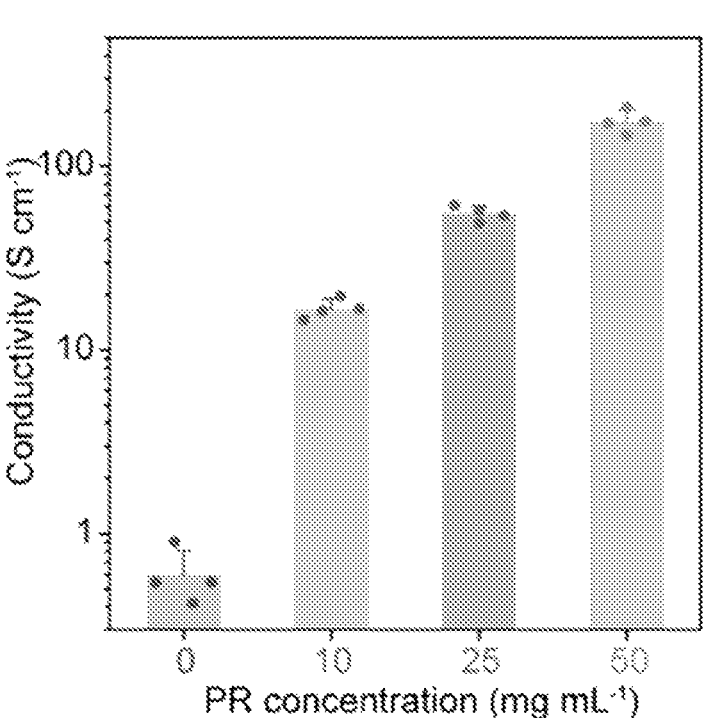
Figure 2J:
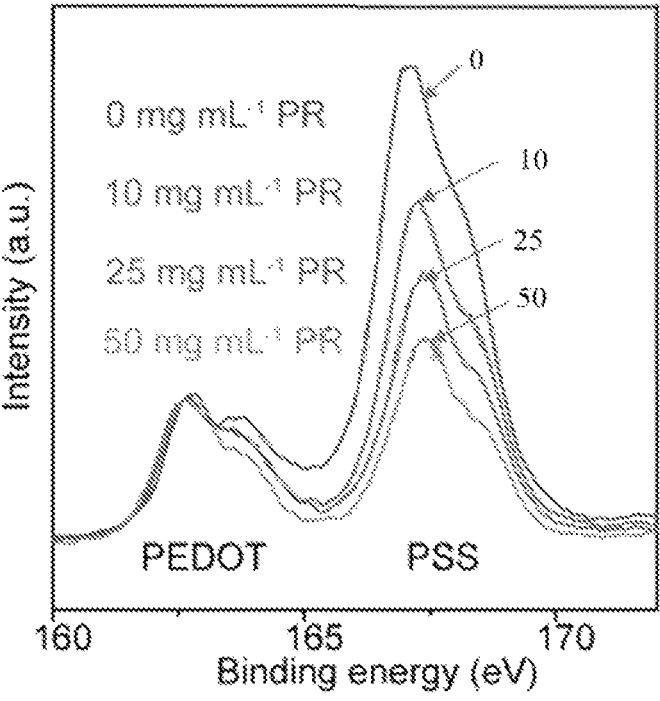
Figure 2K:
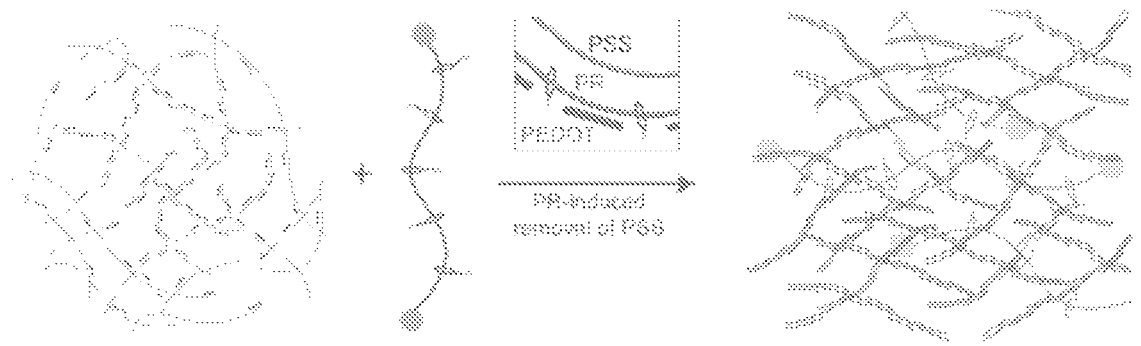
Figure 22A:
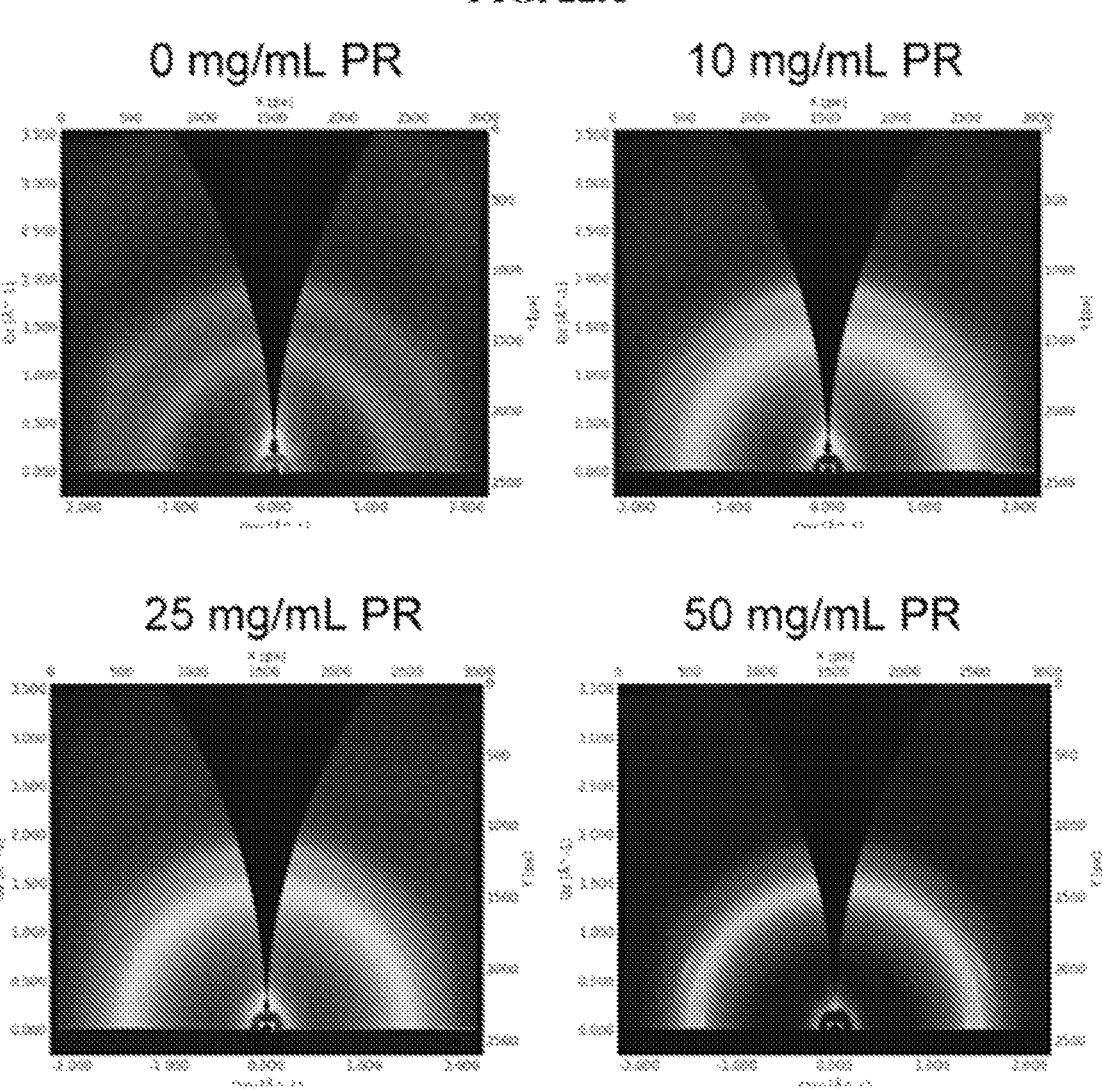
Figure 22B:
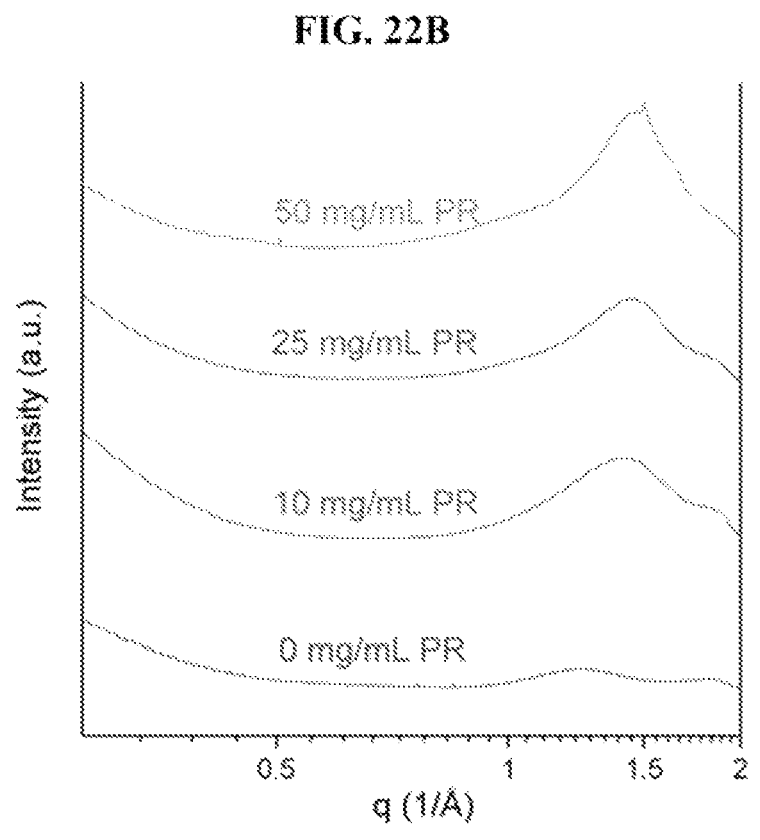
Figure 23:
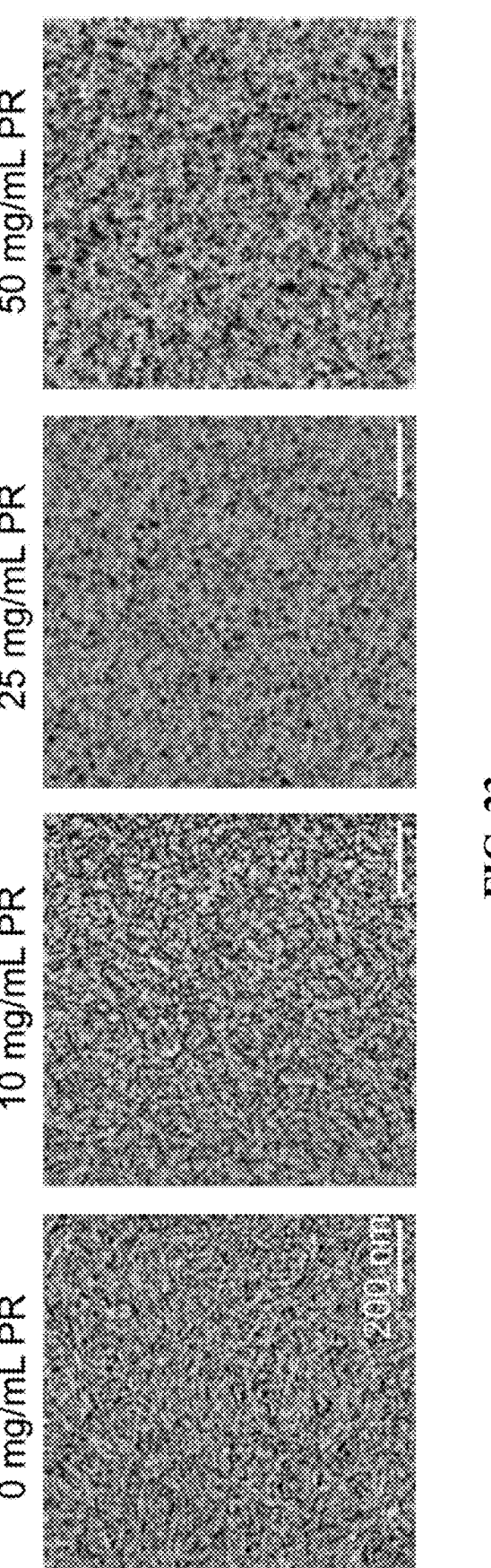
FIG. 23 shows AFM images of PEDOT:PSS blended with PR-PEGMA of different concentrations. With higher concentration of PR in the PEDOT:PSS solution, more microfiber structures can be formed.
Figure 24A:
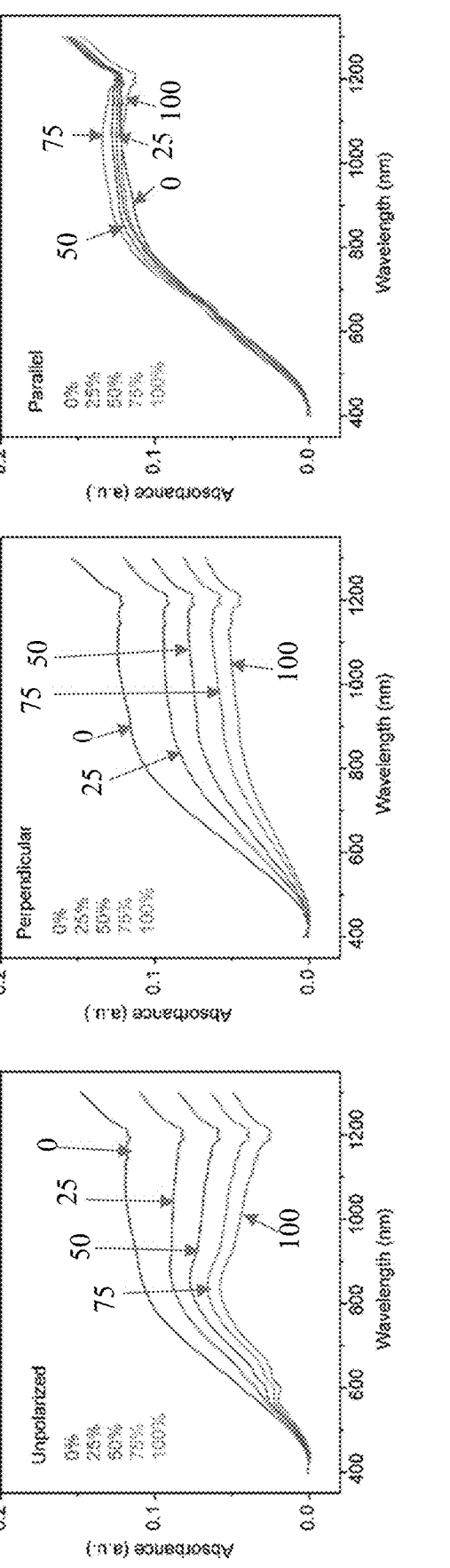
FIGS. 24A-C show polarized UV-vis spectra of PR/PEDOT:PSS film under strain (FIGS. 24A and 24B) and the calculated dichroic ratio (FIG. 24C). Under strain, PEDOT:PSS microfibers are aligned along the stretching direction. The dichroic ratio ($A_\parallel/A_\perp$) was calculated using the absorption at 810 nm, corresponding with dedoped PEDOT.
Figure 24B:
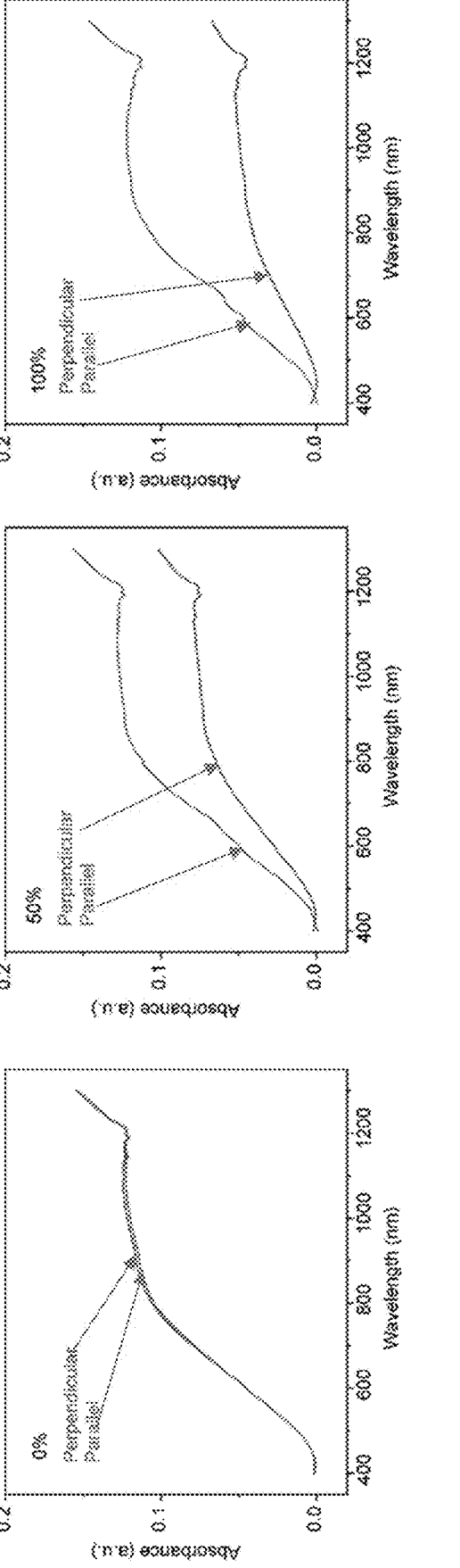
Figure 24C:
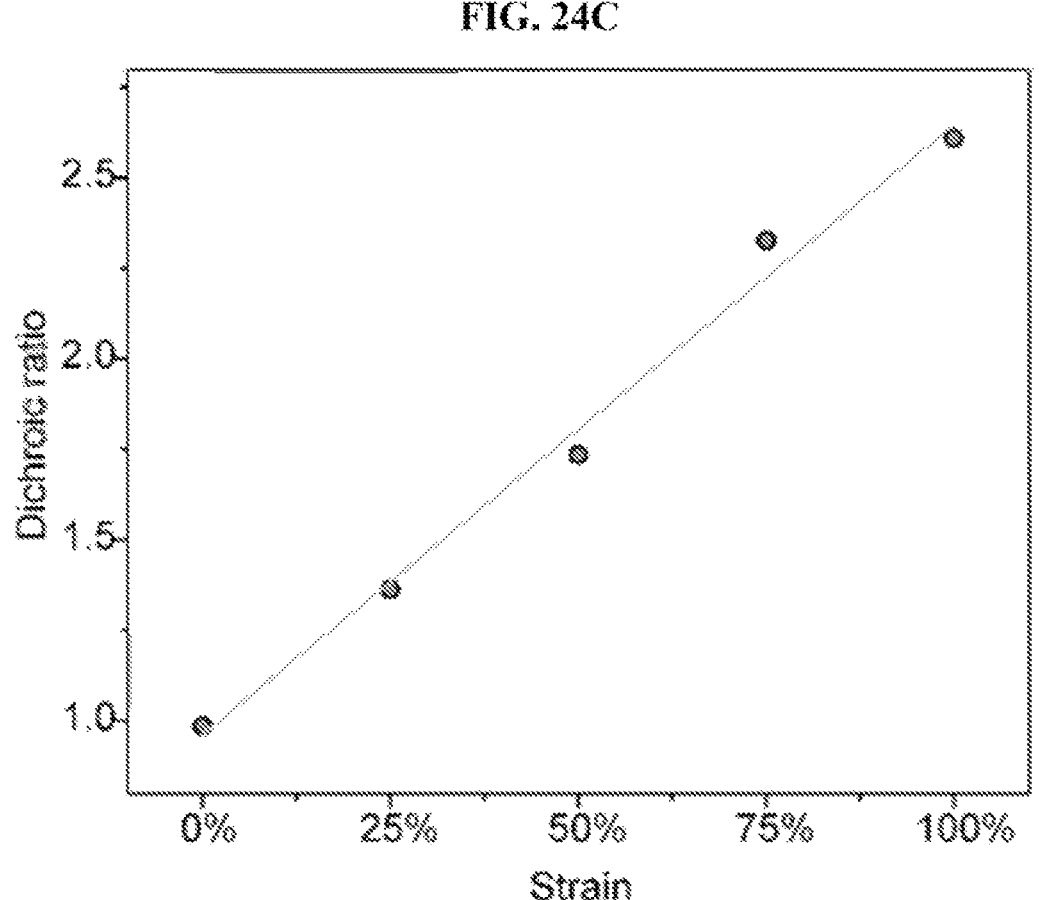

Notably, four-point probe measurements of the film conductivity showed that the added PR-PEGMA did not lead to any decay of the PEDOT:PSS conductivity at all but rather induced an enhancement of over two orders of magnitude (FIG. 2I). To unveil the mechanism underlying this striking improvement, X-ray photoelectron spectroscopy (XPS) was performed on the blended films. After normalizing the sulfur peaks (S 2p) of PEDOT thiophene, it became obvious that the S 2p peak intensity of PSS decreased with respect to the PR-PEGMA content (FIG. 2J). UV-vis and Raman spectroscopy also confirmed the same phenomenon that PR-PEGMA induced the removal of PSS from PEDOT (FIG. 2I). In pristine PEDOT:PSS, excessive non-conducting PSS around PEDOT is the main reason for the low electronic conductivity. In the presence of PR-PEGMA, its highly polar PEG chains compete with PSS in binding PEDOT, which subsequently led to the enhanced aggregation of PEDOT through spontaneous π-π and hydrophobic-hydrophobic interactions (FIG. 2K, FIGS. 22A-22B). In addition to the change of the chemical composition, AFM images of the blended films further revealed that the microscale morphology of PEDOT:PSS gradually changed from grain-like particles to percolated micro-webs, which was also favored for enhanced charge transport especially under strain (FIG. 23 and FIGS. 24A-24C).

Figure 2L:
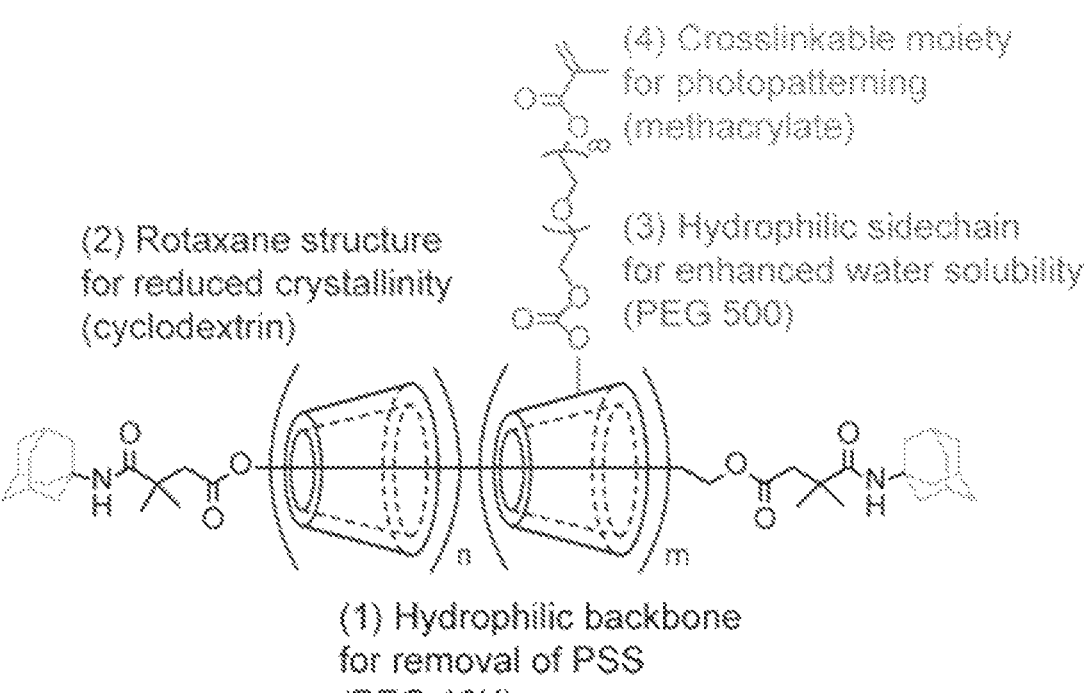

Taken together, when blending PEDOT:PSS with PR-PEGMA, the stretchability, conductivity and photopatternability of the film are simultaneously enhanced with no need to compromise one for another. After dissecting the interactions between PR-PEGMA and PEDOT:PSS, individual roles of each building blocks of the PR monomer were summarized (FIG. 2L). Briefly, (1) the hydrophilic PEG backbone is the main driving force for the enhanced conductivity by stripping PSS off from PEDOT through competitive binding; (2) the cyclodextrin ring based PR structure is critical to the reduced crystallinity of PEG for uniform blending; (3) the pendant PEG sidechain is important to introduce additional crosslinking sites for enhanced water solubility and eventually the stretchability; 4) the methacrylate terminal provided the crosslinkable moiety to form the stretchable and photopatternable supramolecular network.

Figure 3A:
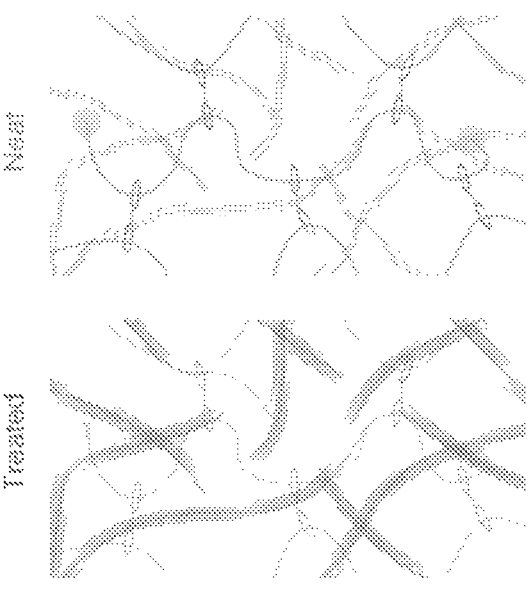
Figure 3B:
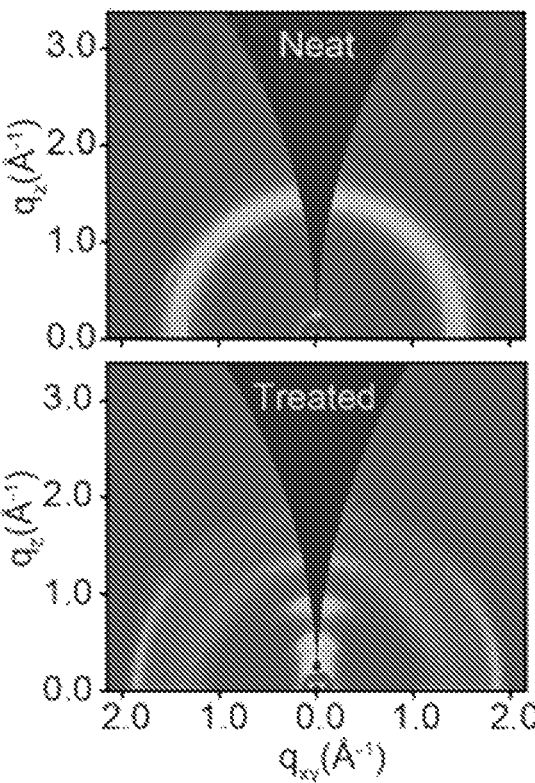
Figure 3C:
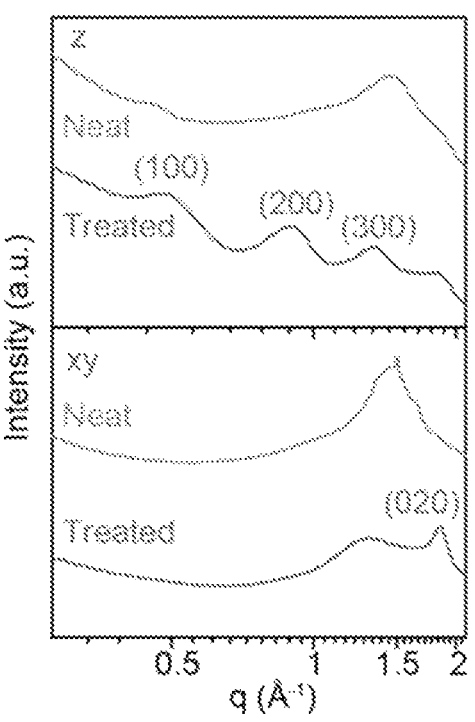
Figure 3D:
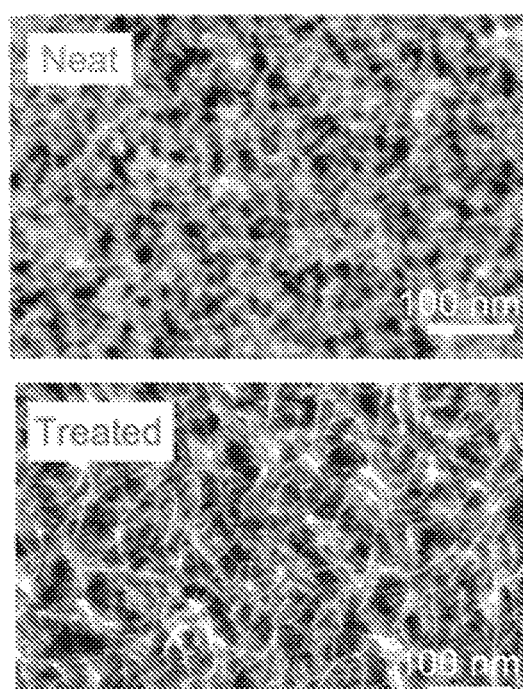
Figure 3E:
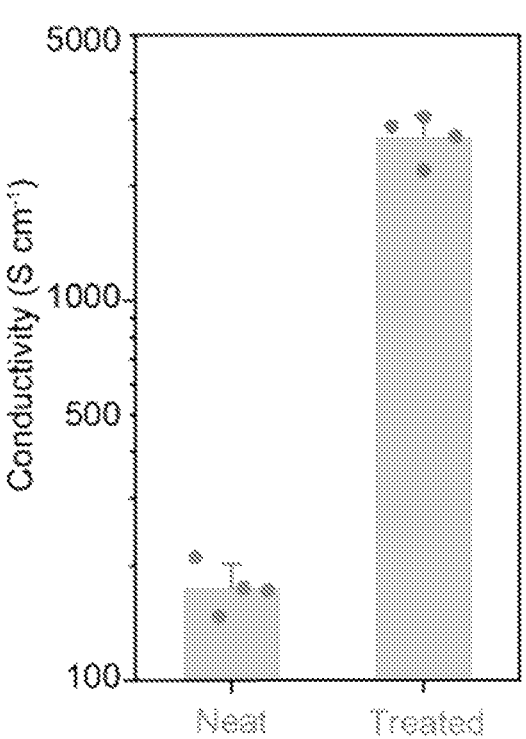
Figure 25A:
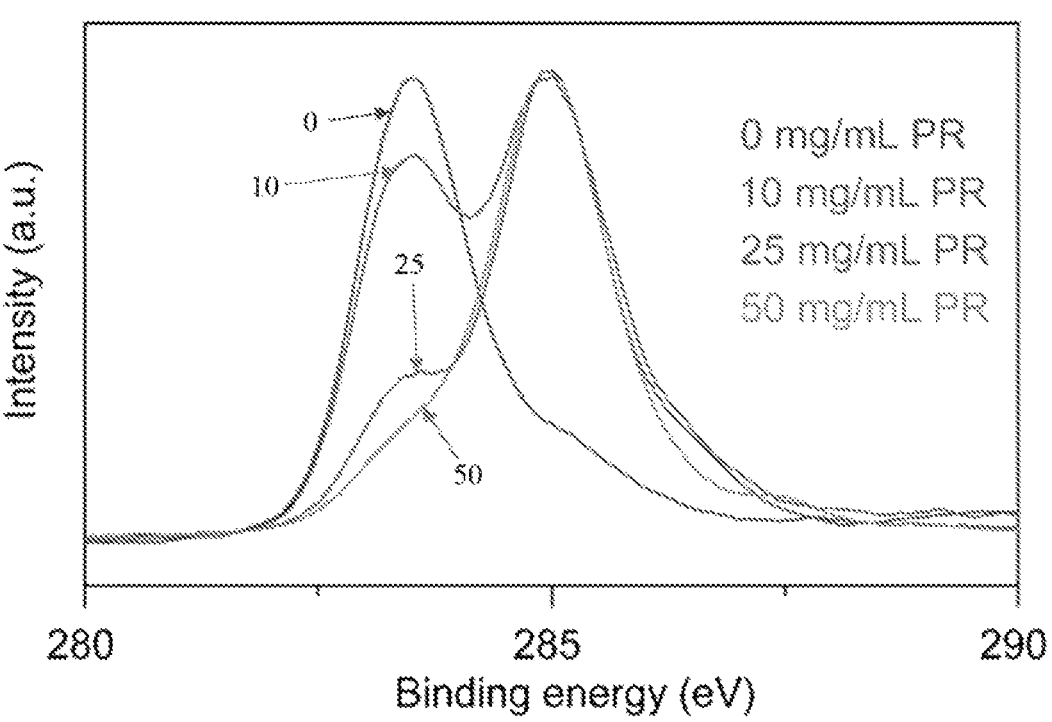
FIGS. 25A-25B show XPS of the PR-PEGMA/PEDOT:PSS film after acid treatment. Fully crosslinked PR-PEGMA are well preserved after acid treatment, promising for enhanced stretchability.
Figure 25B:
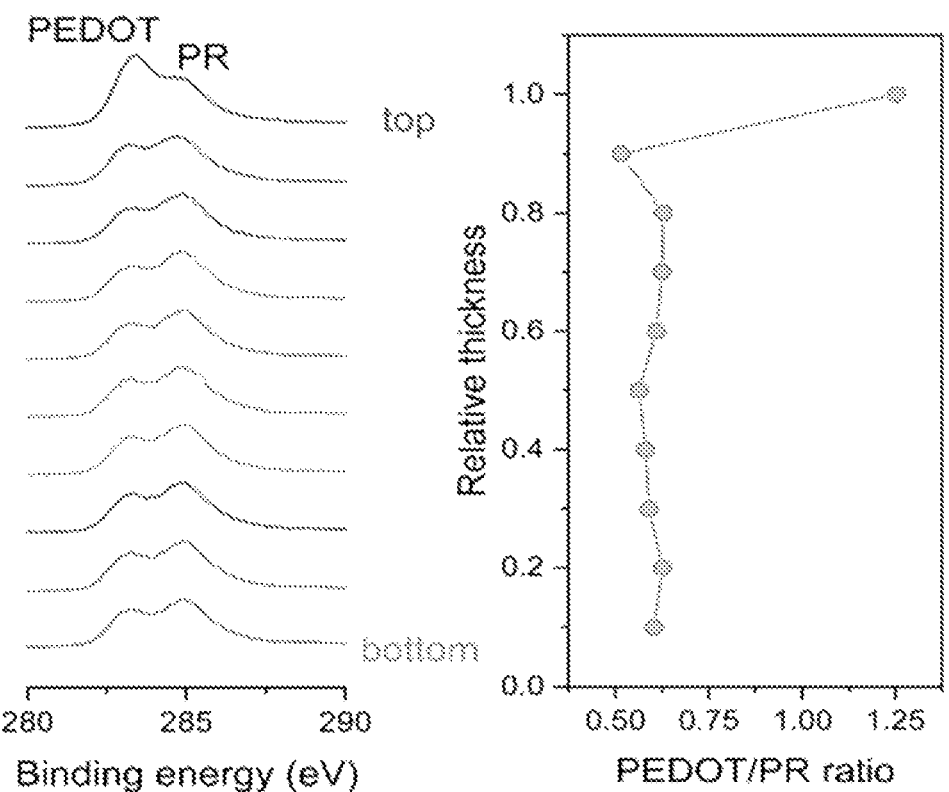

With the optimized formulation of the topological network, studies were performed to examine whether the conductivity of the PR-PEGMA blended PEDOT:PSS could be further enhanced by acid treatment while still maintaining a high stretchability (FIG. 3A). It was confirmed that the pre-formed topological network could survive the acid dipping process using XPS depth profiling (FIGS. 25A-25B). Next, GIXD was used to track the change of PEDOT crystallization (FIGS. 3B-3C). The neat film showed a moderate scattering profile with a weak (100) diffraction peak, corresponding to the PEDOT lamellar packing. After acid treatment, the PEDOT:PSS film showed multiple diffraction peaks with strong intensities while the (100) peak shifted to a larger value (0.49 vs 0.46 Å$^{-1}$), suggesting denser lamellar packing. In addition, the (020) peak also emerged at the xy direction, indicating better π-π stackings between PEDOT conjugation planes. Besides the improvement of crystallization on the molecular scale, AFM images showed that the microscopic morphology of PEDOT:PSS also changed to massively interconnected fiber after acid treatment (FIG. 3D). With both of these changes, an additional one order of magnitude enhancement of the PEDOT:PSS conductivity was recorded (FIG. 3E).

Figure 3F:
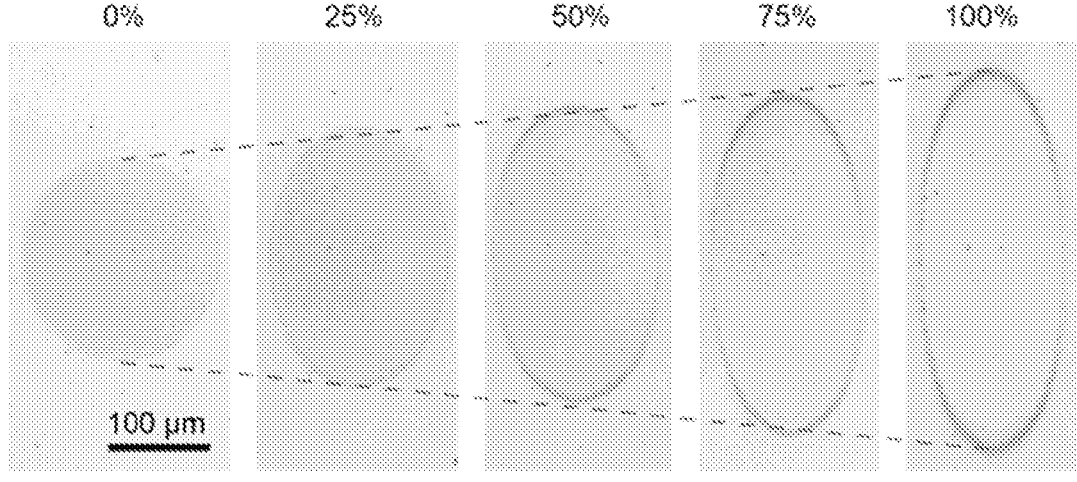
Figure 3G:
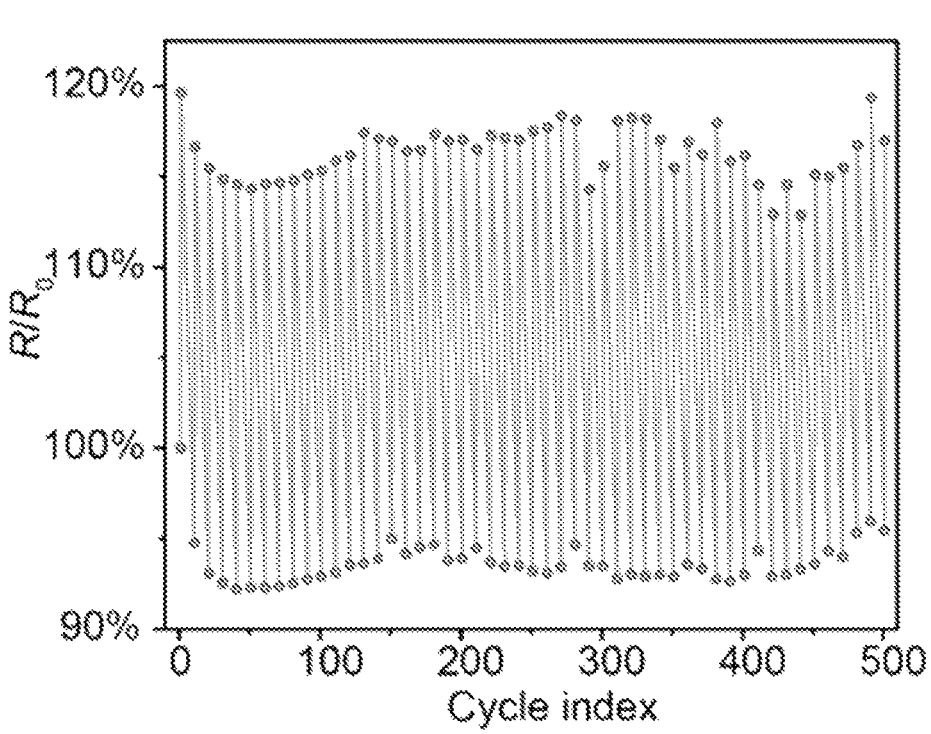
Figure 26:
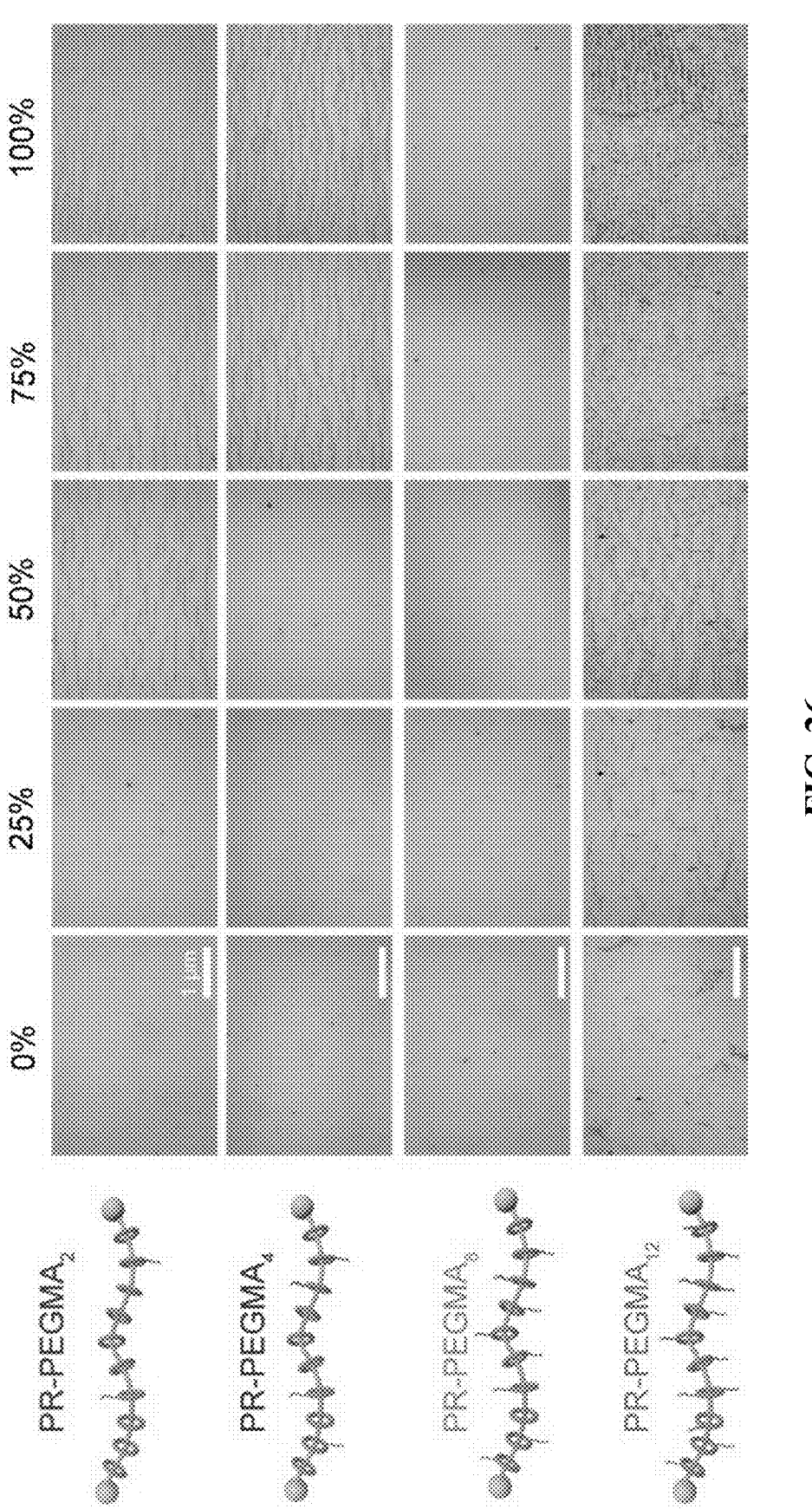
FIG. 26 shows stretching tests of PEDOT:PSS blended with PR-PEGMA of different number of side chains after acid treatment. Optical microscope images of different PEDOT:PSS films show the crack formation under strain. PR-PEGMAs has better stretchability than other samples even after acid treatment.
Figure 27:
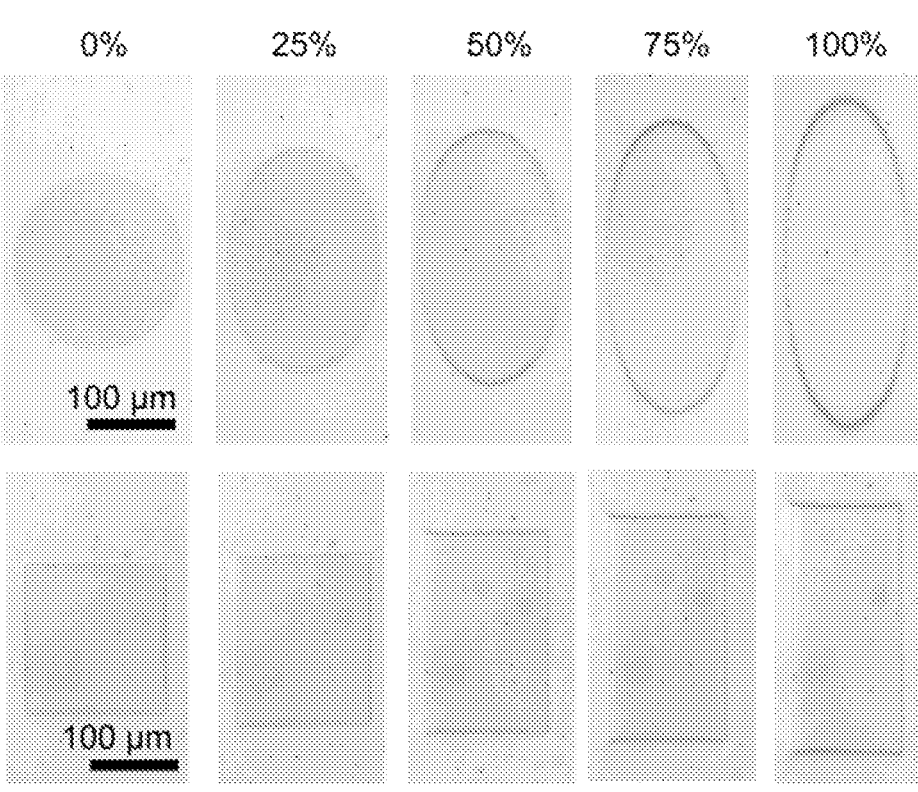
FIG. 27 shows optical microscope images of photopatterned PEDOT:PSS under strain. After acid treatment, the crosslinked PR-PEGMA/PEDOT:PSS composite can be stretched to 100% without any cracks.
Figure 28:
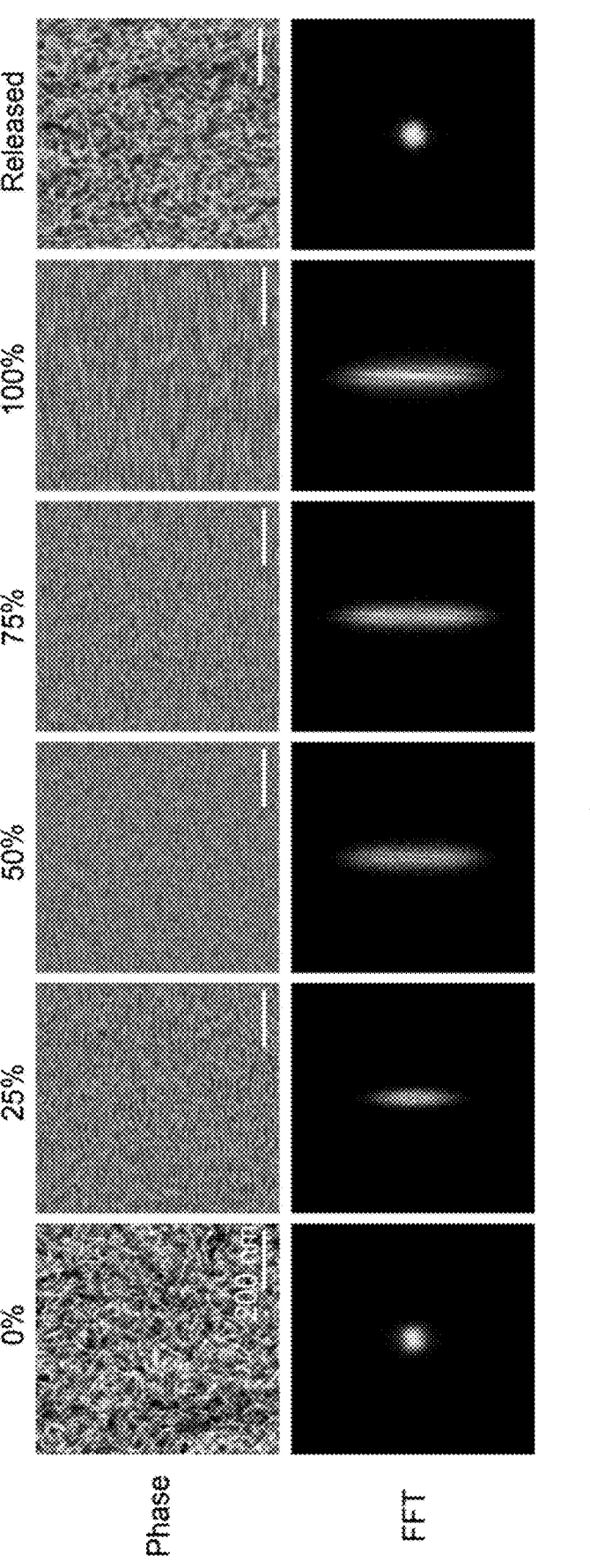
FIG. 28 shows AFM images and corresponding FFT diffractogram of acid-treated PEDOT:PSS under strain. Upon stretching, PEDOT:PSS micro-fibers after acid treatment aligned along the strain axis. The fibers returned to its original isotropic configuration after releasing.
Figure 29:
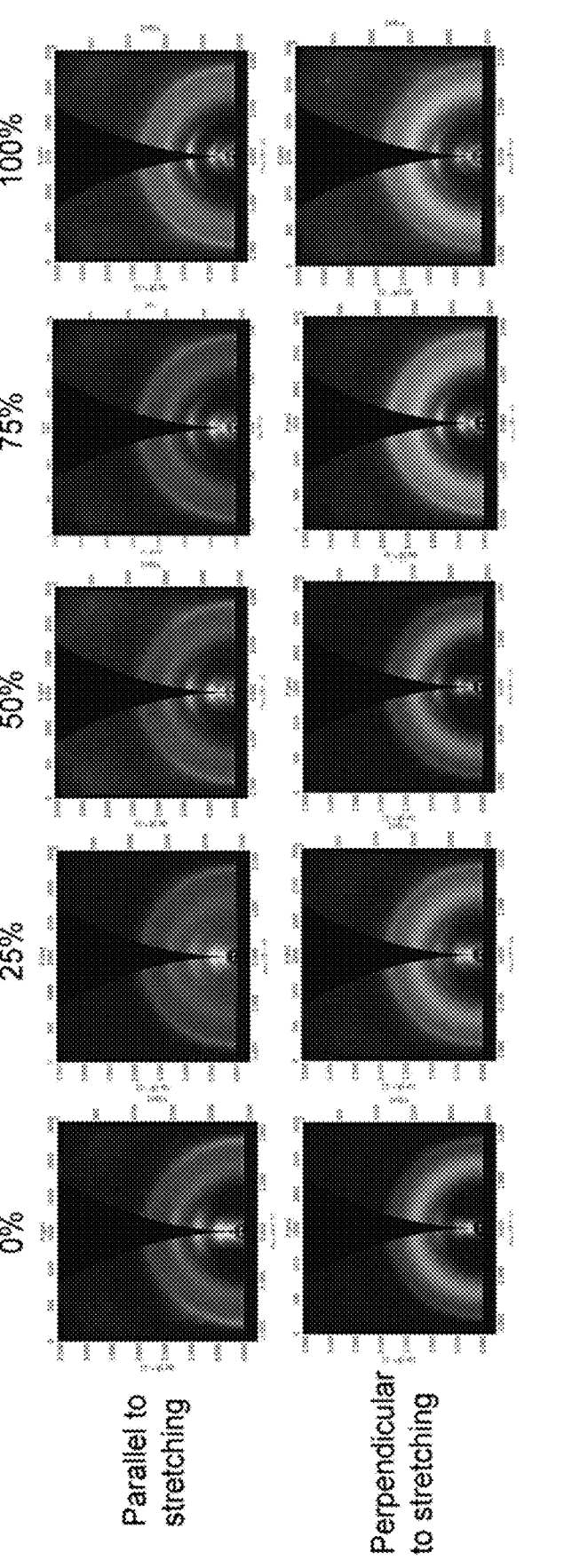
FIG. 29 shows GIXD spectra of PEDOT:PSS films under strain. Both lamella and I-x stacking peaks are preserved in directions parallel and perpendicular to the stretching direction.

Next, whether the acid treated PEDOT:PSS can still be stretched was tested. To highlight the significance of the topological network in promoting the patternability and stretchability, a circular patterned PEDOT:PSS was fabricated using direct photolithography, and its crack dynamics was visualized under an optical microscope. Even when the circle was stretched to an elliptical shape at 100% strain, the entire PEDOT:PSS pattern remained completely intact without any crack formation (FIG. 3F, FIGS. 26-27). AFM images and corresponding fast Fourier transform (FFT) spectrograms of the film under strain showed that the original micro-fibers of PEDOT:PSS was aligned along the stretching direction (FIG. 28), which likely contributed to the good strain tolerance. GIXD spectra confirmed the retention of the PEDOT crystallization in directions both parallel and perpendicular to the strained axis (FIG. 29). Finally, a cyclic stretching test of the film was performed to show that the PR-PEGMA/PEDOT:PSS system can be reversible stretched for 500 cycles without significant changes in its conductivity and microscale morphology (FIG. 3G, FIG. 28).

Figure 3H:
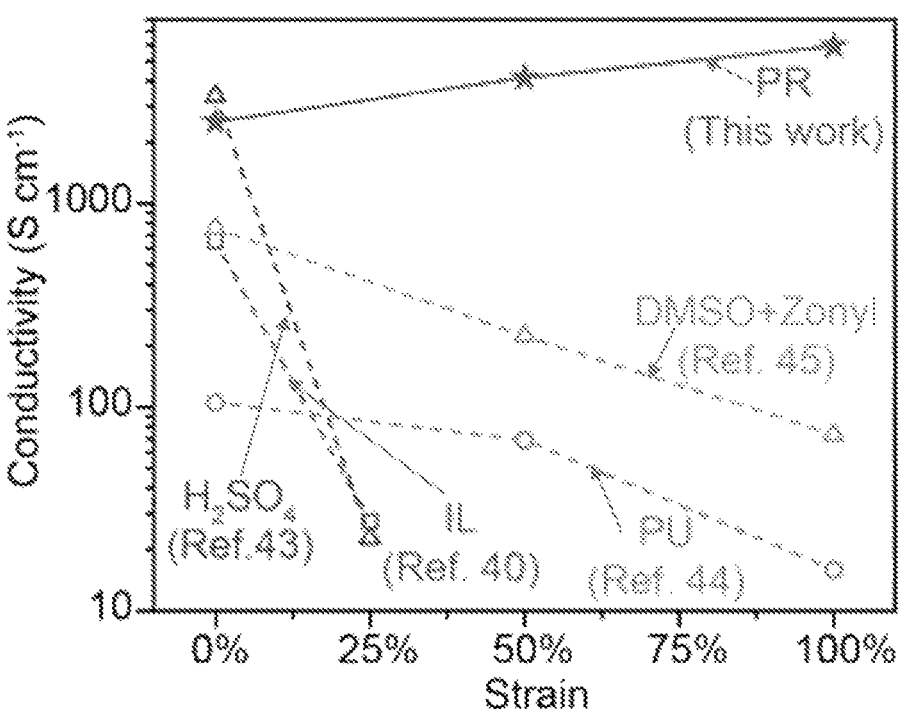
Figure 3I:
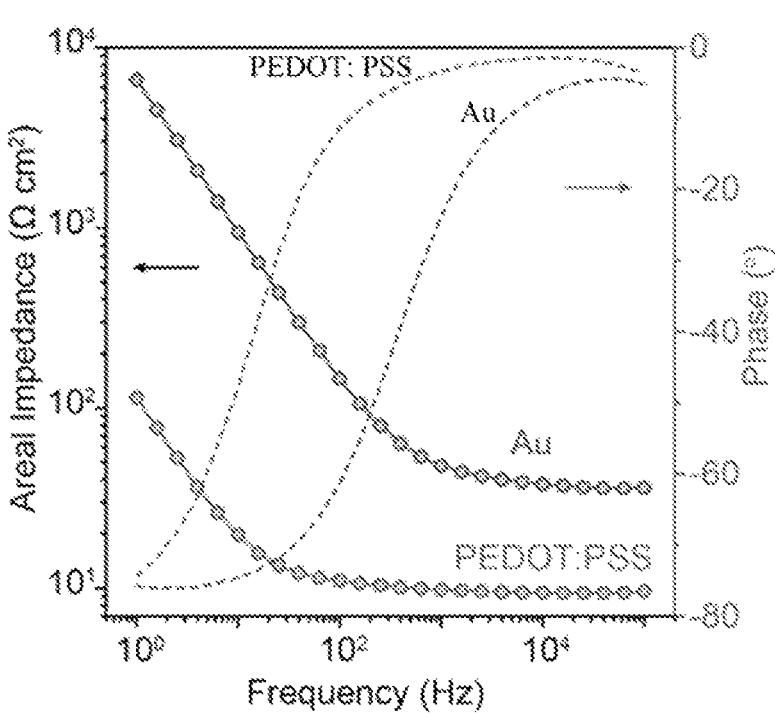

When plotting conductivity versus strain, all previously reported PEDOT:PSS systems with sulfuric acid treatment, ionic liquid additive, waterborne polyurethane blending, or surfactant additive were either not stretchable or conductive enough under physiological condition. In sharp contrast, the topological network strategy of the present technology allowed PEDOT:PSS to have record-high conductivity and stretchability (~2700 S/cm at zero strain, >100% without cracks) due to the unique physicochemical interactions between PR-PEGMA and PEDOT:PSS (FIG. 3H).

Figure 3J:
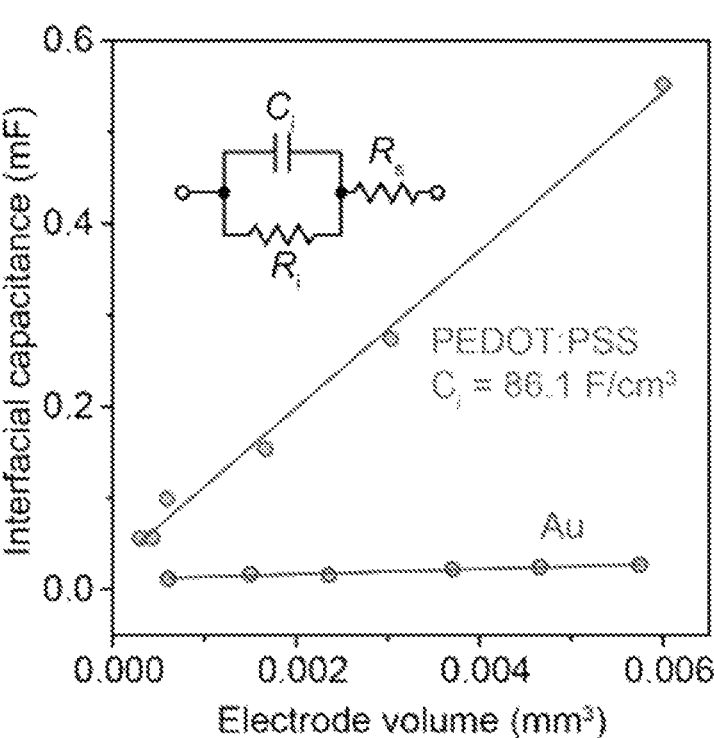
Figure 30A:
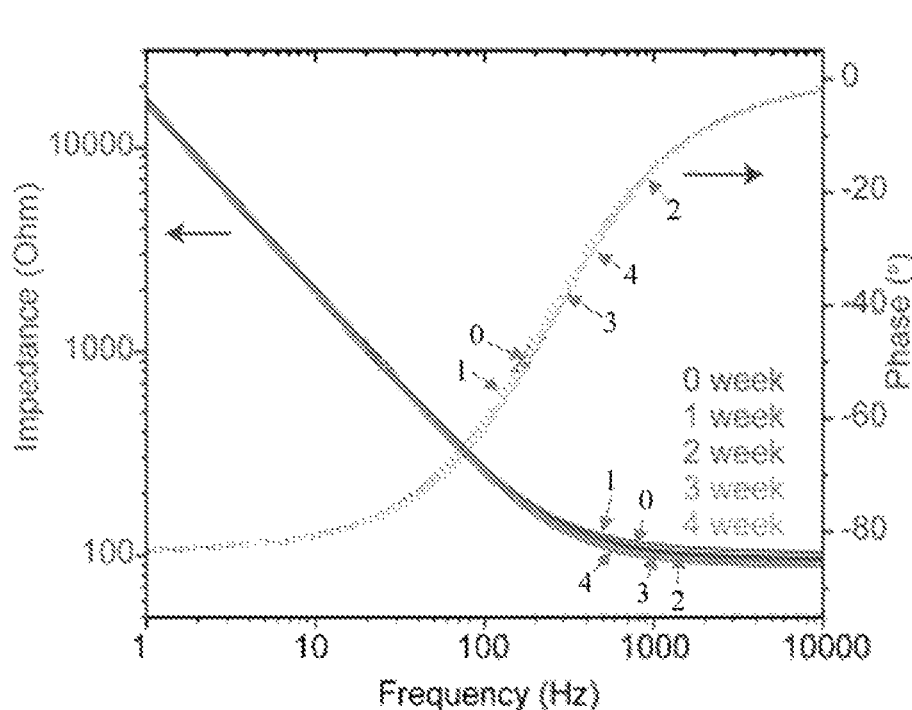
FIGS. 30A and 30B show EIS spectrum of the PEDOT:PSS electrode after immersion in PBS for four weeks. The impedance value of PEDOT:PSS is well maintained over time.
Figure 30B:
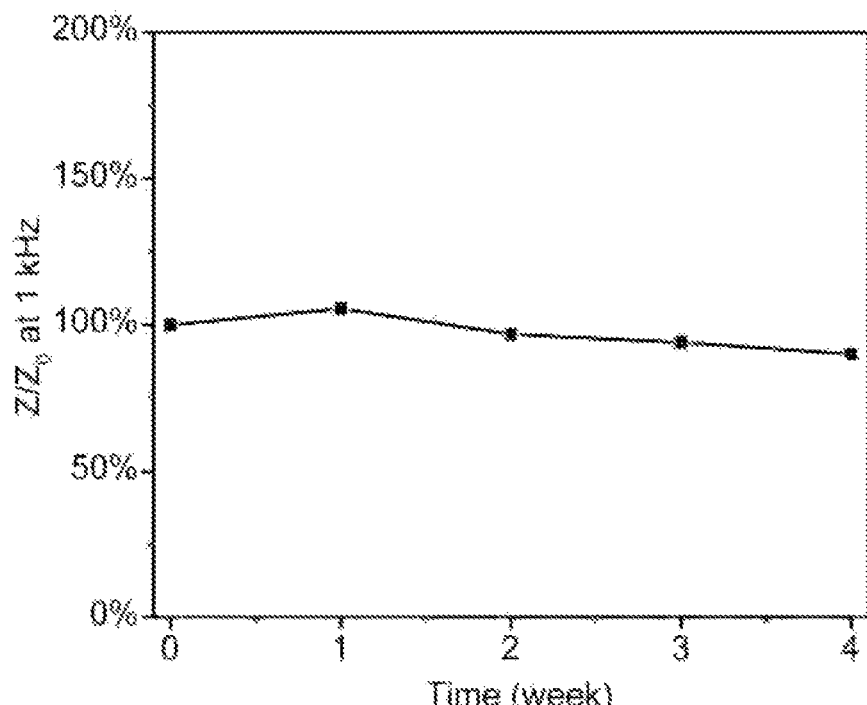
Figure 31:
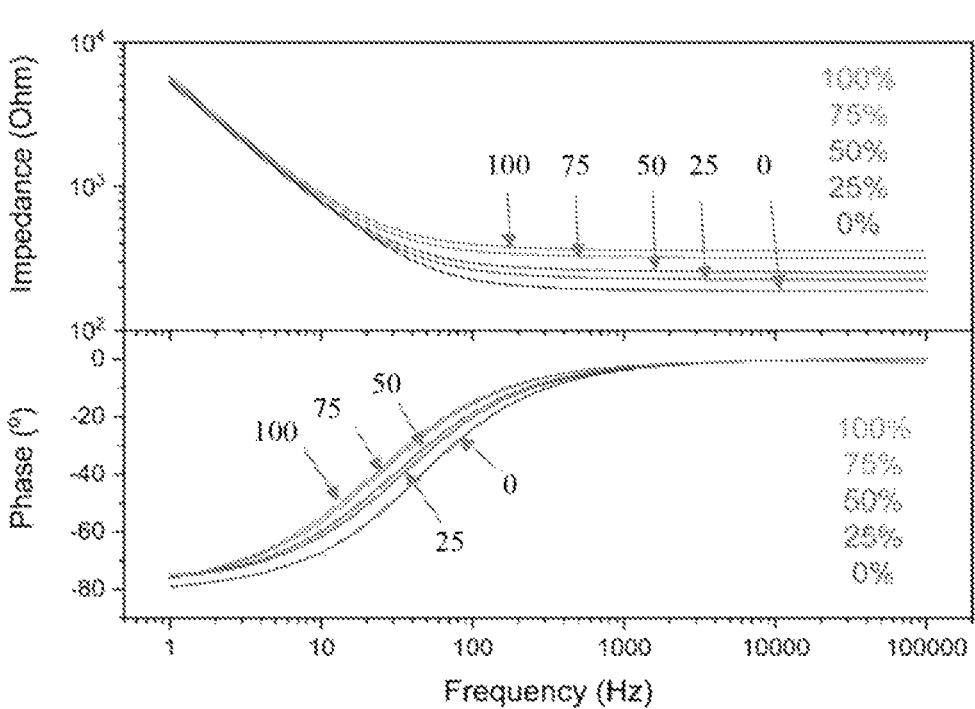
FIG. 31 shows EIS spectrum of the PEDOT:PSS electrode under strain. The impedance value of PEDOT:PSS show only minor increases due to the geometrical changes under strain.

In addition to the dry-state performance, electrochemical properties of the stretchable PEDOT:PSS under physiological conditions are also directly related to bioelectronic applications. The electrochemical impedance spectra (EIS) of the PEDOT:PSS and gold electrodes were collected. In consistency with literature reports, because of the electronic-ionic dual conduction mechanism in PEDOT:PSS, its impedance amplitude in phosphate buffered saline (PBS) solution stayed lower than gold (Au) (FIG. 31). Moreover, because of the three-dimensional (3D) macroporous structure of the topological network, the effective interfacial capacitance between PEDOT:PSS and the electrolyte is much larger than that of Au. The capacitance value of this 3D biointerface can even scale linearly with respect to the PEDOT:PSS thickness whereas traditional 2D Au/PBS interface cannot offer such a benefit (FIG. 3J). Because of the chemically crosslinked topological network, the impedance value of the PEDOT:PSS electrode could remain stable in PBS for at least one month (FIGS. 30A-30B). When the PEDOT:PSS electrode was stretched to 100%, its impedance value showed only subtle increases following the natural changes of the electrode geometry without inducing any cracks (FIG. 31).

Figure 3K:
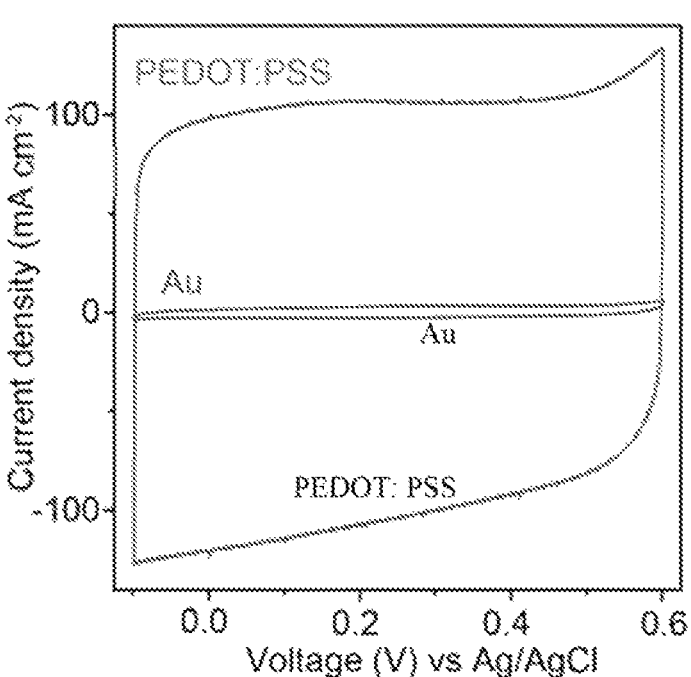
Figure 3L:
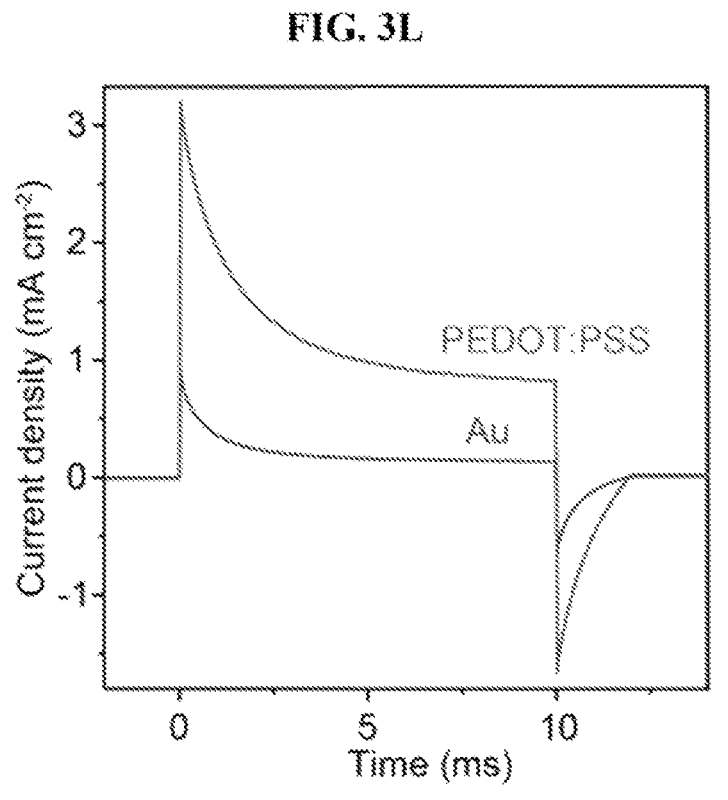
Figure 32:
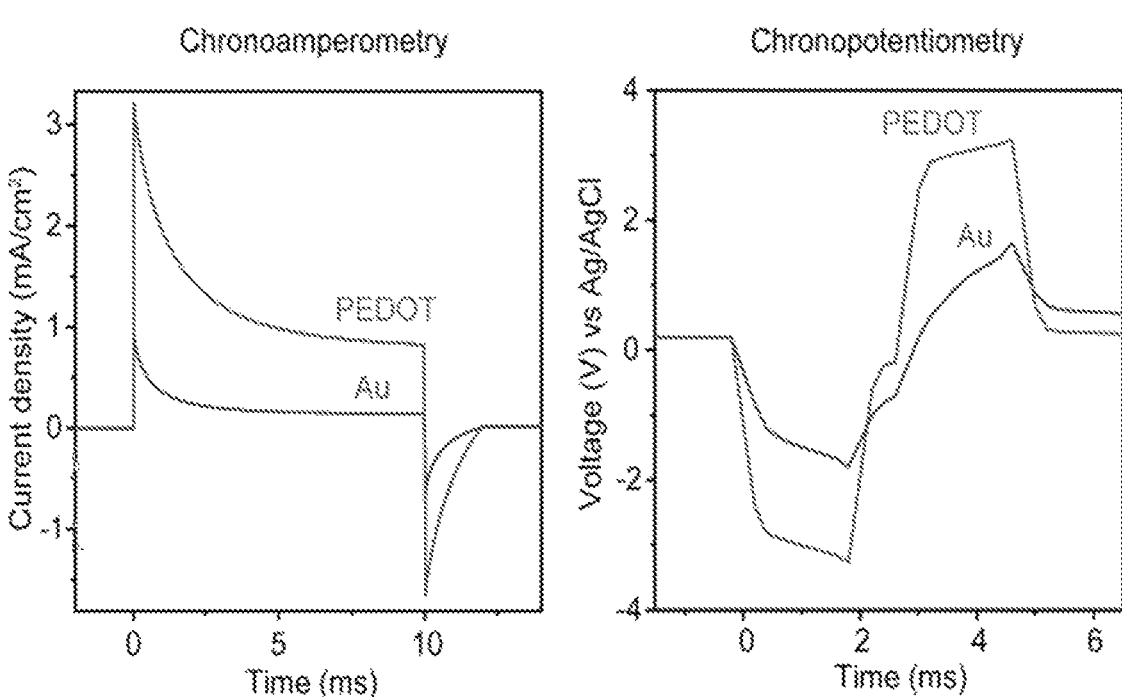
FIG. 32 shows chronoamperometry and chronopotentiometry measurements showing enhanced charge injection of PEDOT:PSS compared to Au.
Figure 33:
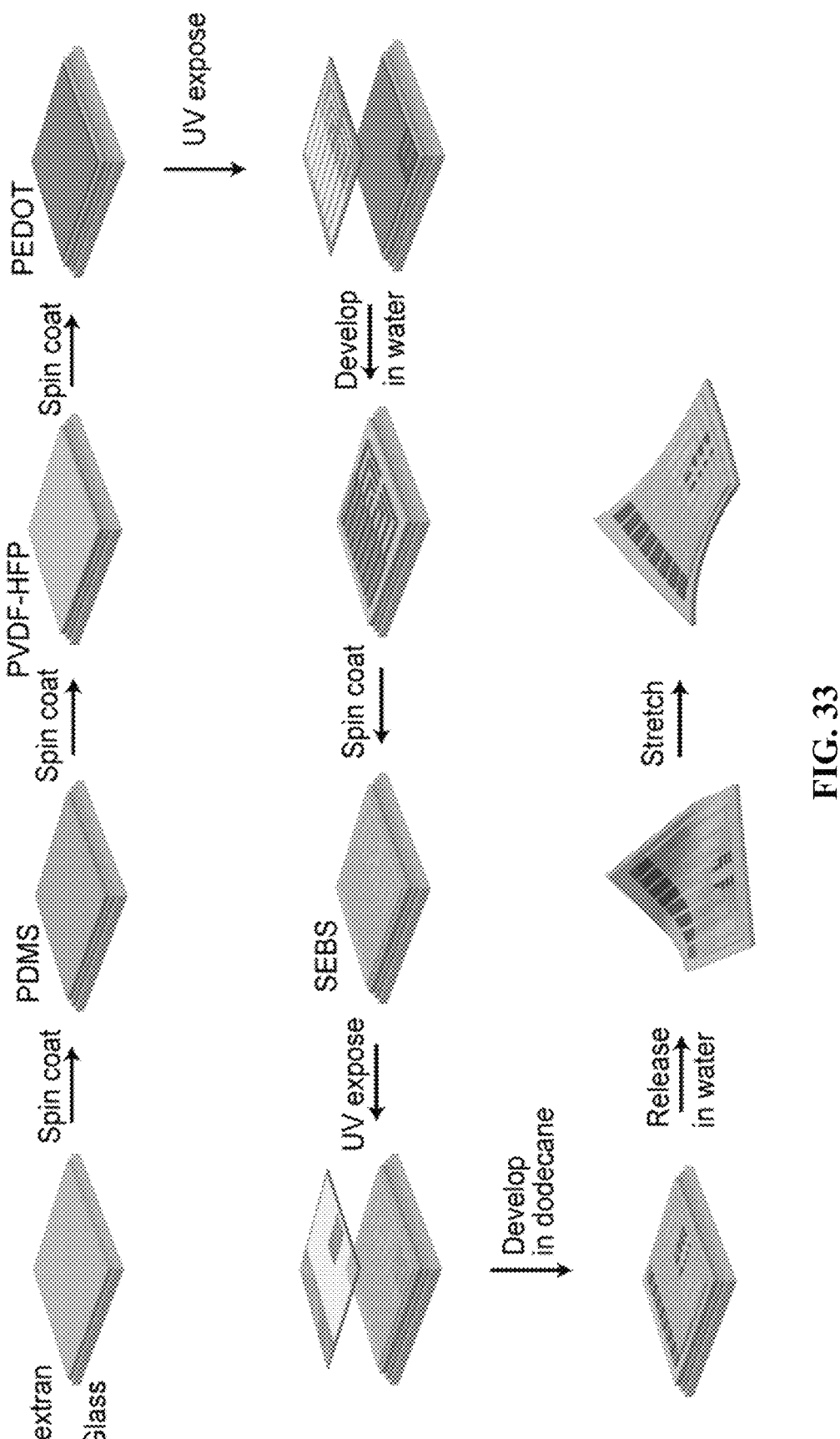
FIG. 33 shows schematic diagram illustrating the fabrication process of fully stretchable multielectrode array.
Figure 34A:
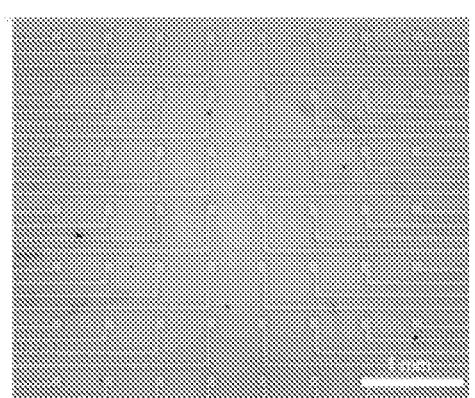
FIGS. 34A-34C show images of the PEDOT:PSS electrode array.
Figure 34A:
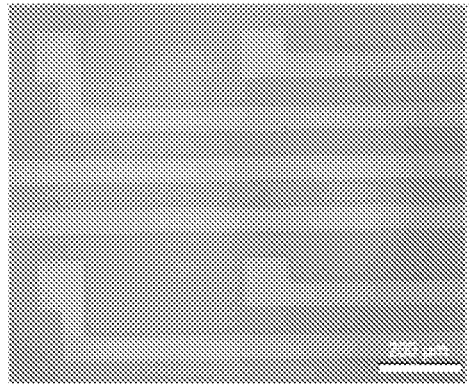
Figure 34B:
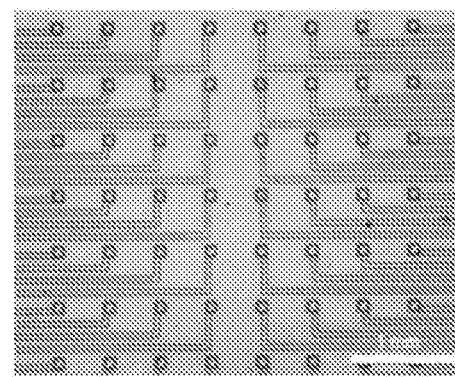
Figure 34B:
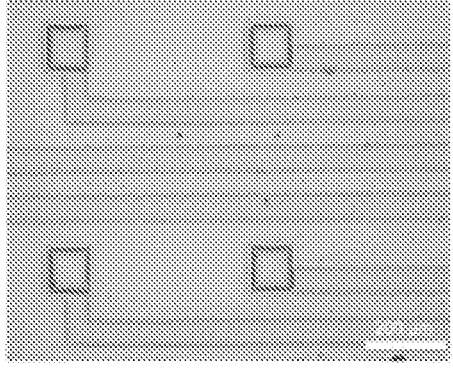
Figure 34C:
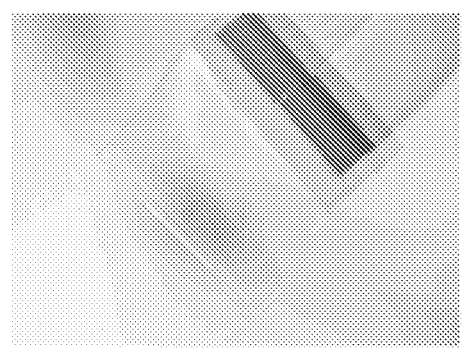
Figure 34C:
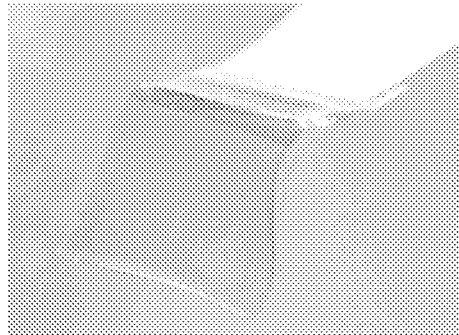

Besides the low interfacial impedance for electrophysiological recording, another unique advantage of PEDOT:PSS is that the large interfacial capacitance could allow effective charge injection for electrical stimulation. Cyclic voltammetry (CV) sweeps showed that PEDOT:PSS had a nearly rectangular I-I' curve with large hysteresis, representing a large charge storage capacity (CSC) with low Faradaic components (FIG. 3K). In comparison, Au electrode had only negligible level of CSC due to its poor electrochemical interface with PBS. Besides the low frequency charge injection, PEDOT:PSS also outperformed Au in the transient stimulation scenario. When a square wave voltage pulse was passed through PEDOT:PSS, it could also generate a much larger capacitive current than Au because of its high interfacial capacitance (FIG. 3L, FIG. 32), a property that is particularly relevant to high-frequency neural stimulations.

Figure 4A:
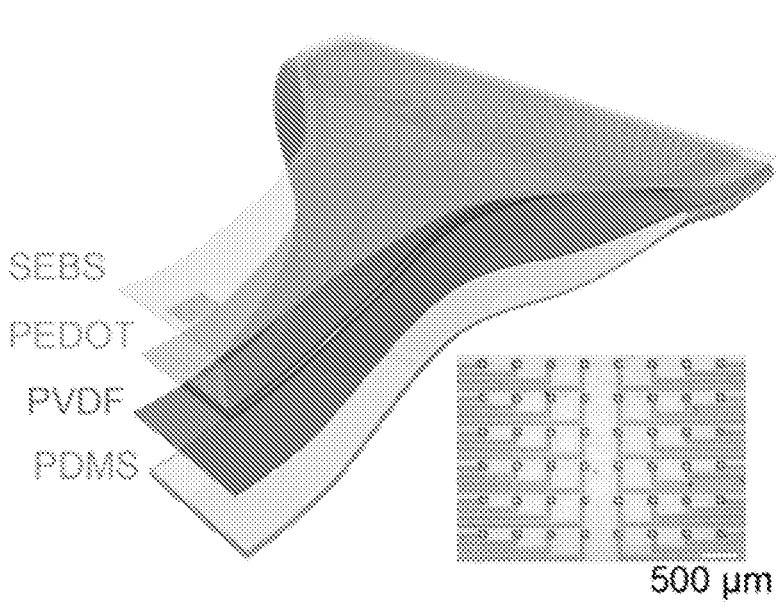
FIGS. 4A-4Q show that intrinsically stretchable and high-density electrode array allows unique bioelectronic applications.
Figure 4B:
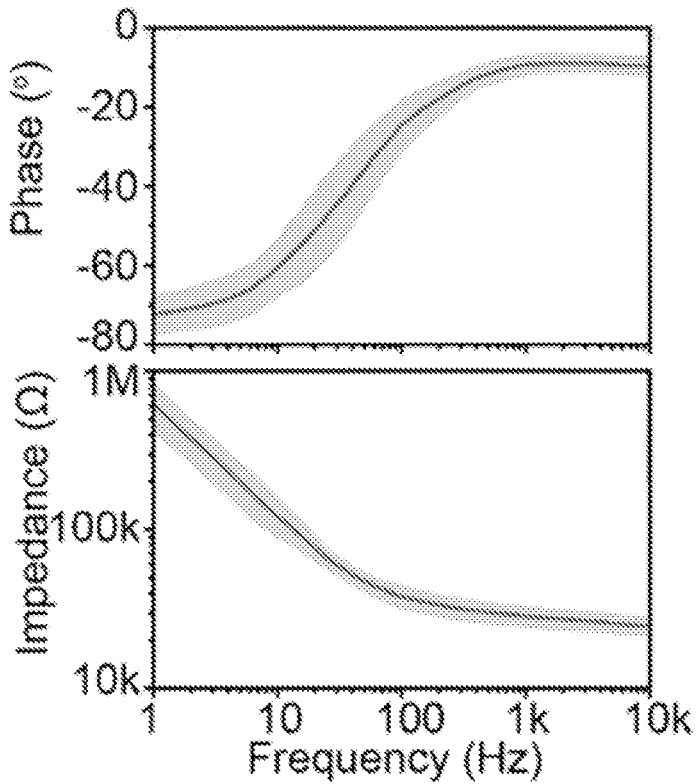
FIG. 4B: Average impedance and phase angle values of the electrode array over frequency. Shaded areas denote standard deviations.
Figure 35:
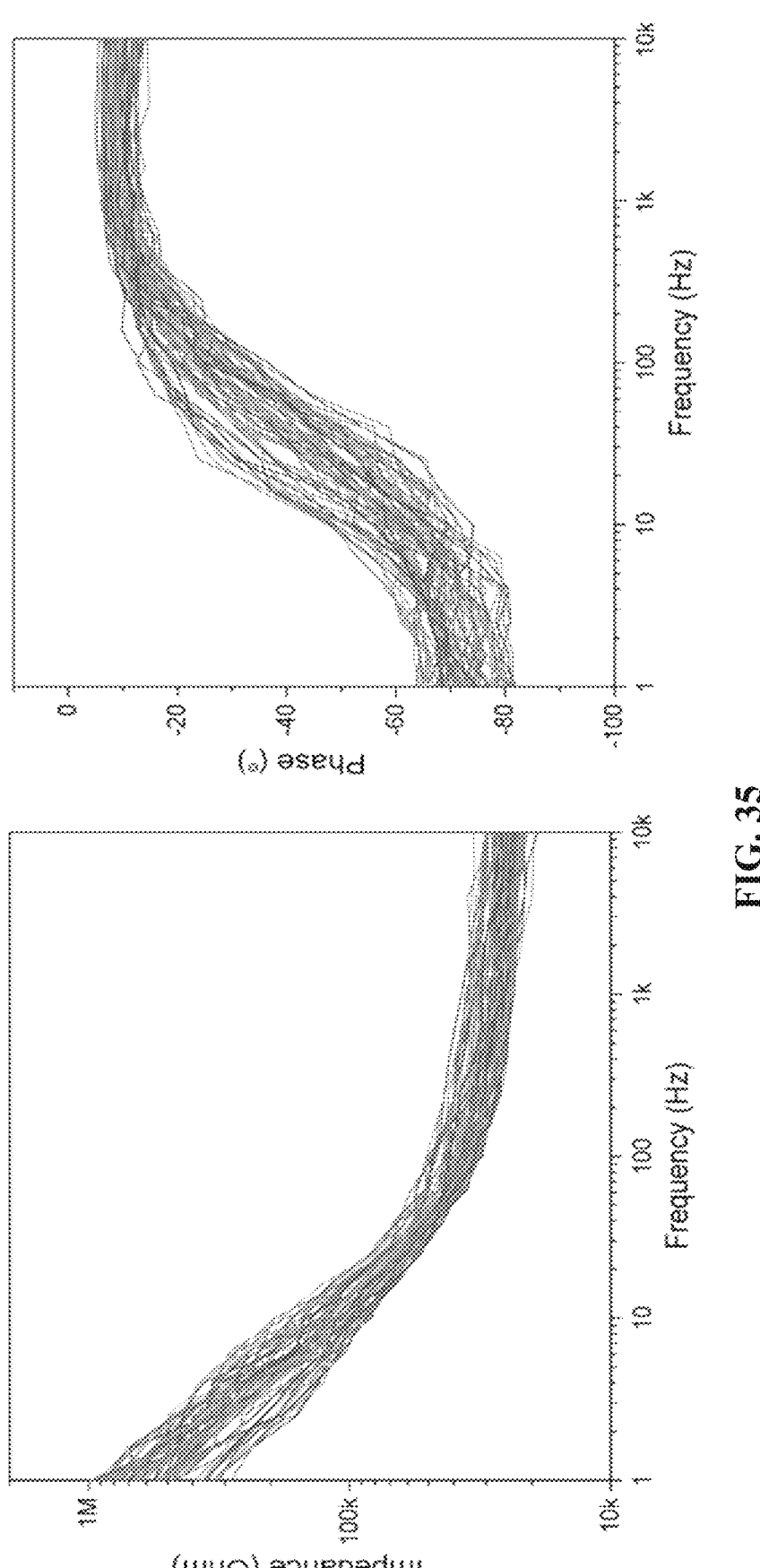
FIG. 35 shows EIS data collected from a 64-channel electrode array showing the low device variation after the scalable fabrication process.
Figure 36:
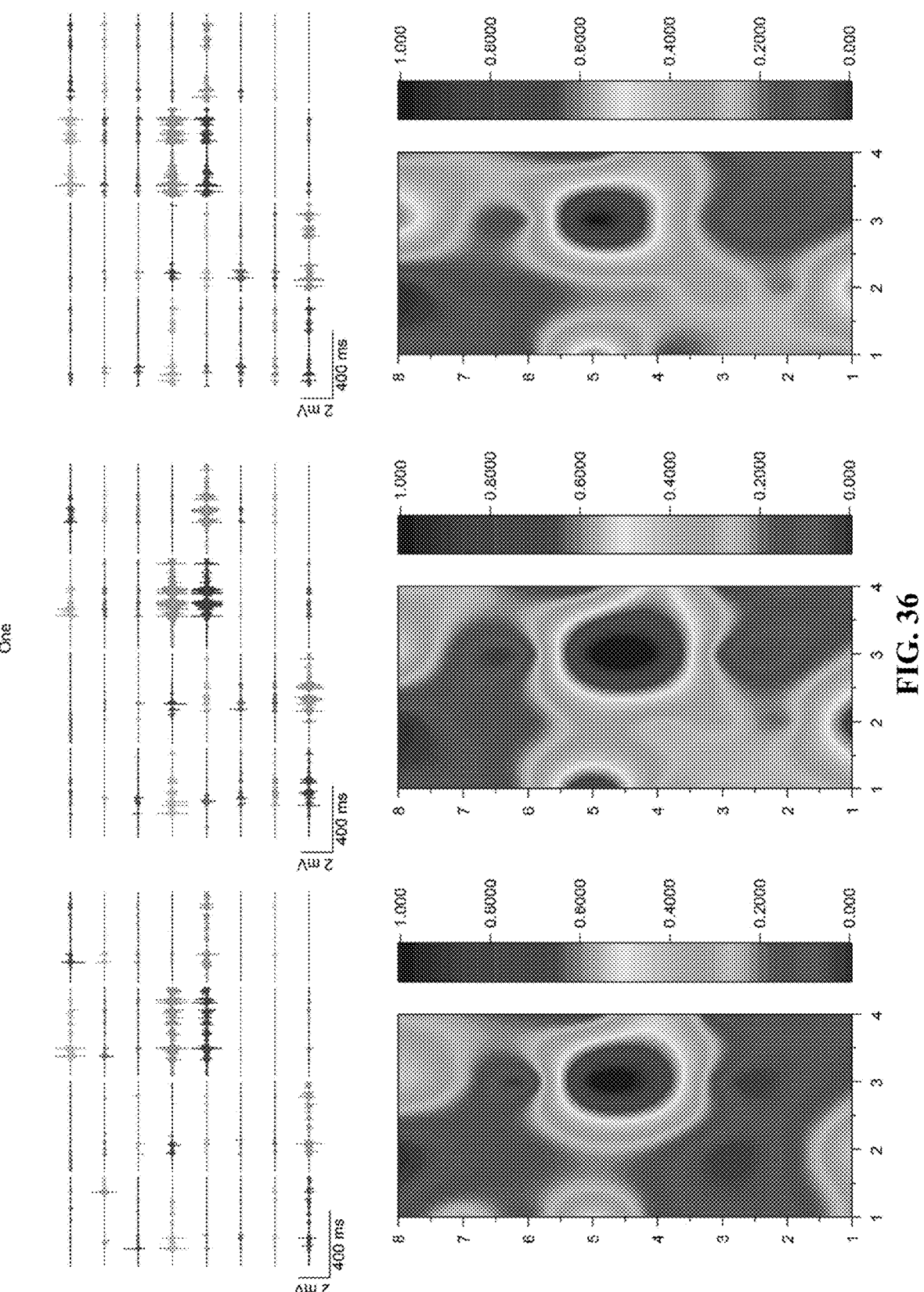
FIG. 36 shows three representative EMG data and calculated heat maps of gesture number one showing the high reproducibility of the stretchable electrode array for sEMG measurement.
Figure 37:
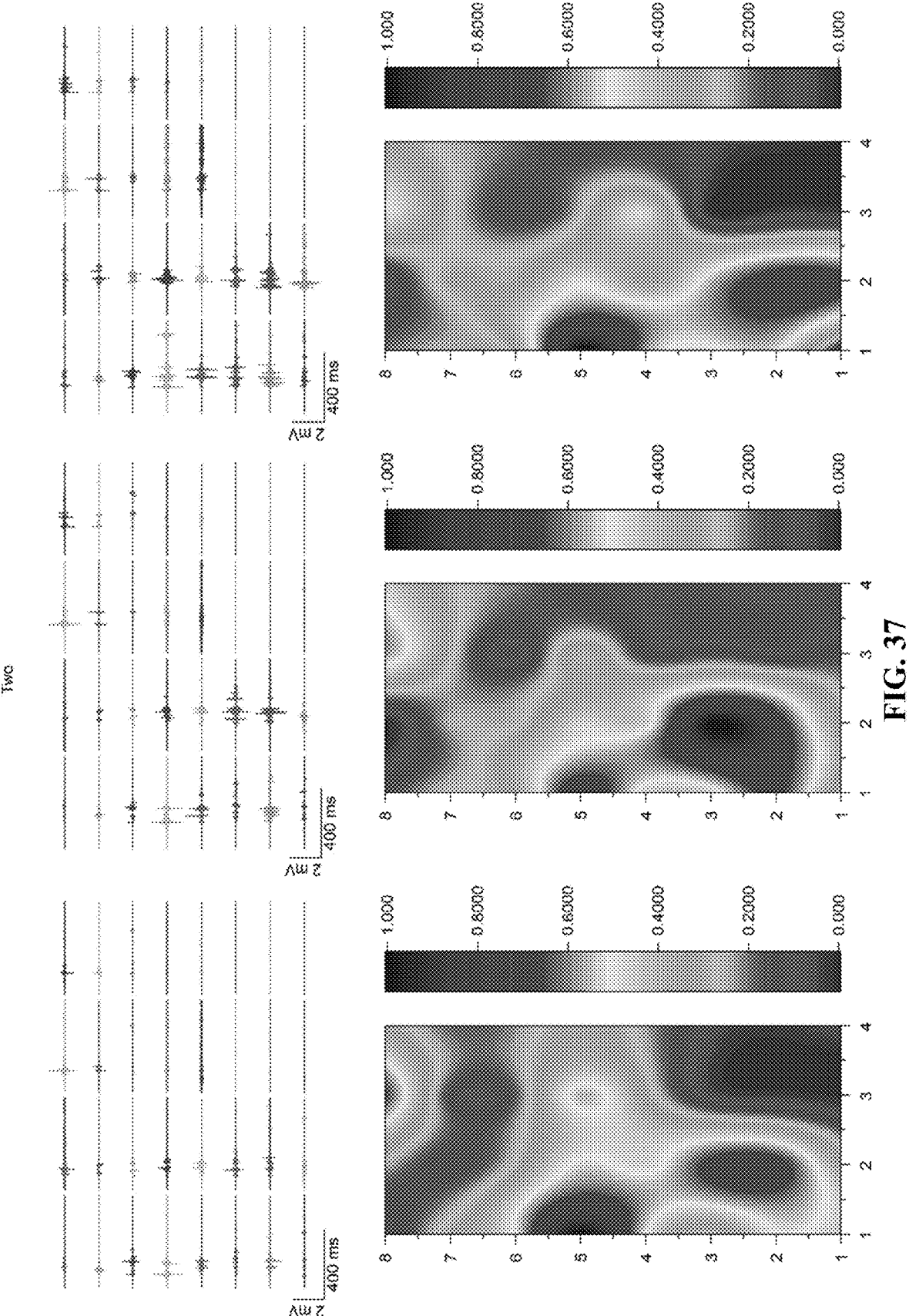
FIG. 37 shows three representative EMG data and calculated heat maps of gesture number two showing the high reproducibility of the stretchable electrode array for sEMG measurement.
Figure 38:
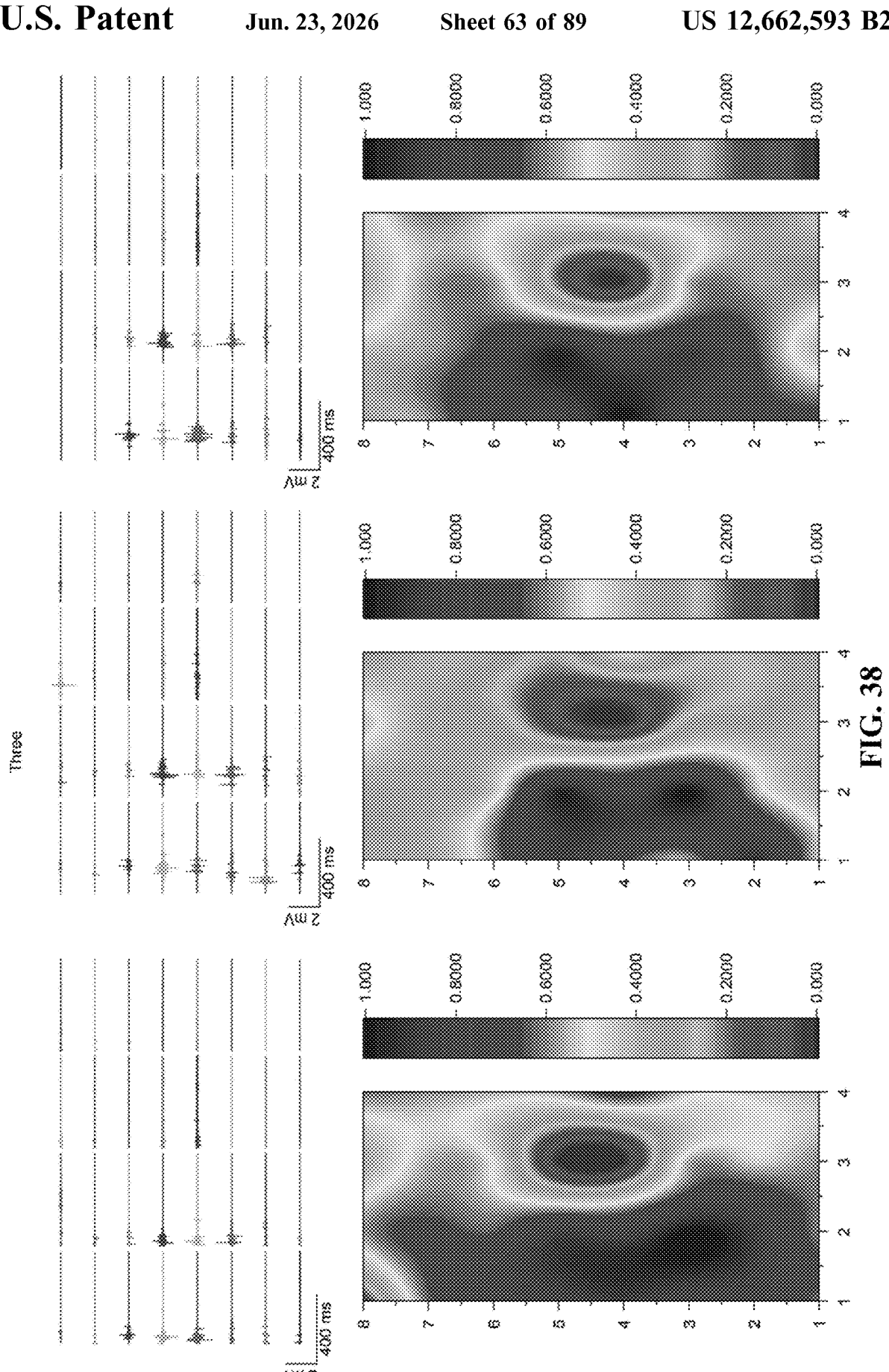
FIG. 38 shows three representative EMG data and calculated heat maps of gesture number three showing the high reproducibility of the stretchable electrode array for sEMG measurement.
Figure 39:
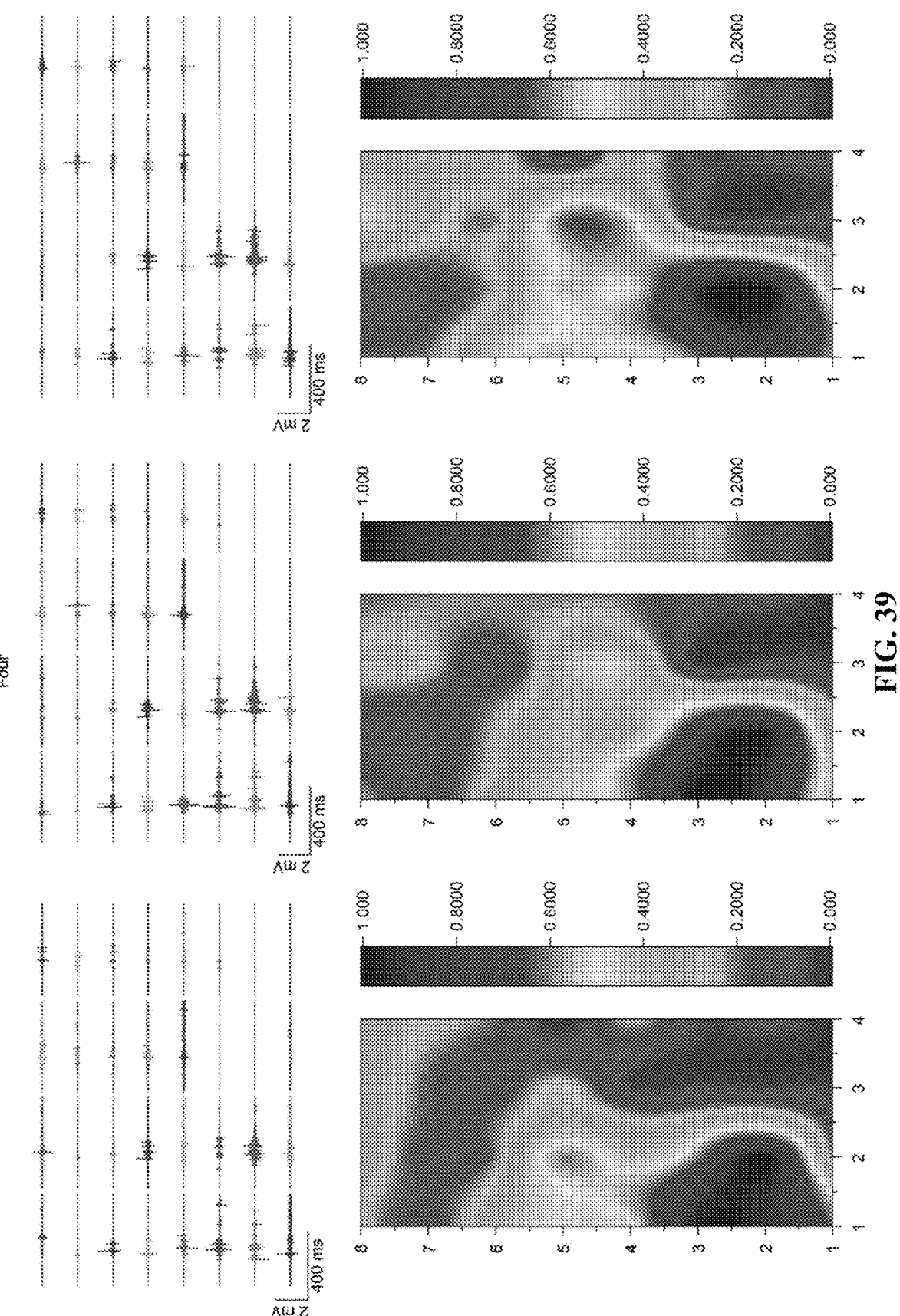
FIG. 39 shows three representative EMG data and calculated heat maps of gesture number four showing the high reproducibility of the stretchable electrode array for sEMG measurement.
Figure 40:
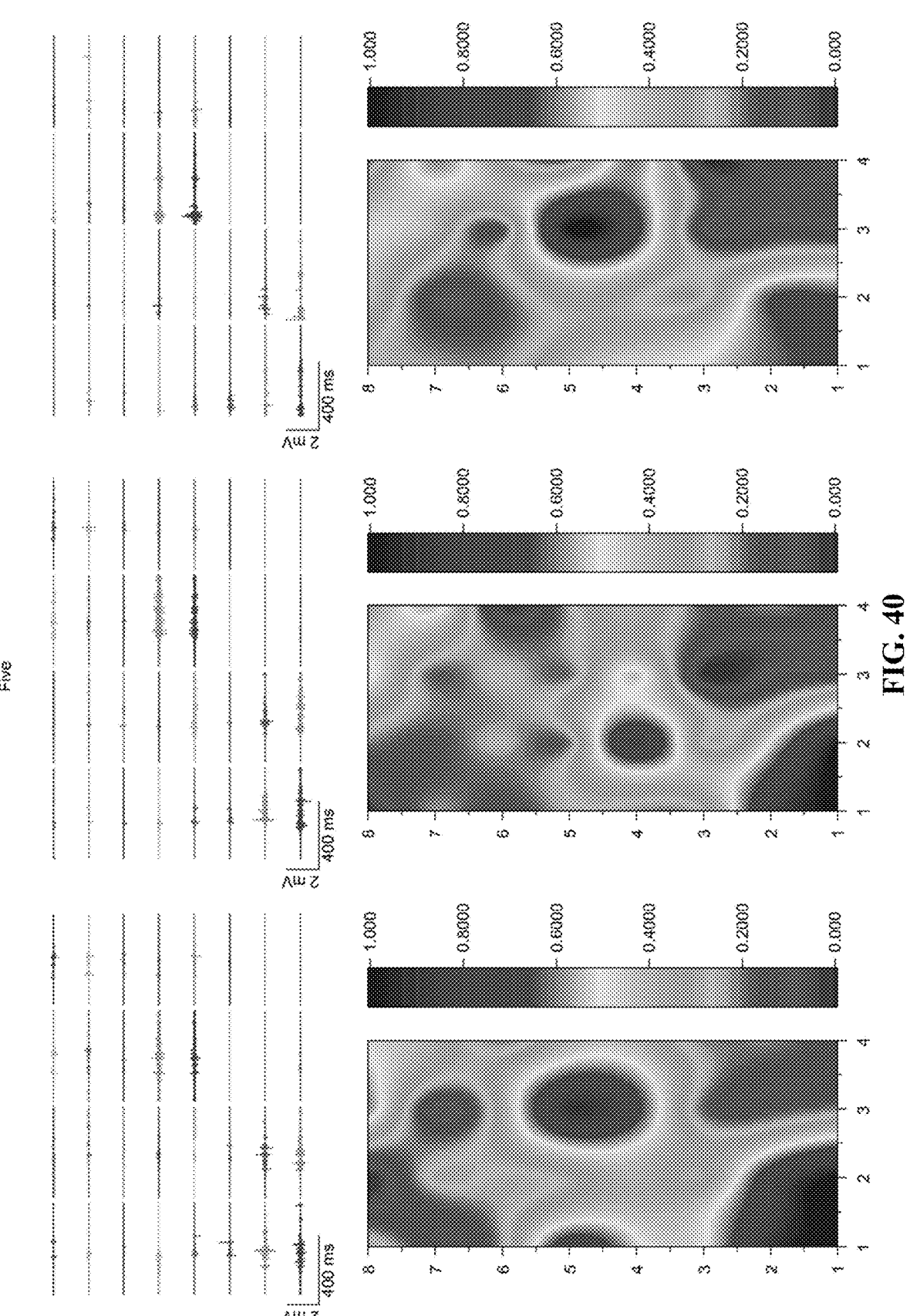
FIG. 40 shows three representative EMG data and calculated heat maps of gesture number five showing the high reproducibility of the stretchable electrode array for sEMG measurement.
Figure 41:
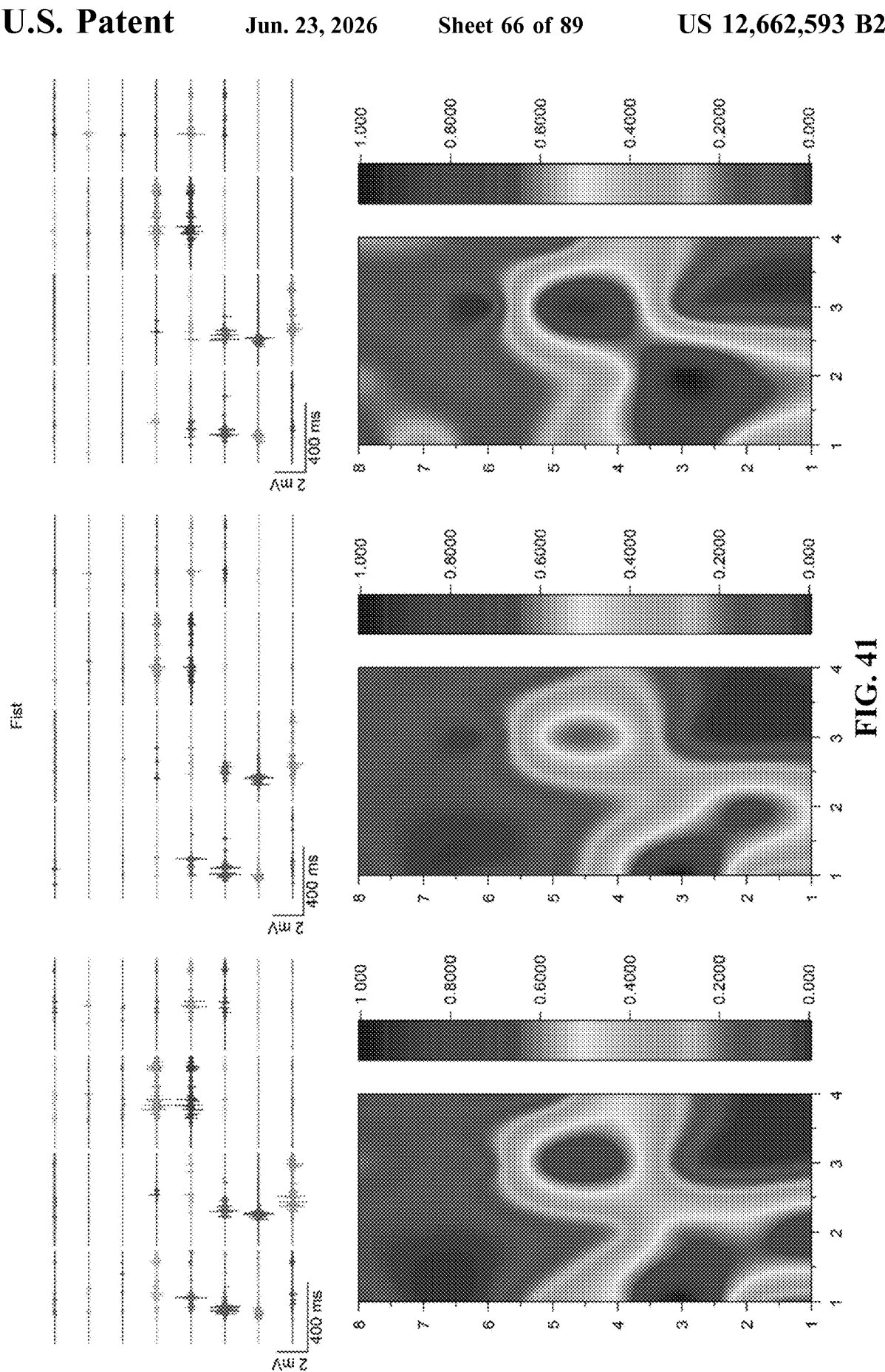
FIG. 41 shows three representative EMG data and calculated heat maps of gesture first showing the high reproducibility of the stretchable electrode array for sEMG measurement.

After achieving the intrinsically stretchable conducting polymer with unprecedented performances, new bioelectronic applications of the material innovation were explored. The first step was to establish a scalable fabrication process that would allow reliable manufacturing of stretchable multielectrode arrays. After optimizing the chemical orthogonality and surface energy of each elastomeric layers, a multi-layer device structure with high density was developed (FIG. 4A, FIG. 33 and FIGS. 34A-34C). Because of the high uniformity of the PR-PEGMA/PEDOT:PSS film and the parallel patterning process using photolithography, the as-fabricated stretchable array has a narrow distribution of both the impedance and the phase angle (FIG. 4B, FIG. 35).

Figure 4C:
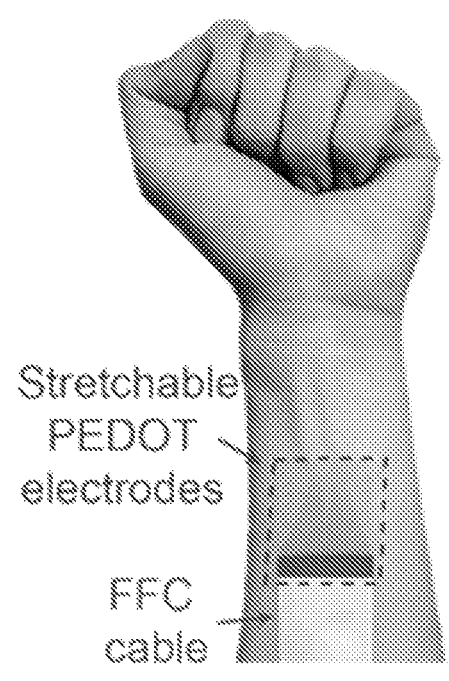
FIG. 4C: Photographic image of the sEMG measurement setup including a tissue conforming stretchable electrode array and a flexible flat cable (FFC) for input/output.
Figure 4D:
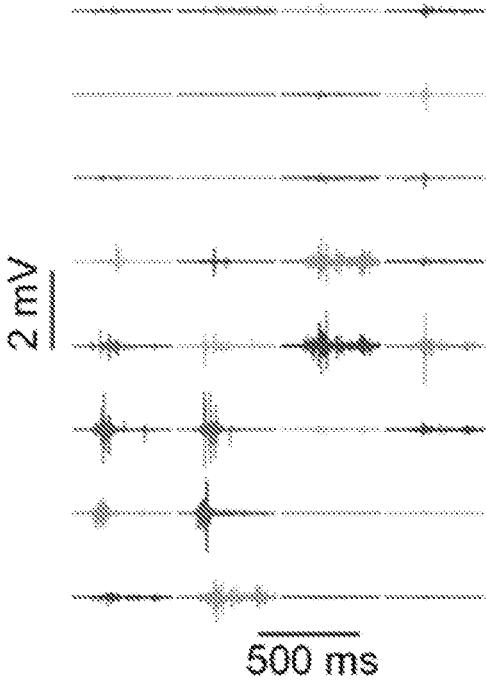
FIG. 4D: Representative EMG recording traces during a first gesture.
Figure 4E:
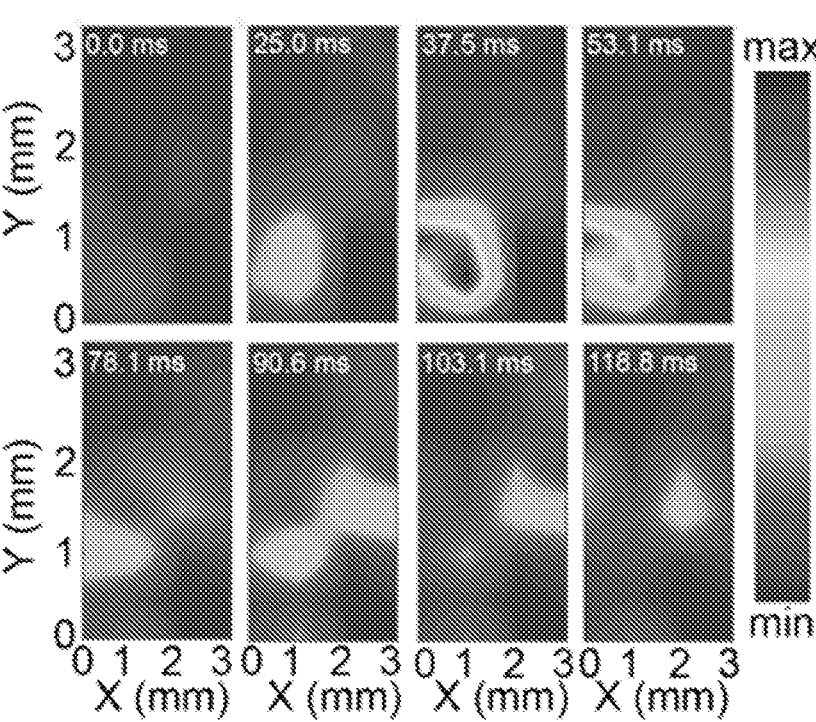
FIG. 4E: Temporal evolution of EMG activity across different channels while fisting.
Figure 4F:
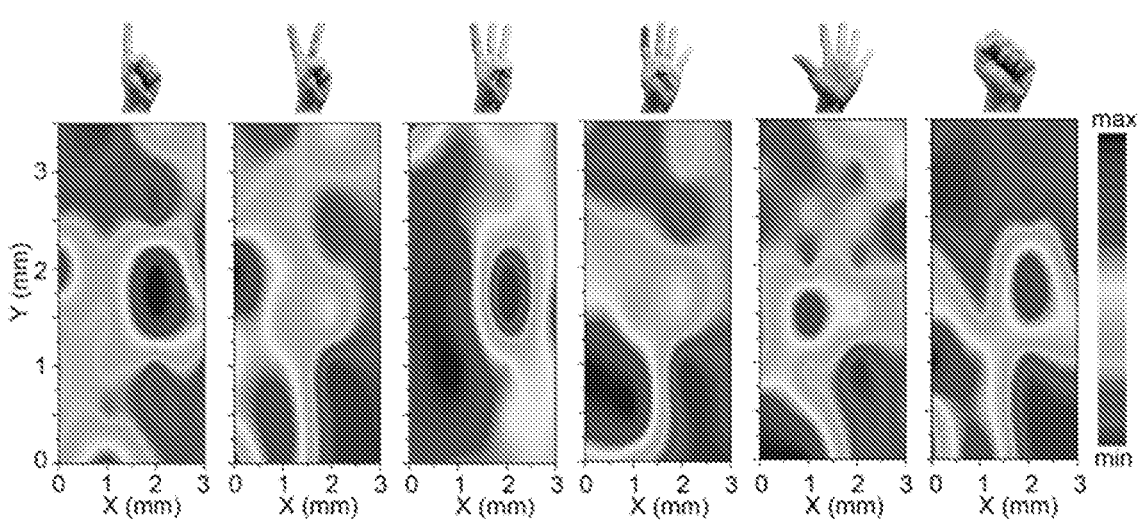
FIG. 4F: Heat maps of integrated EMG signals over time for different hand gestures.

Since the entire electrode array is made of soft and stretchable materials, it can be easily attached onto human skin with great conformability (FIG. 4C), which is ideal for high-density surface electromyography (sEMG) recording. Previously, typical inter-electrode distance (IED) for sEMG devices is on the order of ~ 5 mm because rigid electrodes with poor skin contacts cannot offer high enough signal-to-noise ratio (SNR) for reliable recording at smaller scales. In the case, because of the low impedance of PEDOT:PSS and low modulus of the entire electrode array, the IED could be pushed down to 500 μm while still being able to capture sEMG signals with high fidelity (FIG. 4A). Importantly, when the stretchable electrode array was used to record the forearm muscle activity during a fisting gesture, each channel showed unique signatures of EMG activities with clear spatial distribution and temporal propagation (FIGS. 4D-4E). Besides recording the dynamic information, the integrated EMG signals over time was also distinct enough to differentiate other hand gestures in a reproducible manner (FIG. 4F, FIGS. 36-41). Further analysis of these subtle muscle activities on the cellular scale may offer critical insights for the study of kinesiology and serve as the foundation for future skin electronics as a non-invasive and robust human-machine interface for prosthetics applications.

Figure 4G:
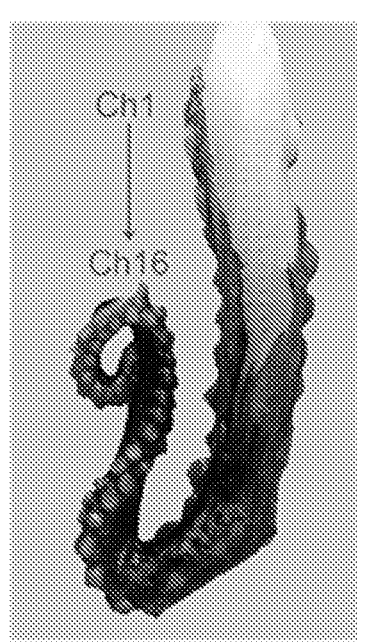
FIG. 4G: Photographic image of a stretchable electrode array attached to an octopus leg.
Figure 4H:
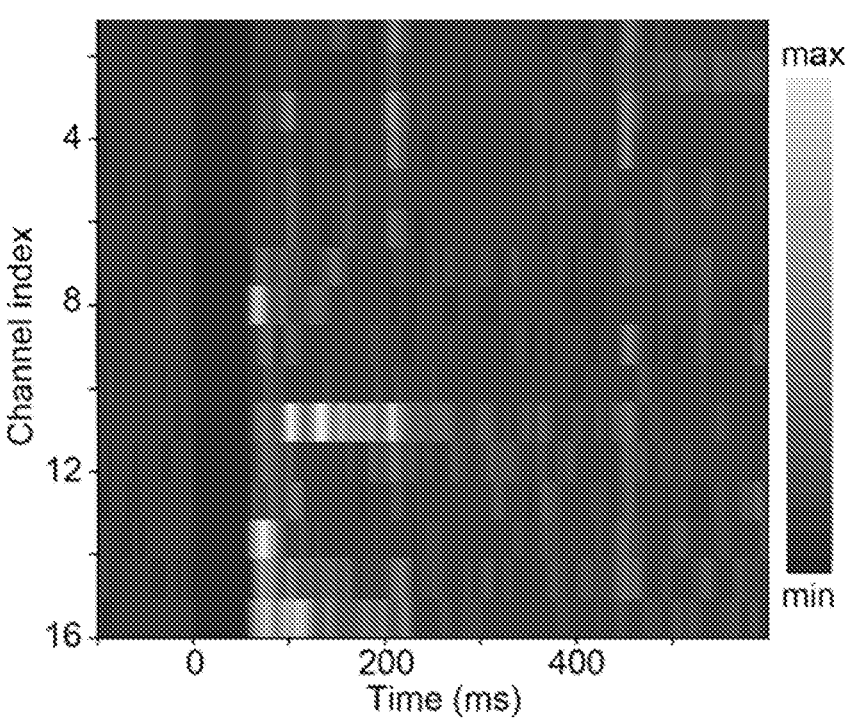
FIG. 4H: Peristimulus time histogram of evoked EMG activities of the octopus.
Figure 42:
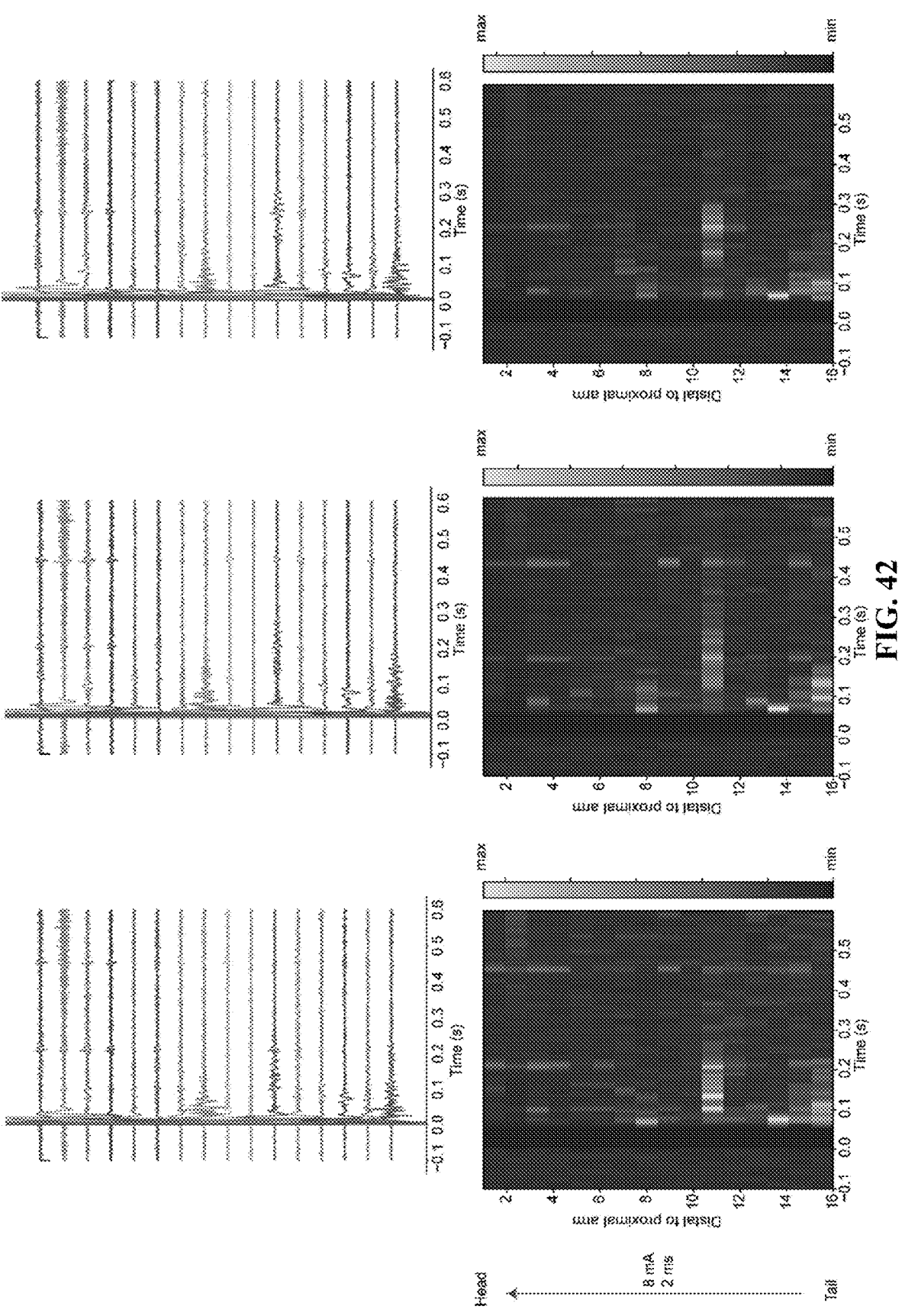
FIG. 42 shows three representative EMG data collected using stretchable electrode array and calculated heat maps of octopus leg upon stimulation with the electric field from tail to head.
Figure 43:
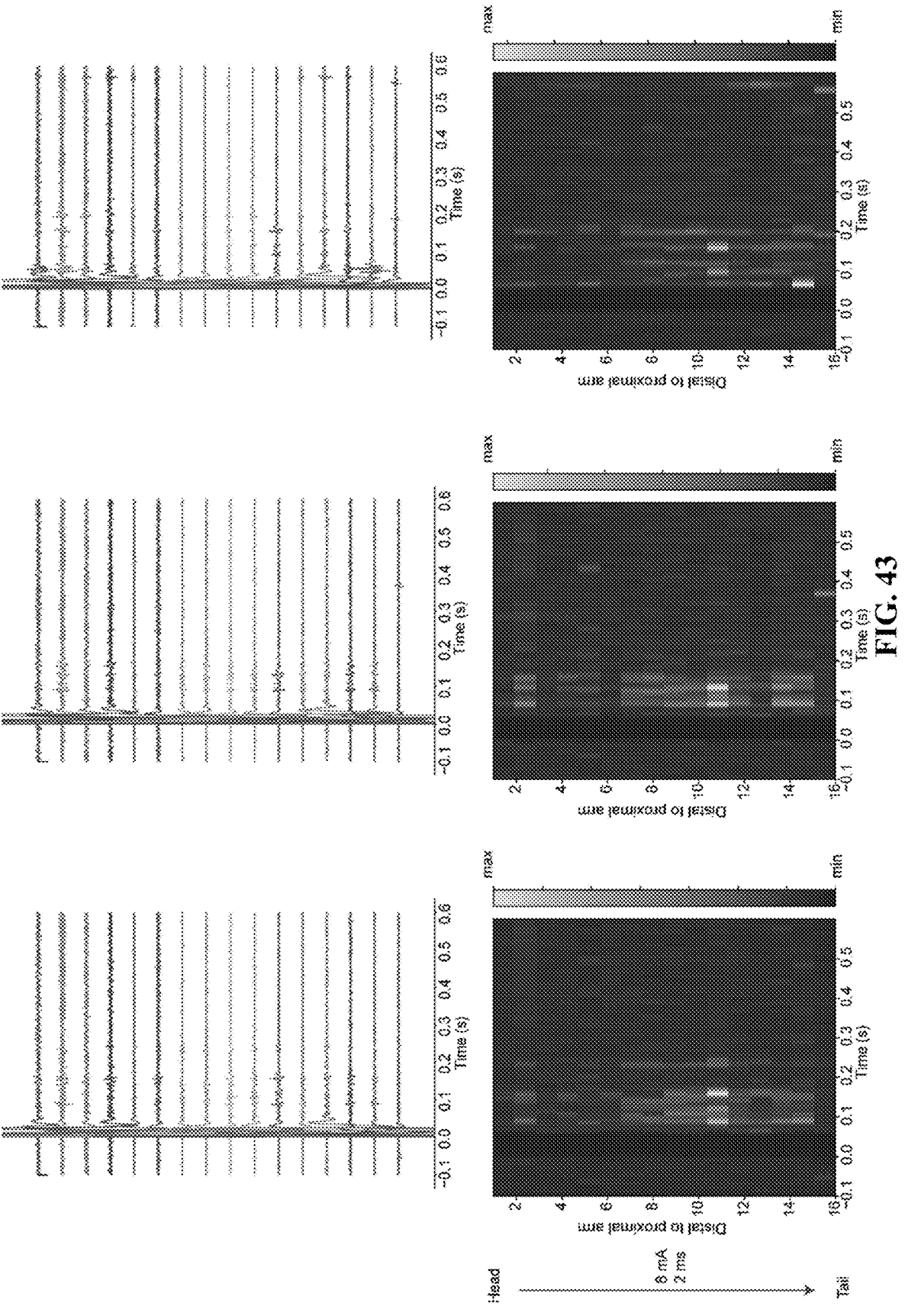
FIG. 43 shows three representative EMG data collected using stretchable electrode array and calculated heat maps of octopus leg upon stimulation with the electric field from head to tail.
Figure 44:
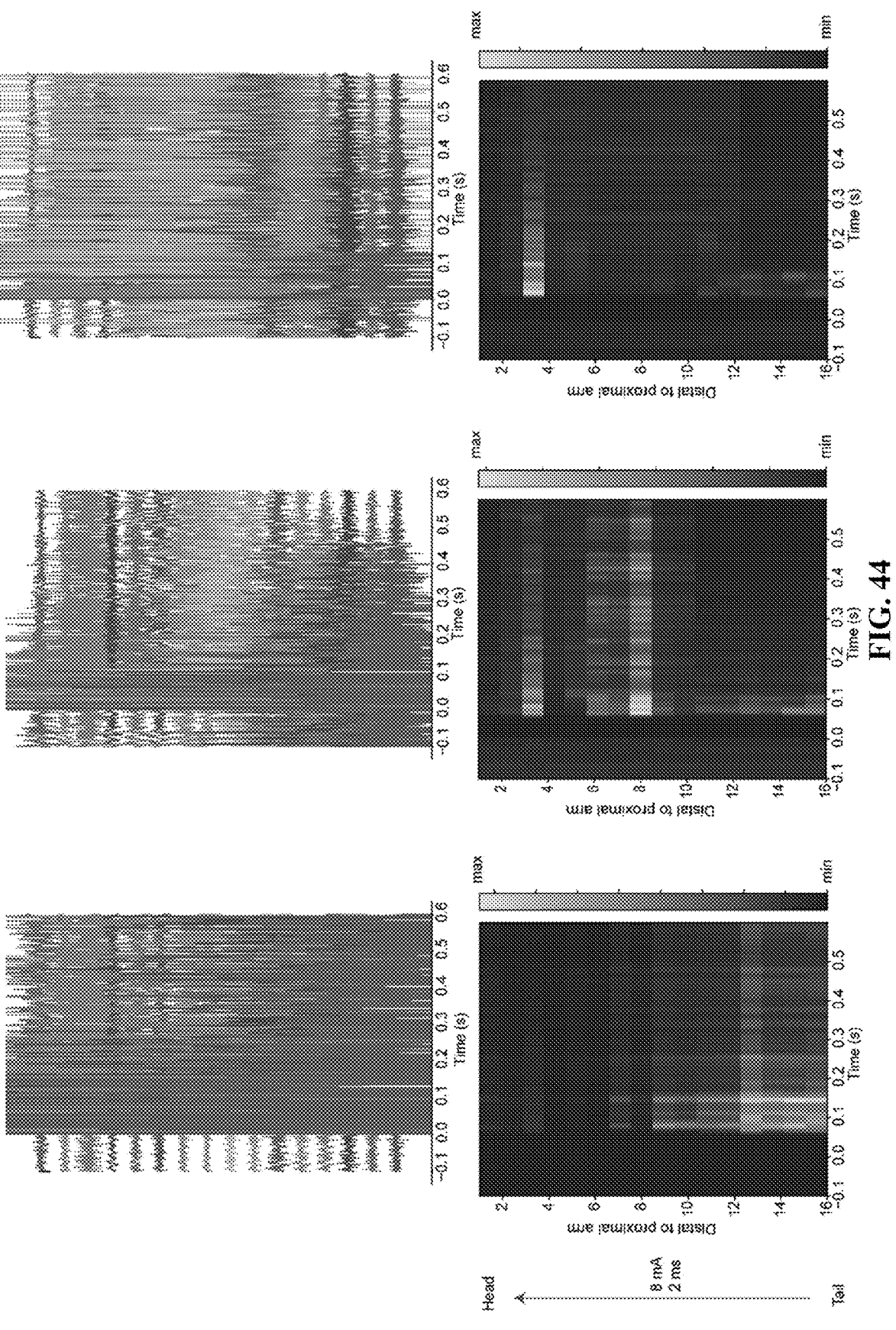
FIG. 44 shows three representative EMG data collected using rigid electrode array and calculated heat maps of octopus leg upon stimulation with the electric field from tail to head. The rigid probe cannot follow the movement of the leg, leading to significant noises during the recording.
Figure 45A:
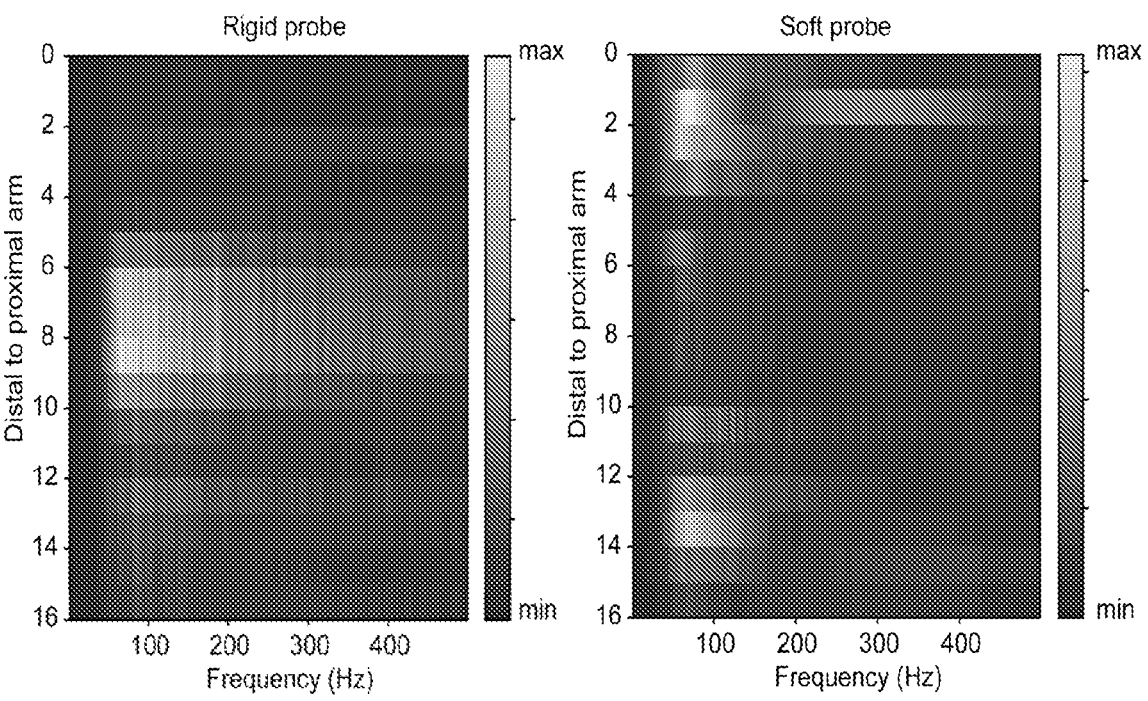
FIGS. 45A-45B show comparison of FFT spectra (FIG. 45A) and variance (FIG. 45B) between soft and rigid probes. The soft probe has a significantly higher SNR because of its ability to conform during muscle movements.
Figure 45B:
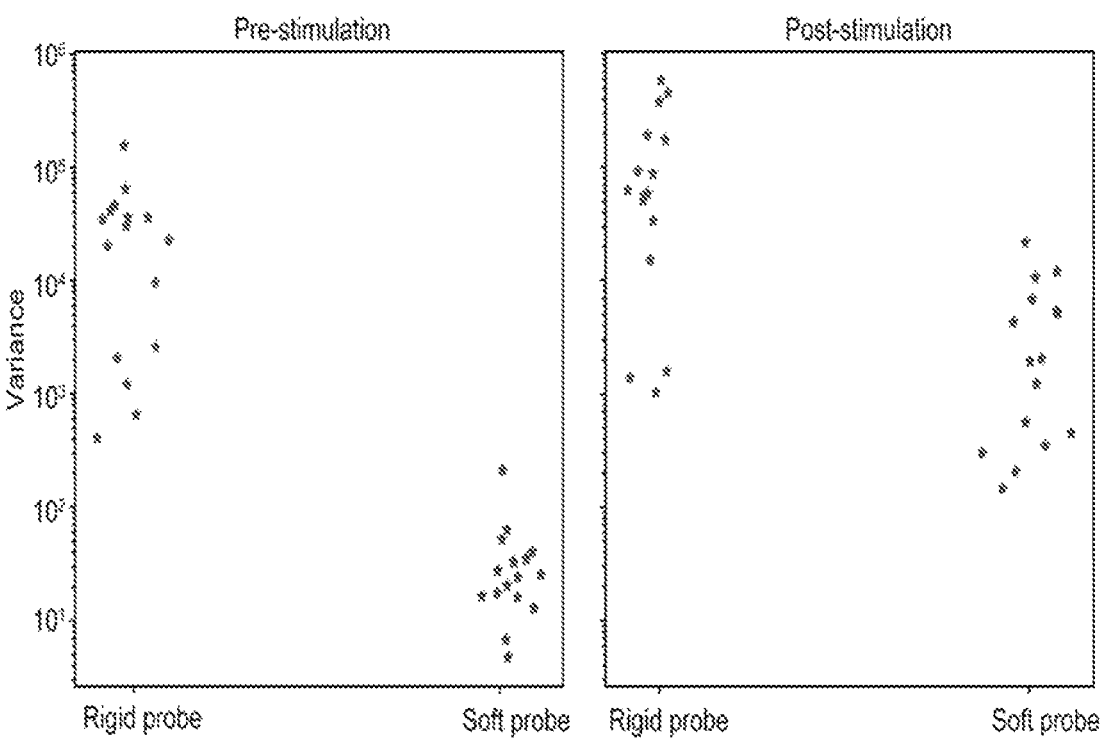
Figure 46A:
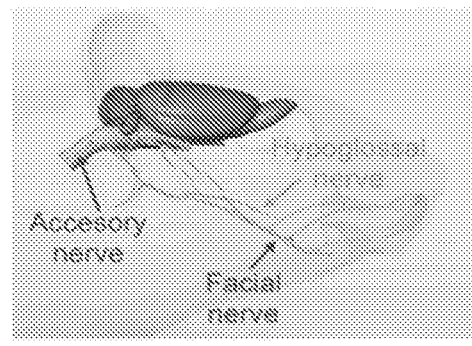
FIGS. 46A-46C show overall design of localized neuromodulation through brainstem using the stretchable electrode array.
Figure 46A:
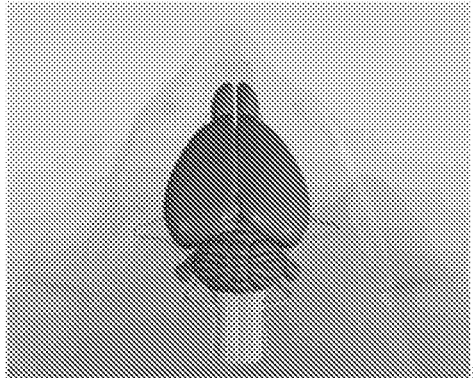
Figure 46B:
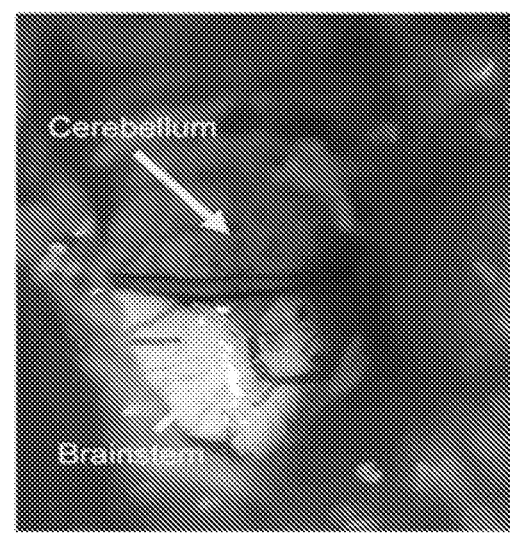
Figure 46B:
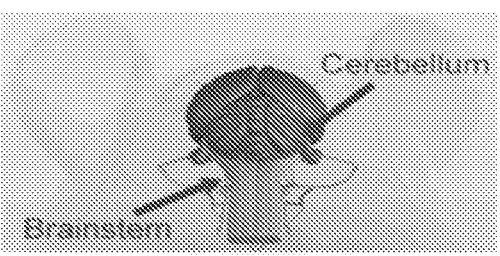
Figure 46C:
Figure 46C:
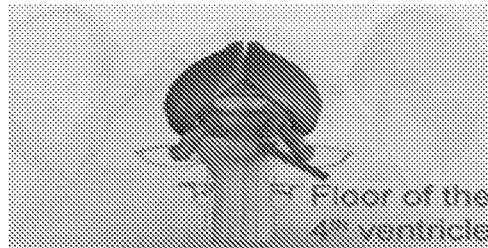
Figure 46D:
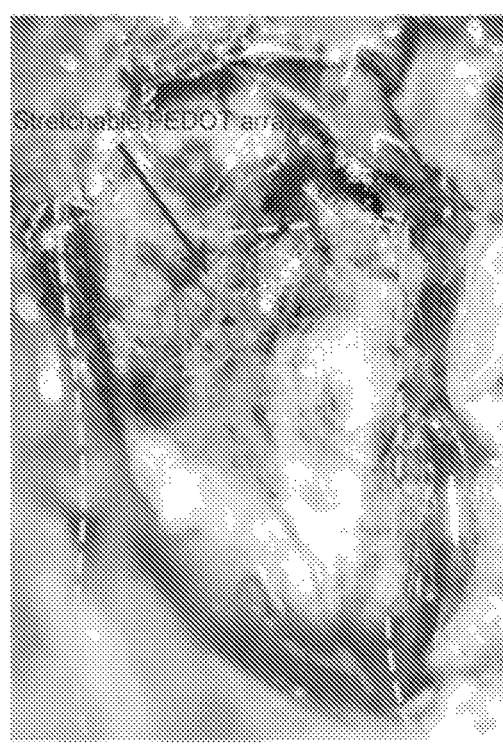
Figure 47C:
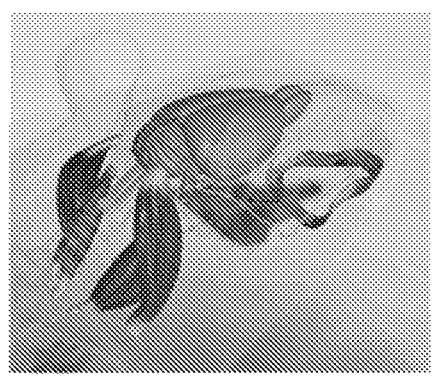
Figure 47C:
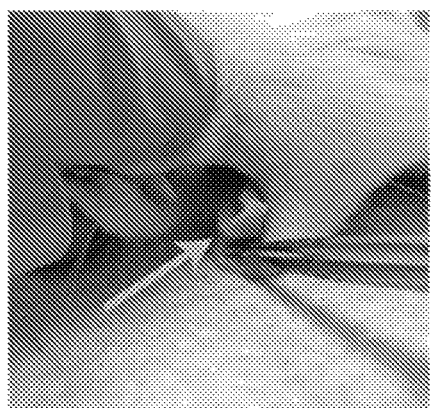
Figure 48A:
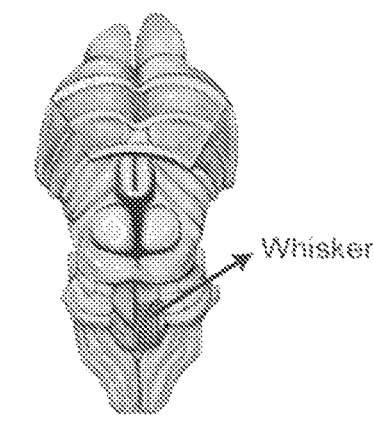
FIGS. 48A-48C show schematic diagrams and recorded data showing the ability of stretchable PEDOT:PSS array for precise control of whisker movements through localized stimulation of the facial colliculus and the facial nerve/orbicularis or is pair.
Figure 48A:
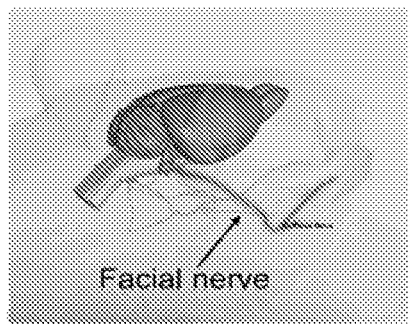
Figure 48B:
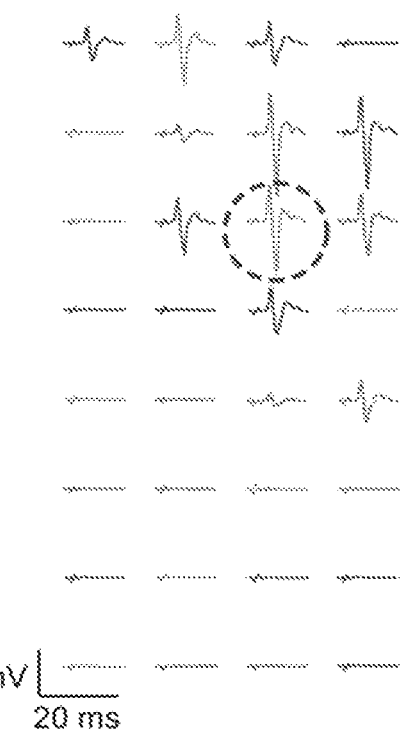
Figure 48C:
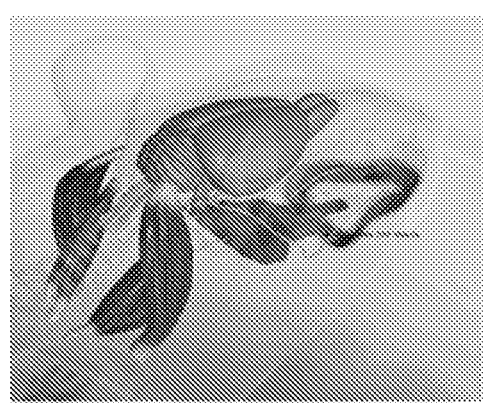
Figure 48C:
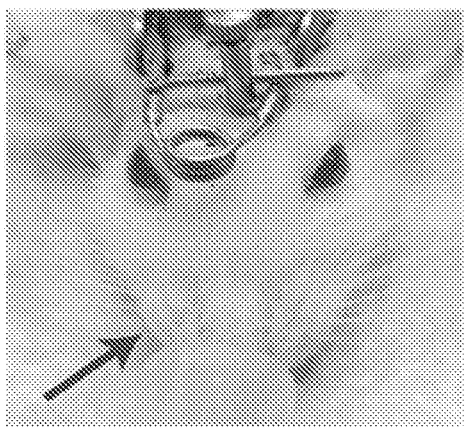
Figure 48C:
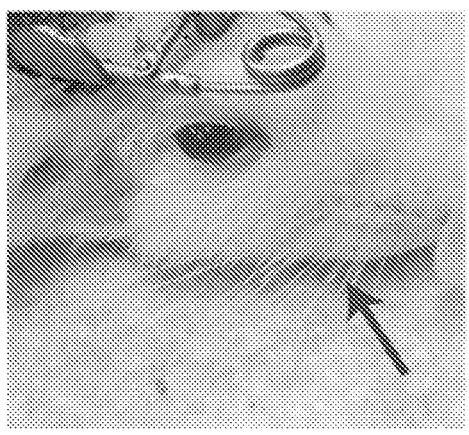
Figure 49A:
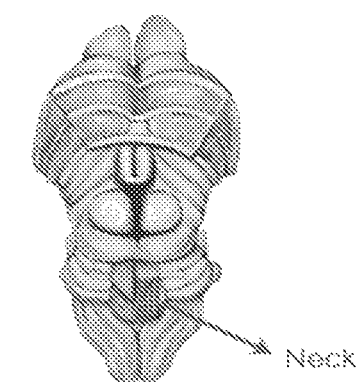
FIGS. 49A-49C show schematic diagrams and recorded data showing the ability of stretchable PEDOT:PSS array for precise control of neck movements through localized stimulation of the accessory nucleus the accessory nerve/sternocleidomastoid pair.
Figure 49A:
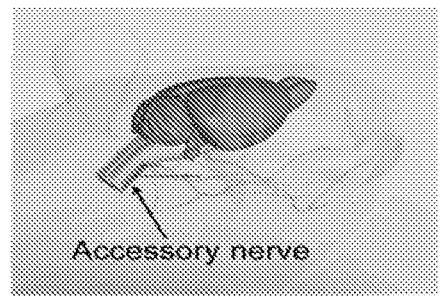
Figure 49B:
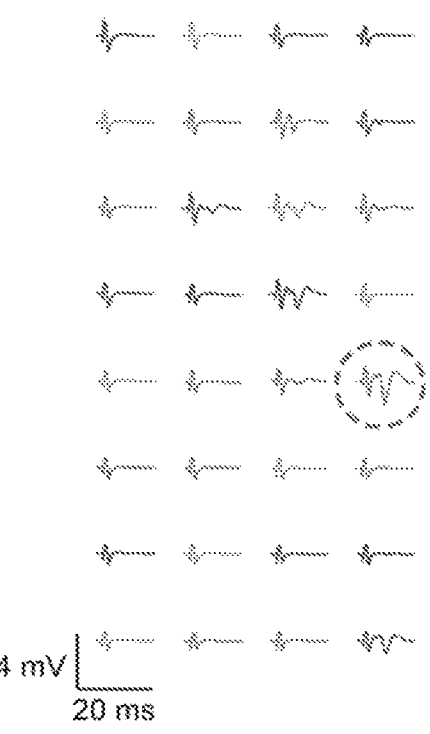
Figure 49C:
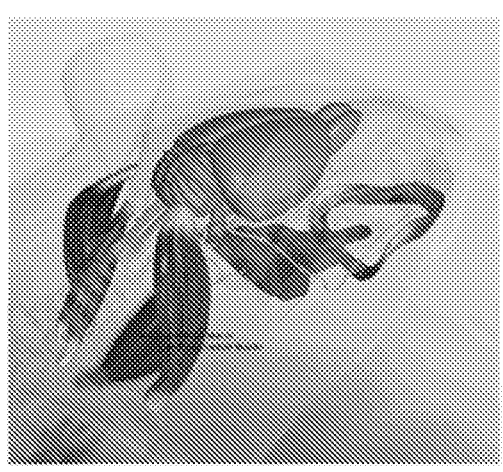
Figure 49C:
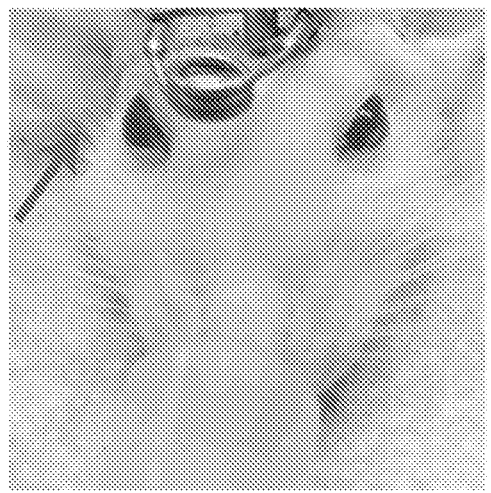
Figure 49C:
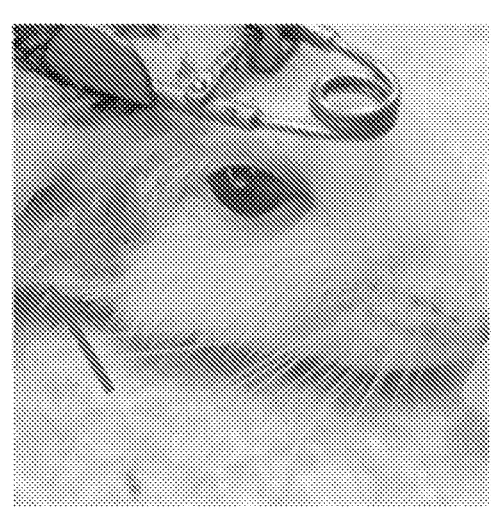

To further demonstrate the utility of the stretchable sEMG array, it was applied to soft-bodied octopus, whose muscles can undergo much larger deformations than those of a human (FIG. 4G). Upon electrical stimulation of the octopus leg, the stretchable sEMG array could consistently record the muscle activity dynamics with good SNR (FIG. 4H, FIGS. 42-43). On the contrary, a rigid probe would slip along the muscle surface due to its inability to follow the tissue contour and ended up with extremely noisy signals (FIG. 44, FIGS. 45A-45B). Moving forward, the stretchable electrode array may be further extended to soft robotic applications where robust operation under extreme deformation is needed.

Figure 4I:
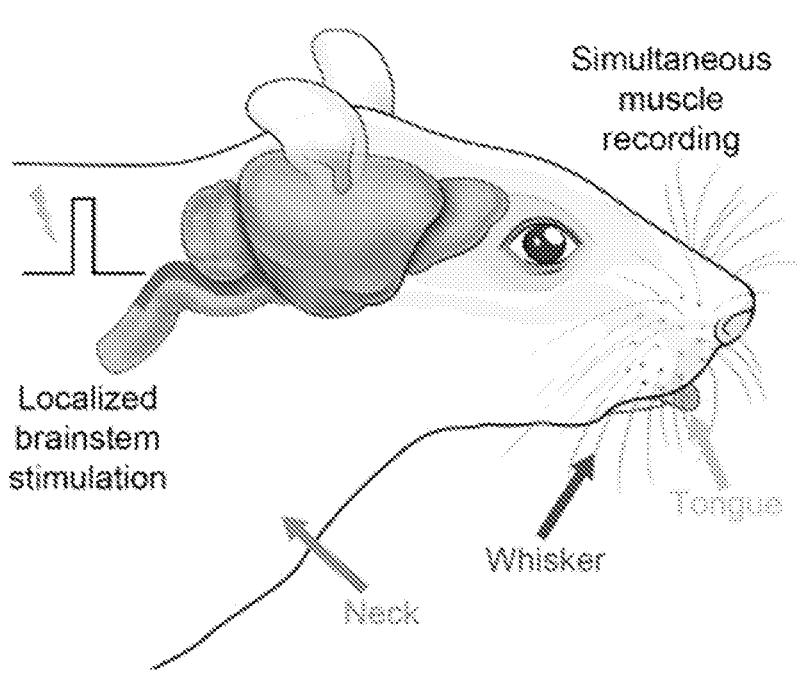
FIG. 4I: Schematic diagram illustrating the application of the stretchable electrode array for precise neuromodulation through localized brainstem stimulation.
Figure 4J:
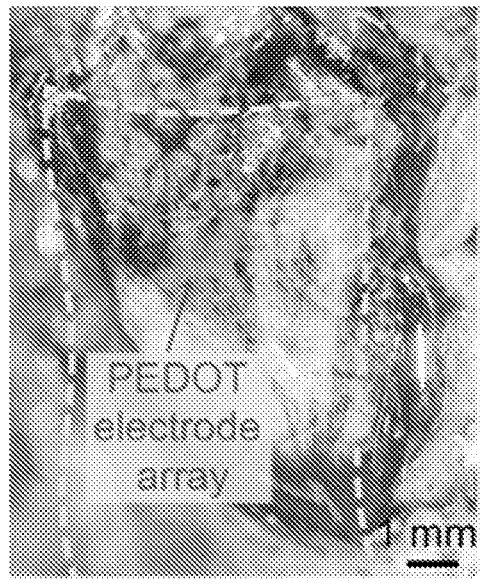
FIG. 4J: Microscope image of a stretchable electrode array conforming to the curved floor of the fourth ventricle.

Finally, given the unique advantage (i.e., low impedance and high charge injection capacity) of PEDOT:PSS, it was also used for electrical stimulation to demonstrate the possibility to construct bidirectional multimodal interfaces. Compared to existing devices, the soft and stretchable high-density electrode array allows the interrogation of biological activities at previously inaccessible locations with unprecedented precision. In this regard, the brainstem would be a perfect testbed for the following reasons (FIG. 4I). First, the brainstem is naturally curved and could experience large strain during the movements of cervical spines (FIGS. 46A-46D). Considering its essential role in regulating cardiac and respiratory functions, it is of utter importance for the device to be soft and stretchable to avoid any possible damages. Next, the brainstem serves as the central hub for motor controls of almost all facial and neck motions through ten pairs of cranial nerves (FIGS. 46A-46D). Thus, a high-density electrode array is crucial for precise control of downstream activities.

Figure 4K:
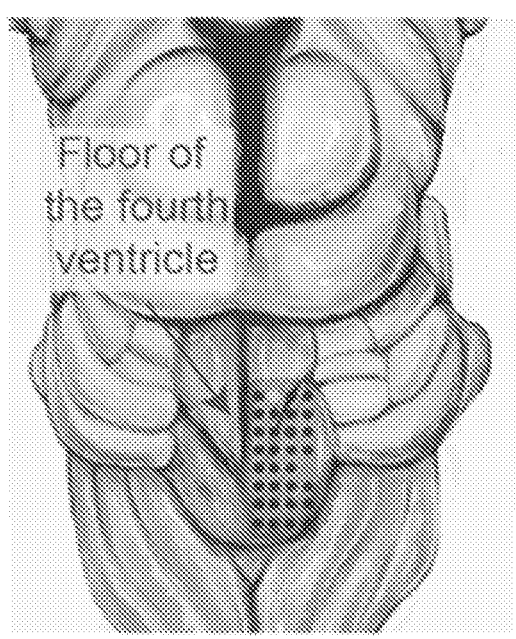
FIG. 4K: Schematic illustration of a multi-electrode array placed on the right side of the brainstem.
Figure 4L:
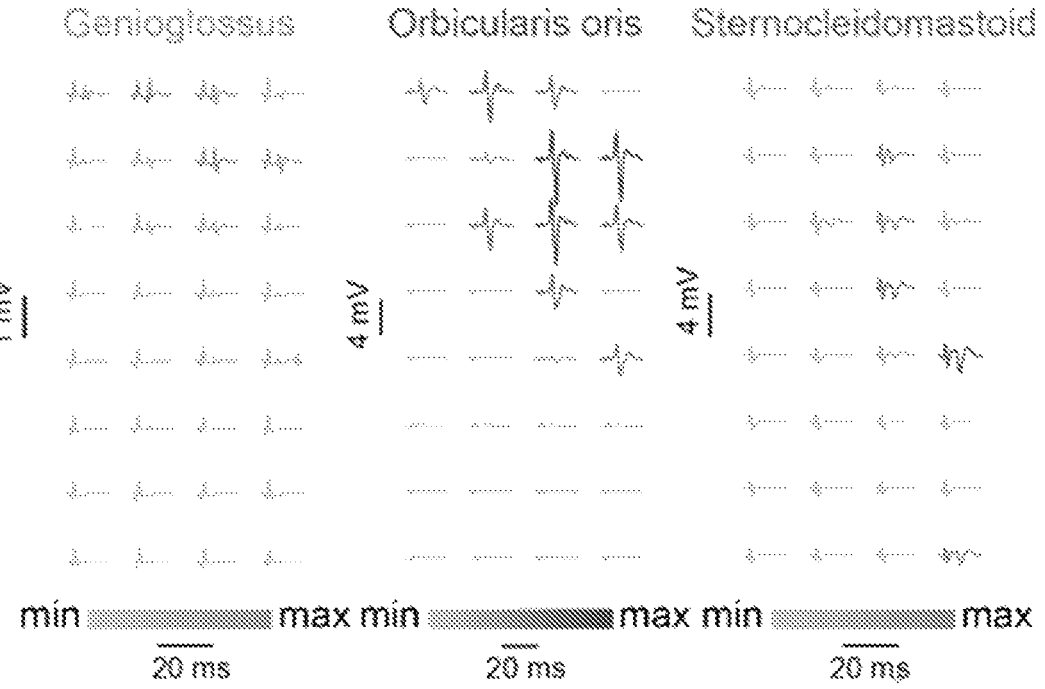
FIG. 4L: Evoked muscle activities recorded at the tongue (left), whisker (middle), and neck (right) following electrical stimulation at the brainstem.
Figures 4M, 4N:
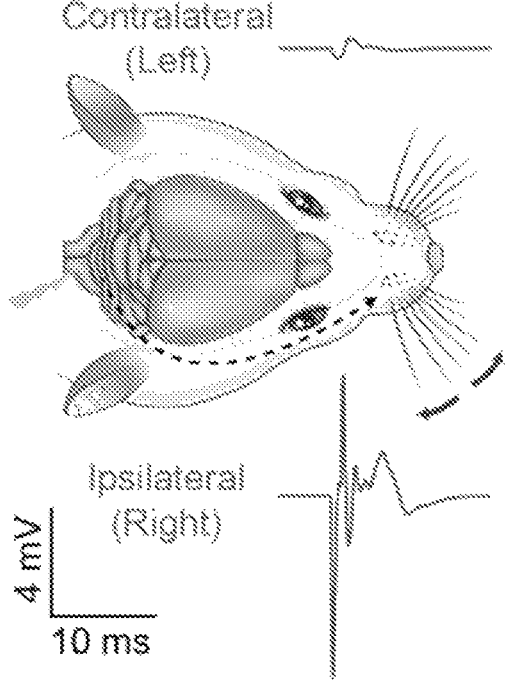
FIG. 4M: Activation maps based on the muscle activities depicting the spatial distribution of different nucleus (marked by dashed lines) in the brainstem with downstream connections to the hypoglossal nerve (left), facial nerve (middle), and accessory nerve (right).
FIG. 4N: Schematic diagram and representative data traces showing the side specificity of the brainstem stimulation.
Figure 4Q:
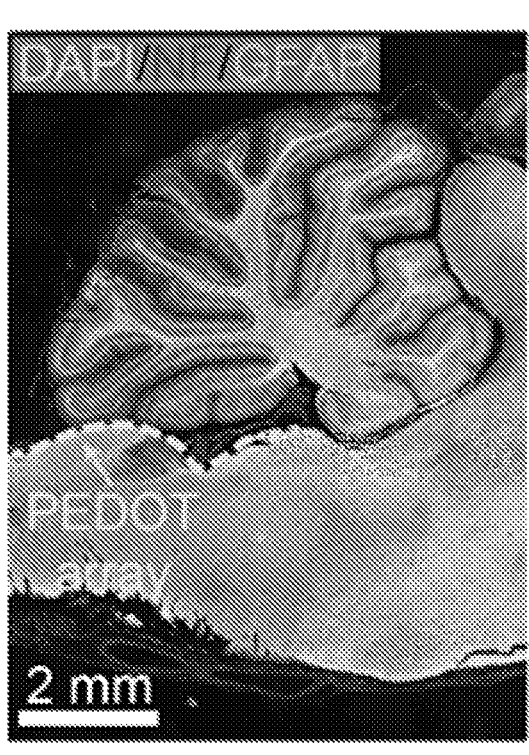
Figure 50A:
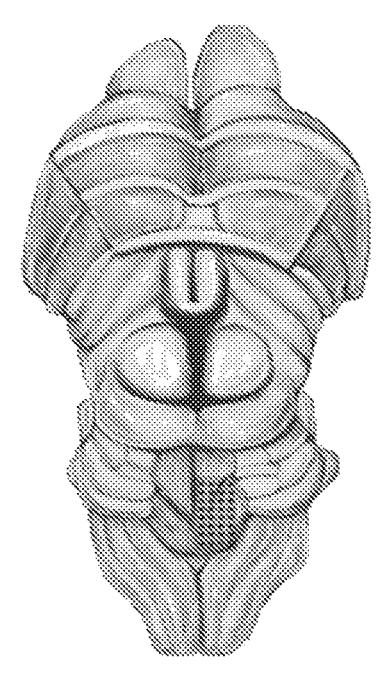
FIGS. 50A-50B show that the localized neuromodulation was reproduced on another rat with similar patterns of the activation map.
Figure 50B:
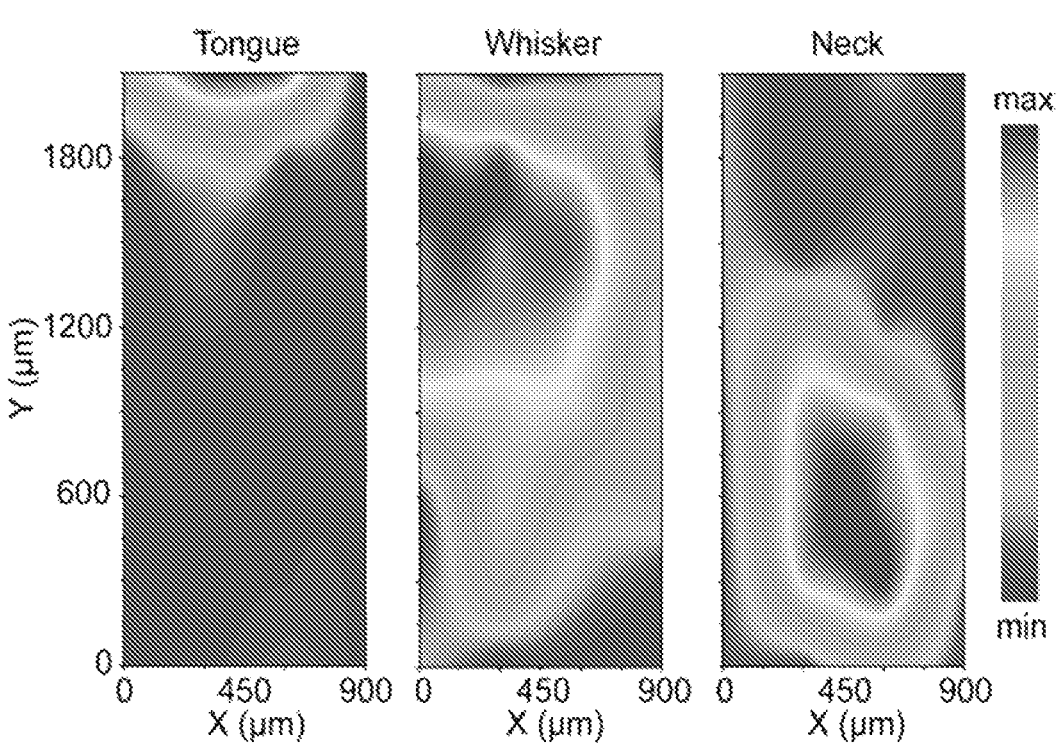
Figure 51A:
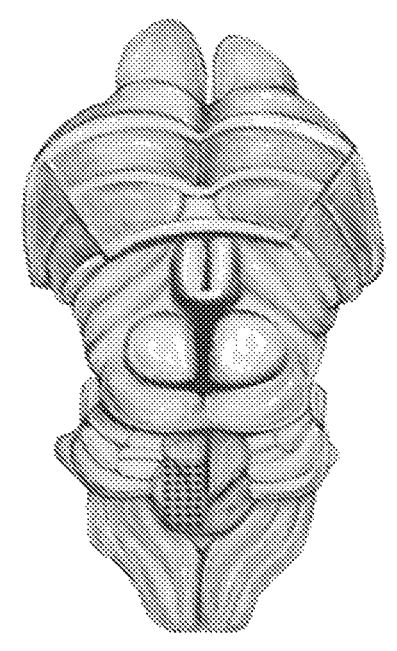
FIGS. 51A-51B show that stretchable electrode array placed on the left side of the brainstem elicited responses of downstream muscles on the same side.
Figure 51B:
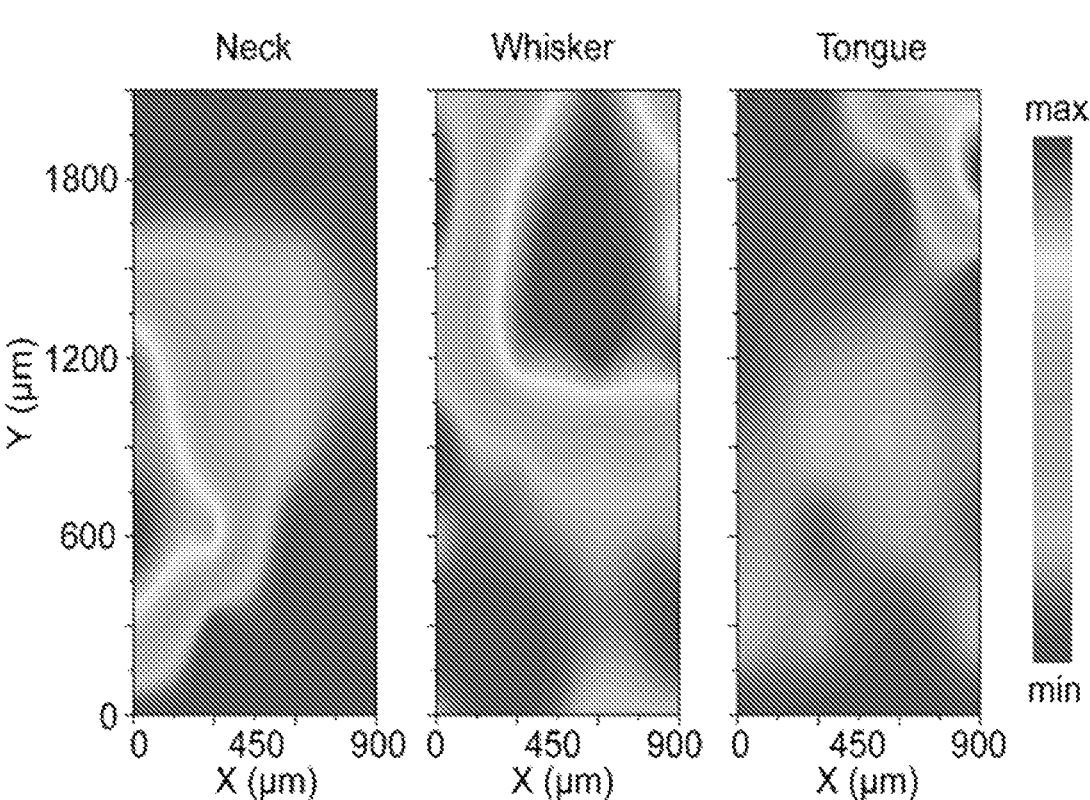
Figure 52A:
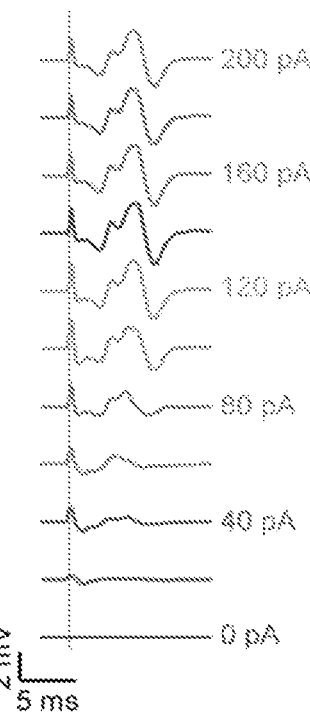
FIGS. 52A-52B show that the evoked muscle response is dependent on the stimulus amplitude. The cyan bar represents the stimulation artifact.
Figure 52B:
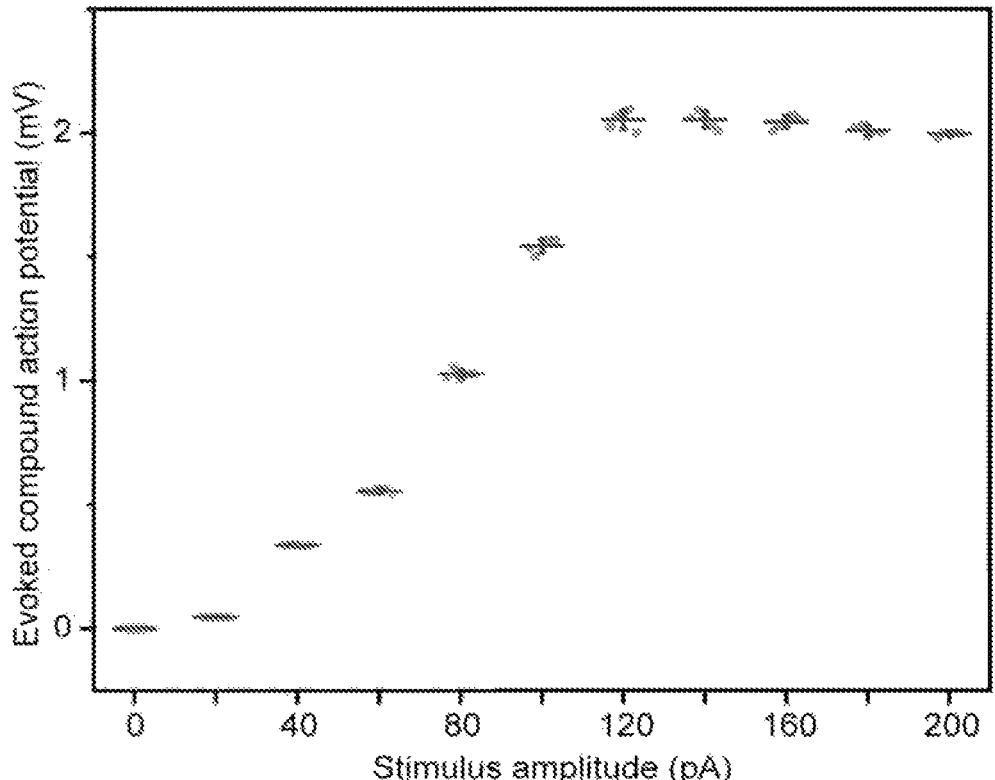
Figure 53A:
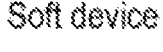
FIGS. 53A-53B show H&E staining results of brain slices after insertion of the soft (FIG. 53A) and rigid (FIG. 53B) probes. The rigid probe caused severe insertion trauma at the brain stem.
Figure 53A:
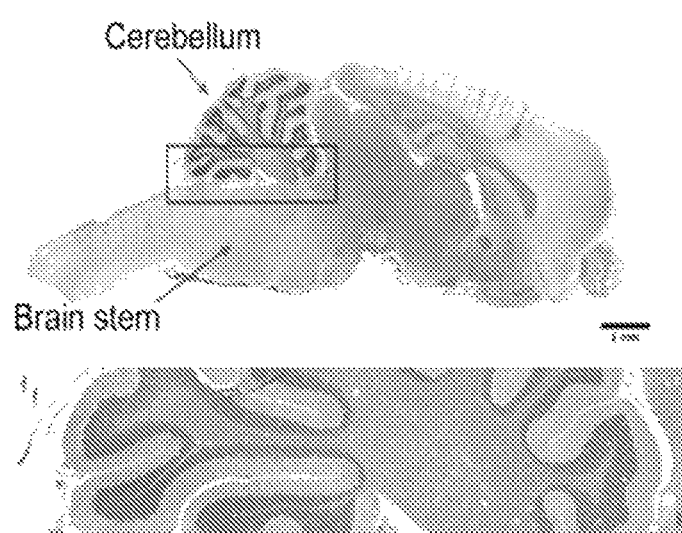
Figure 53B:
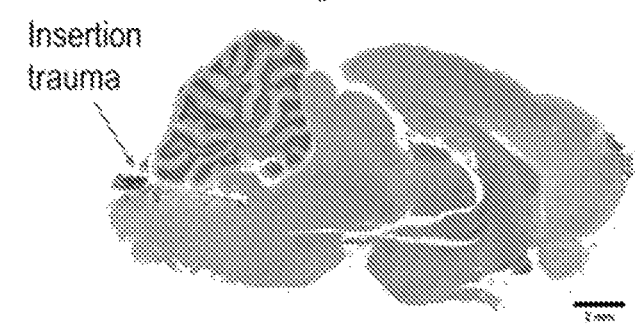
Figure 53B:
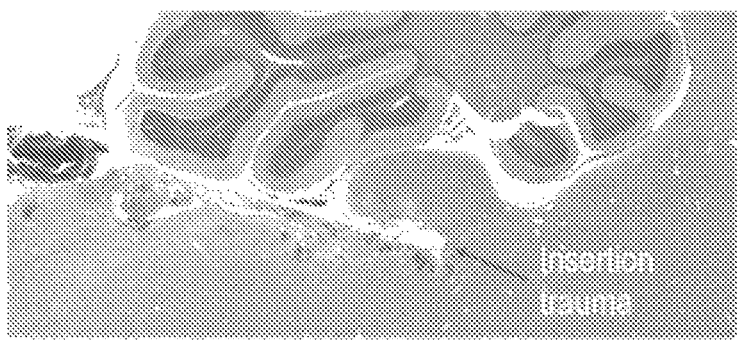
Figure 54A:
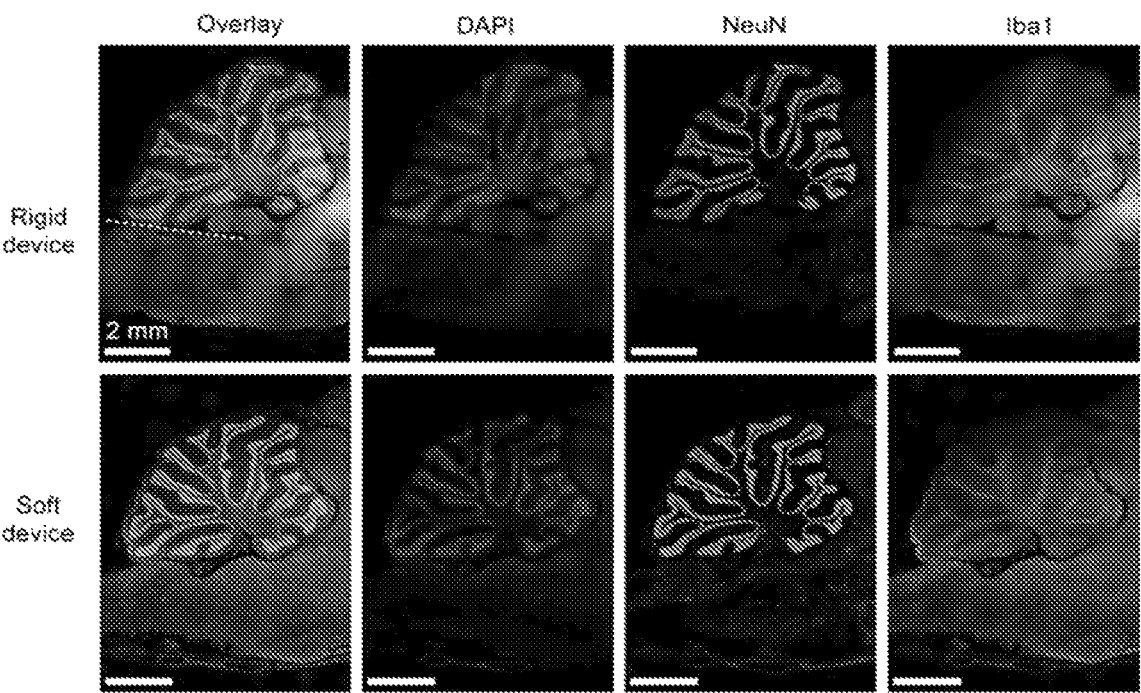
FIGS. 54A-54B show immunofluorescence results of brain slices after insertion of the soft and rigid probes stained with DAPI, NeuN, and Ibal. The insertion of the rigid probe caused local death of neurons near the insertion site.
Figure 54B:
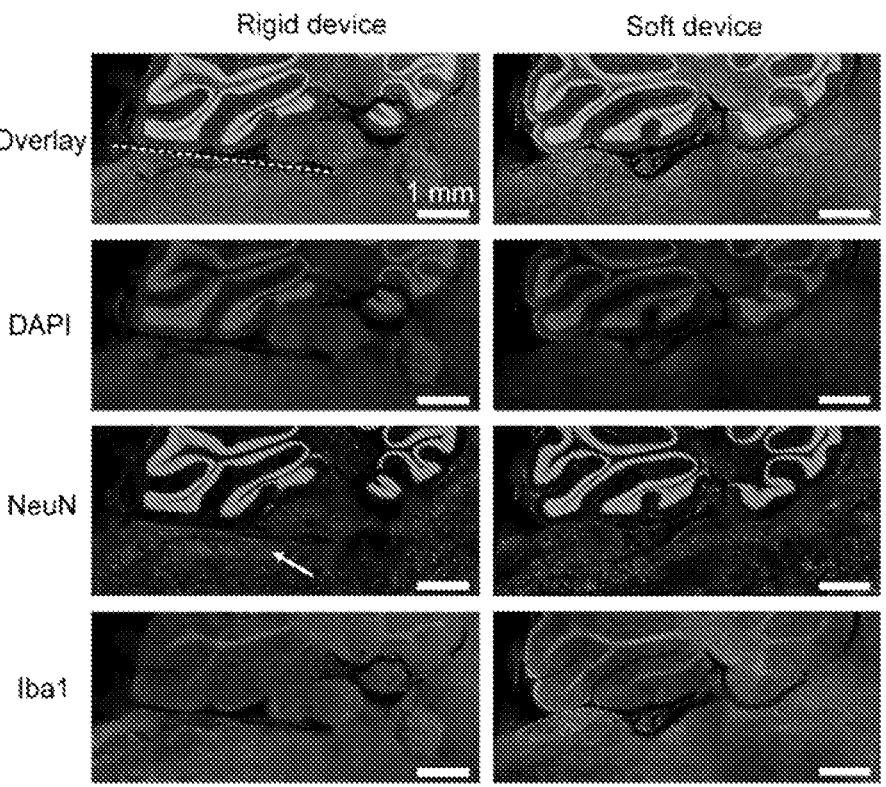
Figure 55A:
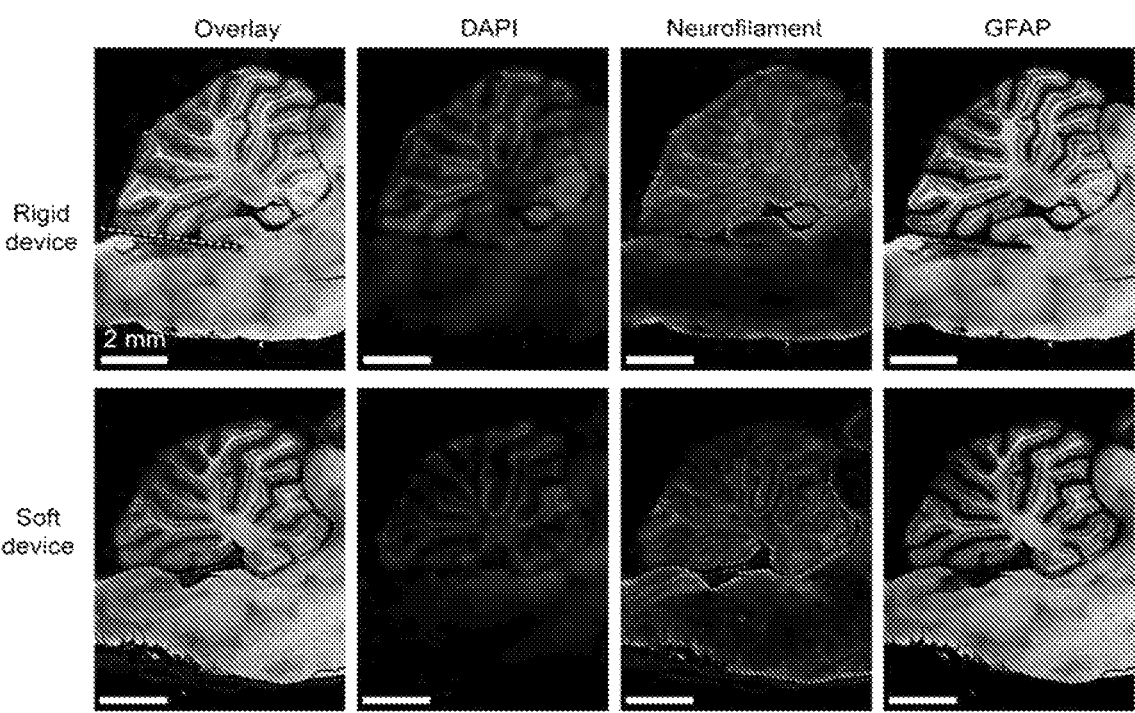
FIGS. 55A-55B show immunofluorescence results of brain slices after insertion of the soft and rigid probes stained with DAPI, Neurofilament, and GFAP. The insertion of the rigid probe caused local damage of neurofilament near the insertion site.
Figure 55B:
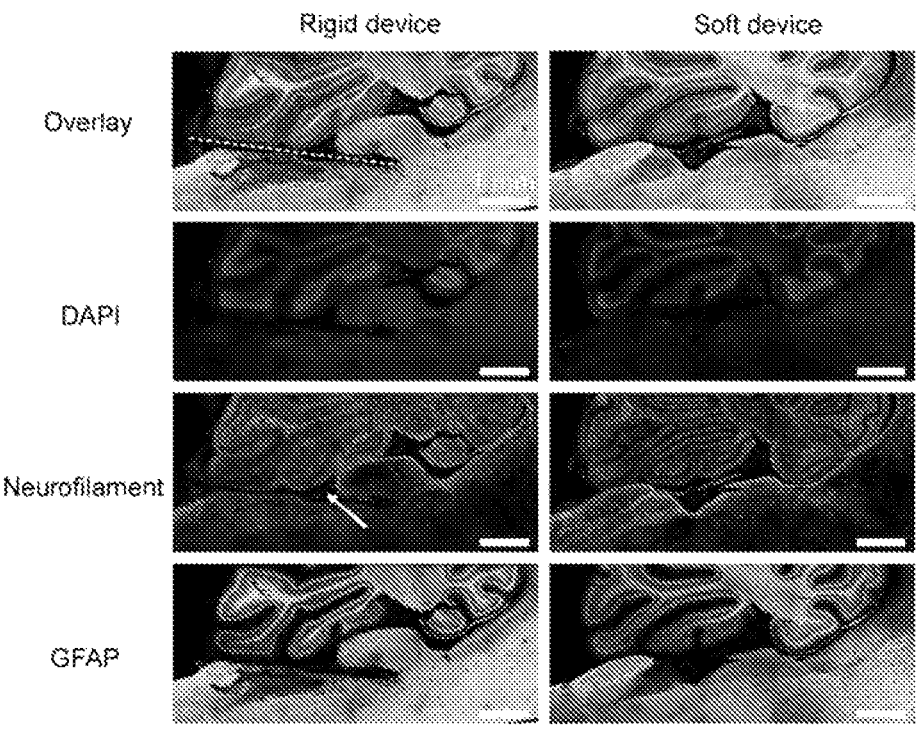
Figure 56:
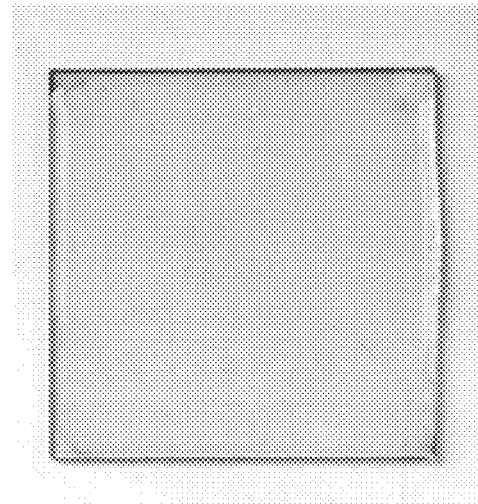
Figure 56:
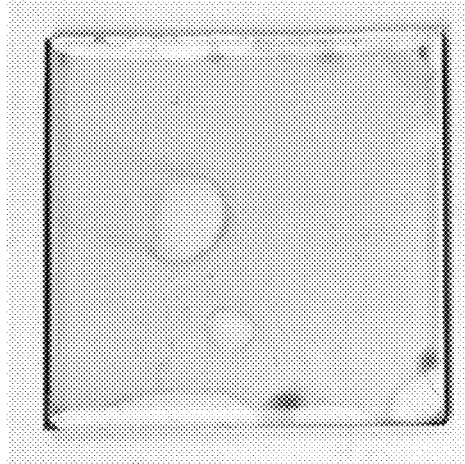
Figure 59:
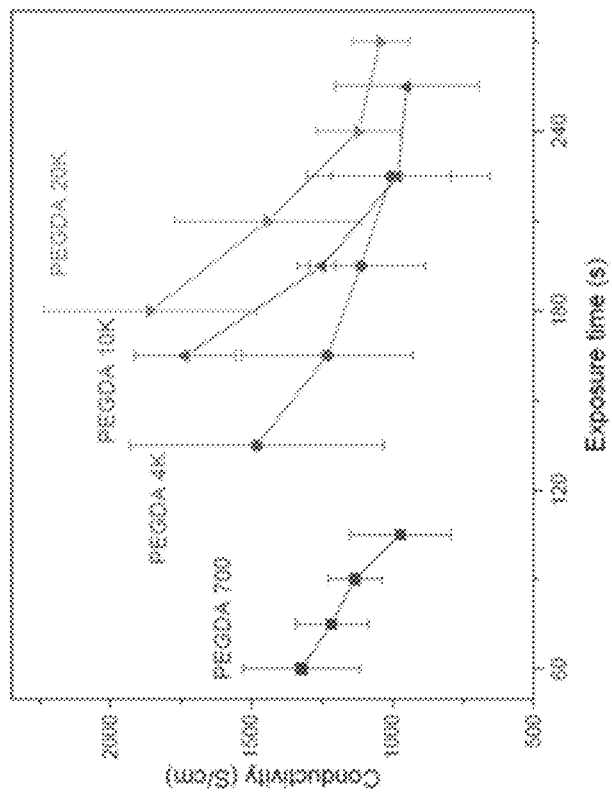
FIG. 59 shows that PEGDA allows direct photopatterning with PEDOT with high conductivity.
Figure 59:
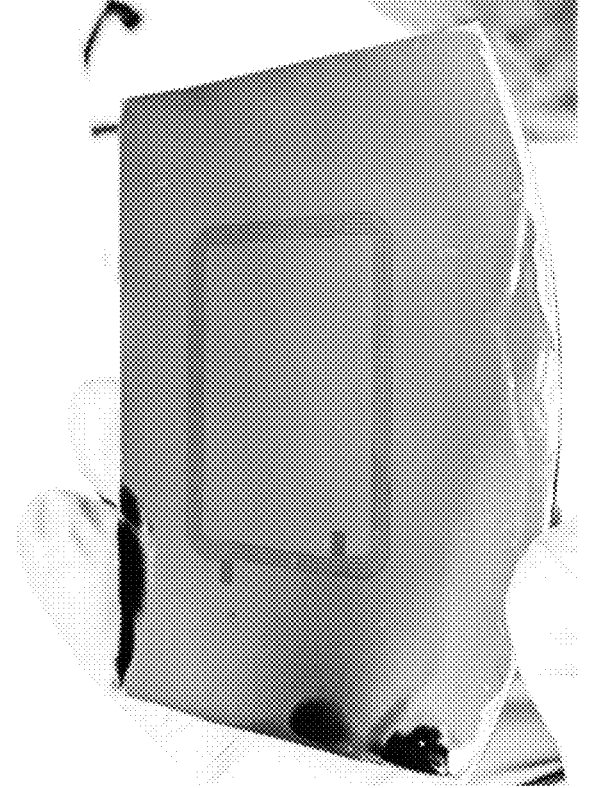
Figure 60:
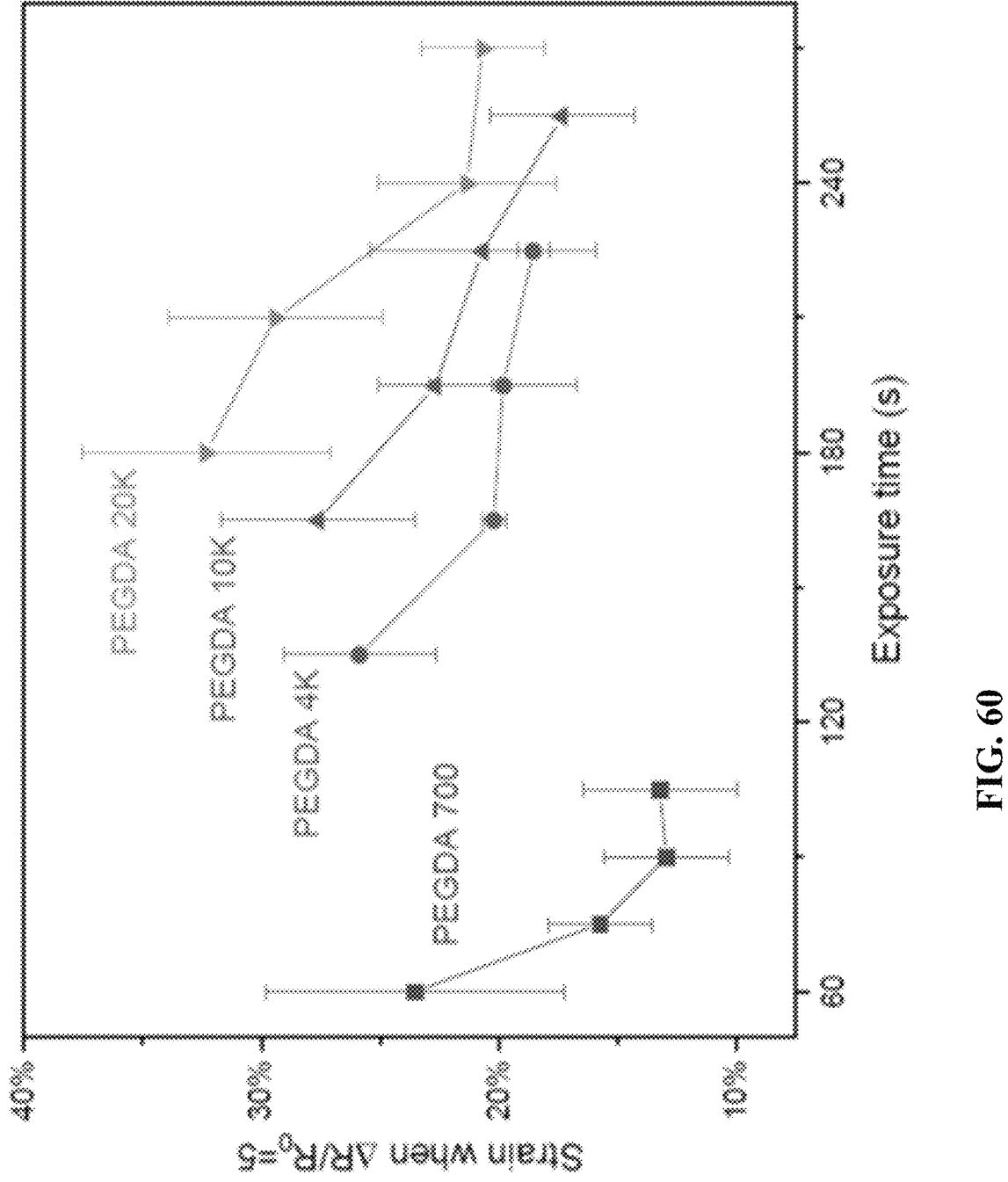
FIG. 60 shows PEDOT with crosslinked PEGDA has poor stretchability.

It was shown for the first time that, when placed on the floor of the fourth ventricle, the stretchable electrode array of the present technology easily follows the underlying curvature to form intimate contacts (FIG. 4J, FIGS. 46A-46D). Later, when current pulses were delivered to individual channels and both the EMG and motion signals were simultaneously recorded at the tongue, whisker, and neck (FIG. 4K), the evolution of muscle signals and corresponding movements over the entire electrode array could be observed clearly (FIG. 4L, FIGS. 47A-47C, FIGS. 48A-48C, FIGS. 49A-49C). After normalizing EMG activities elicited by each channel, three activation maps were constructed; the three activation maps correlate with the nucleus of hypoglossal, facial, and accessory nerves that controlled genioglossus, orbicularis or is, and sternocleidomastoideo-pectively (FIG. 4M, FIGS. 50A-50B). Moreover, besides independent controls of different muscles groups, stimulation through the stretchable electrode array also showed strong side specificity. Depending on the location of the array, only the muscles on the same side (i.e., ipsilateral) would be stimulated, in accordance with the functional organization of corresponding cranial nerves (FIGS. 4N-4O, FIGS. 51A-51B). The amplitude of the elicited muscle signals could also be modulated by the intensity of the input stimulus until a plateau was reached (FIG. 4P, FIGS. 52A-52B). Finally, immunohistological analysis showed that the soft and stretchable electrode array did not induce significant tissue damages or inflammatory responses when placed between the cerebellum and the brainstem while rigid probes could not match (FIG. 4Q, FIGS. 53A-53B, FIGS. 54A-54B, FIGS. 55A-55B). Collectively, the ability to modulate neural activities down to single nucleus precision enabled by the present technology not only offers immediate benefit for clinical translation in neurosurgical procedures where high-resolution functional maps are demanded, but also opens up a completely new playground for brain-machine interfaces where currently unventured brain structures, such as brainstem, may now be incorporated.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. Shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

CERTAIN EMBODIMENTS

Embodiment A1. A device comprising a conducting layer including a polyrotaxane polymer and PEDOT:PSS.

Embodiment A2. The device of Embodiment A1 further comprising a substrate layer comprising an elastomer, e.g., a fluoropolymer, e.g., poly(vinylidene fluoride)-co-hexafluoropropylene.

Embodiment A3. The device of Embodiment A1 or A2 further comprising a backing layer, e.g., an elastomer, e.g., polydimethylsiloxane.

Embodiment A4. The device of any one of Embodiments A1-A3, wherein the polyrotaxane polymer comprises a PEG backbone.

Embodiment A5. The device of Embodiment A4, wherein the PEG backbone has a weight of 5-15 kDa.

Embodiment A6. The device of Embodiment A4 or A5, wherein the polyrotaxane polymer comprises cyclodextrin rings as a polyrotaxane component.

Embodiment A7. The device of Embodiment A6, wherein the cyclodextrin rings include cyclodextrin rings substituted by a PEG backbone and optionally cyclodextrin rings not substituted by a PEG backbone.

Embodiment A8. The device of any of Embodiments A1-7A, wherein the polyrotaxane polymer is crosslinked.

Embodiment A9. The device of any of Embodiments A1-A8, wherein the PEDOT:PSS in the conducting layer is patterned as conductive strips within the conducting layer.

Embodiment A10. The device of Embodiment A9, wherein the PEDOT:PSS is photopatterned.

Embodiment A11. A device comprising a conducting layer including a topological polymer and a photo-patterned PEDOT:PSS array, wherein the conducting layer has a stretchability greater than 10% and a conductivity of more than 1S/cm.

Embodiment A12. The device of Embodiment A11, wherein the topological polymer comprises a PEG backbone.

Embodiment A13. The device of Embodiment A12, wherein the PEG backbone has a weight of 5-15 kDa.

Embodiment A14. The device of any one of Embodiments A11-A13, wherein the topological polymer is a polyrotaxane polymer comprising cyclodextrin rings as a polyrotaxane component.

Embodiment A15. The device of Embodiment A14, wherein the cyclodextrin rings include cyclodextrin rings substituted by a PEG backbone and optionally cyclodextrin rings not substituted by a PEG backbone.

Embodiment A16. The device of any of Embodiments A11-A15, wherein the topological polymer is crosslinked.

Embodiment A17. The device of any of Embodiments A11-A16, wherein the PEDOT:PSS array the conducting layer is patterned as conductive strips within the conducting layer.

Embodiment A18. The device of any of Embodiments A11-A17, wherein the topological polymer comprises a reactive photo-crosslinkable group.

Embodiment A19. The device of any of Embodiments A11-A18, wherein the topological polymer is non-ionic.

Embodiment A20. The device of any of Embodiments A11-A19, wherein the topological polymer comprises PEG.

Embodiment A21. The device of any of Embodiments A11-A20, wherein the topological polymer comprises PEG di(meth)acrylate.

Embodiment B1. A conducting composition comprising a topological polymer and a PEDOT:PSS.

Embodiment B2. The conducting composition of Embodiment B1, wherein the topological polymer comprises a reactive crosslinkable group.

Embodiment B3. The conducting composition of Embodiments B1 or B2, wherein the reactive crosslinkable group is a reactive photo-crosslinkable group.

Embodiment B4. The conducting composition of Embodiment B3, wherein the photo-crosslinkable group is an acrylate or methacrylate.

Embodiment B5. The conducting composition of any one of Embodiments B1-B4, wherein the topological polymer is a polyrotaxane polymer.

Embodiment B6. The conducting composition of Embodiment B5, wherein the polyrotaxane polymer comprises a PEG backbone.

Embodiment B7. The conducting composition of Embodiment B6, wherein the PEG backbone has a weight of 5-15 kDa.

Embodiment B8. The conducting composition of any one of Embodiments B1-B7, wherein the topological polymer is a polyrotaxane polymer comprising cyclodextrin rings as a polyrotaxane component.

Embodiment B9. The conducting composition of Embodiment B8, wherein the cyclodextrin rings include cyclodextrin rings substituted by a PEG side chain and optionally cyclodextrin rings not substituted by a PEG side chain.

Embodiment B10. The conducting composition of Embodiment B9, wherein the PEG side chain is a PEG diacrylate or PEG di(meth)acrylate.

Embodiment B11. The conducting composition of any one of Embodiments B1-B10, wherein the topological polymer is crosslinked.

Embodiment B12. The conducting composition of any one of Embodiments B1-B11, wherein the topological polymer is non-ionic.

Embodiment B13. The conducting composition of any one of Embodiments B1-B12, wherein the conducting composition is transparent.

Embodiment B14. The conducting composition of any one of Embodiments B1-B13, wherein the conducting composition has at least 50% transmittance.

Embodiment B15. The conducting composition of any one of Embodiments B1-B14, wherein the conducting composition has a stretchability greater than 10% crack onset strain and a conductivity of more than 1 S/cm.

Embodiment B16. The conducting composition of any one of Embodiments B1-B14, wherein the conducting composition has a stretchability greater than 20% crack onset strain and a conductivity of more than 500 S/cm.

Embodiment B17. The conducting composition of any one of Embodiments B1-B14, wherein the conducting composition has a stretchability greater than 20% crack onset strain and a conductivity of more than 1000 S/cm.

Embodiment B18. The conducting composition of any one of Embodiments B1-B17, wherein the composition is in the form of a film.

Embodiment B19. A device comprising a conducting layer, wherein the conducting layer comprises the conducting composition of any one of Embodiments B1-B14.

Embodiment B20. The device of Embodiment B19, further comprising a substrate layer comprising an elastomer, optionally wherein the elastomer is a fluoropolymer, optionally wherein the fluoropolymer is a poly(vinylidene fluoride)-co-hexafluoropropylene.

Embodiment B21. The device of Embodiment B19 or B20, further comprising a backing layer, optionally wherein the backing layer comprises an elastomer, optionally wherein the elastomer is a polydimethylsiloxane.

Embodiment B22. The device of any one of Embodiments B19-B21, wherein the PEDOT:PSS in the conducting layer is patterned as conductive strips within the conducting layer.

Embodiment B23. The device of Embodiment B22, wherein the PEDOT:PSS in the conducting layer is photopatterned.

Embodiment B24. A device comprising a conducting layer, wherein the conducting layer comprises a conducting composition, and the conducting composition comprises a topological polymer and a photo-patterned PEDOT:PSS array, wherein the conducting layer has a stretchability greater than 10% crack onset strain and a conductivity of more than 1 S/cm.

Embodiment B25. The device of Embodiment B24, further comprising a substrate layer comprising an elastomer, optionally wherein the elastomer is a fluoropolymer, optionally wherein the fluoropolymer is a poly(vinylidene fluoride)-co-hexafluoropropylene.

Embodiment B26. The device of Embodiment B24 or B25, further comprising a backing layer, optionally wherein the backing layer comprises an elastomer, optionally wherein the elastomer is a polydimethylsiloxane.

Embodiment B27. The device of any one of Embodiments B24-B26, wherein the topological polymer comprises a reactive crosslinkable group.

Embodiment B28. The device of Embodiment B27, wherein the reactive crosslinkable group is a reactive photocrosslinkable group.

Embodiment B29. The device of Embodiment B28, wherein the photo-crosslinkable group is an acrylate or methacrylate.

Embodiment B30. The device of any one of Embodiments B24-B29, wherein the topological polymer is a polyrotaxane polymer.

Embodiment B31. The device of any one of Embodiments B24-B30, wherein the topological polymer comprises a PEG backbone.

Embodiment B32. The device of Embodiment B31, wherein the PEG backbone has a weight of 5-15 kDa.

Embodiment B33. The device of any one of Embodiments B24-B32, wherein the topological polymer is a polyrotaxane polymer comprising cyclodextrin rings as a polyrotaxane component.

Embodiment B34. The device of Embodiment B33, wherein the cyclodextrin rings include cyclodextrin rings substituted by a PEG side chain and optionally cyclodextrin rings not substituted by a PEG side chain.

Embodiment B35. The device of Embodiment B34, wherein the PEG side chain is a PEG diacrylate or a PEG di(meth)acrylate.

Embodiment B36. The device of any one of Embodiments B24-B35, wherein the topological polymer is crosslinked.

Embodiment B37. The device of any one of Embodiments B24-B36, wherein the PEDOT:PSS array is patterned as conductive strips within the conducting layer.

Embodiment B38. The device of any one of Embodiments B24-B37, wherein the topological polymer is non-ionic.

Embodiment B39. The device of any one of Embodiments B24-B38, wherein the conducting composition is transparent.

Embodiment B40. The device of any one of Embodiments B19-B39 selected from a display, a diode, a memory device, an electrochromic device, and a solar cell.

Embodiment B41. The device of Embodiment B40, wherein the diode is a photodiode, a polymer light emitting diode, or an electrochemical light emitting diode.

Embodiment B42. The device of any one of Embodiments B19-B39, wherein the device comprises a transparent conducting polymer electrode.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A conducting composition comprising a topological polymer and a PEDOT:PSS, wherein:

the topological polymer comprises a polyrotaxane polymer comprising cyclodextrin rings; and the conducting composition has a stretchability greater than 10% crack onset strain and a conductivity of more than 100 S/cm.

2. The conducting composition of claim 1, wherein the polyrotaxane polymer further comprises a PEG backbone having a molecular weight of 5 kDa to 15 kDa.

3. The conducting composition of claim 1, wherein the cyclodextrin rings comprise cyclodextrin rings substituted by a PEG side chain, cyclodextrin rings not substituted by a PEG side chain, or both cyclodextrin rings substituted by a PEG side chain and cyclodextrin rings not substituted by a PEG side chain.

4. The conducting composition of claim 3, wherein the PEG side chain is a PEG diacrylate or PEG di (meth) acrylate.

5. The conducting composition of claim 1, wherein the topological polymer is crosslinked, non-ionic, and transparent.

6. The conducting composition of claim 1, wherein the conducting composition exhibits at least 50% transmittance.

7. The conducting composition of claim 1, wherein the composition is in the form of a film.

8. A device comprising a conducting layer comprising the conducting composition of claim 1.

9. The device of claim 8, further comprising a substrate layer comprising an elastomer, wherein the elastomer is a fluoropolymer.

10. The device of claim 8 further comprising a backing layer, comprising an elastomer.

11. The device of claim 8, wherein the PEDOT: PSS in the conducting layer is patterned as conductive strips within the conducting layer.

12. The device of claim 8, wherein the device is a transparent conducting polymer electrode, stretchable solar cell, stretchable photodiode, stretchable light emitting diode, an electrical stimulation electrode, or an electrophysiology electrode.

13. The conducting composition of claim 1, wherein the conducting composition has a stretchability greater than 50% crack onset strain and a conductivity of more than 1000 S/cm.

14. The conducting composition of claim 1, wherein the conducting composition is photopatterned.

15. A device comprising a conducting layer comprising a topological polymer and a photo-patterned PEDOT: PSS array, wherein the conducting layer has a stretchability greater than 10% crack onset strain and a conductivity of more than 1 S/cm.

16. The device of claim 15, further comprising a substrate layer comprising poly (vinylidene fluoride)-co-hexafluoropropylene.

17. The device of claim 15 further comprising a backing layer comprising a polydimethylsiloxane.

18. The device of claim 15, wherein the conductivity is more than 100 S/cm.

19. The device of claim 15 further comprising a substrate layer comprising an elastomer, wherein the elastomer is a fluoropolymer.

20. The device of claim 15, wherein the PEDOT: PSS in the conducting layer is patterned as conductive strips within the conducting layer.

\* \* \* \* \*